United States Patent
Qin et al.

(10) Patent No.: US 12,545,714 B2
(45) Date of Patent: Feb. 10, 2026

(54) BAFF-R/CD19 TARGETED CHIMERIC ANTIGEN RECEPTOR-MODIFIED T CELLS AND USE THEREOF

(71) Applicant: City of Hope, Duarte, CA (US)

(72) Inventors: Hong Qin, Duarte, CA (US); Xiuli Wang, Duarte, CA (US); Larry Wonshin Kwak, Duarte, CA (US); Stephen J. Forman, Duarte, CA (US)

(73) Assignee: City of Hope, Duarte, CA (US)

( * ) Notice: Subject to any disclaimer, the term of this patent is extended or adjusted under 35 U.S.C. 154(b) by 1022 days.

(21) Appl. No.: 17/432,283

(22) PCT Filed: Feb. 20, 2020

(86) PCT No.: PCT/US2020/019082
§ 371 (c)(1),
(2) Date: Aug. 19, 2021

(87) PCT Pub. No.: WO2020/172440
PCT Pub. Date: Aug. 27, 2020

(65) Prior Publication Data
US 2022/0125840 A1    Apr. 28, 2022

Related U.S. Application Data

(60) Provisional application No. 62/808,222, filed on Feb. 20, 2019.

(51) Int. Cl.
| | | |
|---|---|---|
| *C07K 14/705* | (2006.01) |
| *A61K 40/11* | (2025.01) |
| *A61K 40/31* | (2025.01) |
| *A61K 40/42* | (2025.01) |
| *A61P 35/00* | (2006.01) |
| *C07K 14/715* | (2006.01) |
| *C07K 16/28* | (2006.01) |
| *C12N 5/0783* | (2010.01) |
| *C12N 15/63* | (2006.01) |

(52) U.S. Cl.
CPC ........ *C07K 14/70578* (2013.01); *A61K 40/11* (2025.01); *A61K 40/31* (2025.01); *A61K 40/4202* (2025.01); *A61K 40/4211* (2025.01); *A61P 35/00* (2018.01); *C07K 14/70521* (2013.01); *C07K 14/7151* (2013.01); *C07K 16/2803* (2013.01); *C07K 16/2878* (2013.01); *C12N 5/0636* (2013.01); *C12N 15/63* (2013.01); *A61K 2239/29* (2023.05); *A61K 2239/31* (2023.05); *A61K 2239/38* (2023.05); *A61K 2239/48* (2023.05)

(58) Field of Classification Search
CPC ........ C07K 14/70578; C07K 14/70521; C07K 14/7151; C07K 16/2803; C07K 16/2878; C07K 2317/622; C07K 2319/03; C07K 14/7051; C07K 2319/02; A61K 40/11; A61K 40/31; A61K 40/4202; A61K 40/4211; A61K 2239/29; A61K 2239/31; A61K 2239/38; A61K 2239/48; A61K 35/17; A61P 35/00; A61P 35/02; C12N 5/0636; C12N 15/63; C12N 15/62; C12N 2510/00

See application file for complete search history.

(56) References Cited

U.S. PATENT DOCUMENTS

2016/0152723 A1    6/2016   Chen et al.

FOREIGN PATENT DOCUMENTS

| CN | 108728459 | 11/2018 | | |
|---|---|---|---|---|
| CN | 109311991 | 2/2019 | | |
| JP | 2018-522567 A | 8/2018 | | |
| KR | 10-2016-0012991 A | 2/2016 | | |
| KR | 10-2016-0145802 A | 12/2016 | | |
| WO | WO 2014/144622 A2 | 9/2014 | | |
| WO | WO 2015/164594 A1 | 10/2015 | | |
| WO | WO 2016/033570 | 3/2016 | | |
| WO | WO 2016/149578 | 9/2016 | | |
| WO | WO 2017/027291 A1 | 2/2017 | | |
| WO | WO 2017/214167 | 12/2017 | | |
| WO | WO 2017/214170 | 12/2017 | | |
| WO | WO-2017214167 A1 * | 12/2017 | ............. | A61K 35/17 |
| WO | WO 2018/213337 | 11/2018 | | |
| WO | WO-2018213337 A1 * | 11/2018 | ............. | A61K 35/17 |
| WO | WO 2018/237022 | 12/2018 | | |

OTHER PUBLICATIONS

Guedan et al. "Engineering and Design of Chimeric Antigen Receptors." Mol. Ther. Methods Clin. Dev. 2018. 12, 145-156 (Year: 2018).*
International Preliminary Report on Patentability in International Application No. PCT/US2020/019082, dated Aug. 10, 2021, 10 pages.
International Search Report and Written Opinion in International Application No. PCT/US2020/019082, dated Jul. 1, 2020, 18 pages.
Qin et al., "Novel BAFF-Receptor Antibody to Natively Folded Recombinant Protein Eliminates Drug-Resistant Human B-cell Malignancies In Vivo," Clin Cancer Res., 2017, 24(5):1114-1123.

(Continued)

*Primary Examiner* — Chun W Dahle
*Assistant Examiner* — Grace H Lunde
(74) *Attorney, Agent, or Firm* — Kilpatrick Townsend & Stockton LLP

(57) ABSTRACT

Chimeric antigen receptors targeting both BAFF-R and CD19 are described as are methods for their use.

15 Claims, 13 Drawing Sheets

Specification includes a Sequence Listing.

(56) References Cited

OTHER PUBLICATIONS

Turazzi et al., "Engineered T cells towards TNFRSF13C (BAFFR): a novel strategy to efficiently target B-cell acute lymphoblastic leukaemia 11," BJHaem., Sep. 1, 2018, 182(6):939-943.

Wang et al., "Phase 1 studies of central memory-derived CD19 CAR T-cell therapy following autologous HSCT in patients with B-cell NHL," Blood, Jun. 16, 2016, 127(24):2980-2990.

* cited by examiner

FIGURE 2

BAFFscFv-(g4s)4-CD19R-IgG4(L235E,N297Q)-41BB-Zeta

```
  1   MLLLVTSLLL CELPHPAFLL IPEVQLQESG PGLVKPSQTL SLTCTVSGDS
      ‾‾‾‾‾‾‾‾‾‾ ‾‾‾‾‾‾‾‾‾‾ ‾‾‾‾‾‾‾‾‾‾
      GMCSFRa signal peptide   BAFFscFv 51   ITSGYWNWIR QHPGKGLEYI GYISYSGSTY YNPSLKSRVT ISRDTSKNQY
101   SLKLSSVTAA DTAVYYCASP NYPFYAMDYW GQGTLVTVSS GGGGSGGGGS
151   GGGGSDIVLT QSPATLSLSP GERATLSCRA SESVDNYGIS FMNWFQQKPG
201   QAPRLLIYAA SNRATGIPAR FSGSGSGTDF TLTISSLEPE DFAVYYCQQS
251   KEVPWTFGGG TKVEIKRGGG GSGGGGSGGG GSGGGGSDIQ MTQTTSSLSA
                          ‾‾‾‾‾‾‾‾‾‾‾‾‾‾‾‾‾‾‾‾‾‾
                               (g4s)4                CD19RscFv
301   SLGDRVTISC RASQDISKYL NWYQQKPDGT VKLLIYHTSR LHSGVPSRFS
351   GSGSGTDYSL TISNLEQEDI ATYFCQQGNT LPYTFGGGTK LEITGSTSGS
401   GKPGSEGST KGEVKLQESG PGLVAPSQSL SVTCTVSGVS LPDYGVSWIR
451   QPPRKGLEWL GVIWGSETTY YNSALKSRLT IIKDNSKSQV FLKMNSLQTD
501   DTAIYYCAKH YYYGGSYAMD YWGQGTSVTV SSESKYGPPC PPCPAPEFEG
                                          ‾‾‾‾‾‾‾‾‾‾‾‾‾‾‾‾‾‾‾
                                           IgG4SmP/L235E,N297Q
551   GPSVFLFPPK PKDTLMISRT PEVTCVVVDV SQEDPEVQFN WYVDGVEVHN
      ‾‾‾‾‾‾‾‾‾‾ ‾‾‾‾‾‾‾‾‾‾ ‾‾‾‾‾‾‾‾‾‾ ‾‾‾‾‾‾‾‾‾‾ ‾‾‾‾‾‾‾‾‾‾
601   AKTKPREEQF QSTYRVVSVL TVLHQDWLNG KEYKCKVSNK GLPSSIEKTI
651   SKAKGQPREP QVYTLPPSQE EMTKNQVSLT CLVKGFYPSD IAVEWESNGQ
701   PENNYKTTPP VLDSDGSFFL YSRLTVDKSR WQEGNVFSCS VMHEALHNHY
751   TQKSLSLSLG KMALIVLGGV AGLLLFIGLG IFFKRGRKKL LYIFKQPFMR
                ‾‾‾‾‾‾‾‾‾‾‾‾‾‾‾‾‾‾‾‾‾‾‾‾‾‾‾‾‾‾ ‾‾‾‾‾‾‾‾‾‾‾‾‾‾‾‾‾‾‾‾
                    CD4 transmembrane              41BB cyto
801   PVQTTQEEDG CSCRFPEEEE GGCELGGGRV KFSRSADAPA YQQGQNQLYN
                                      ‾‾‾‾‾‾‾‾‾‾ ‾‾‾‾‾‾‾‾‾‾
                                             CD3 Zeta
851   ELNLGRREEY DVLDKRRGRD PEMGGKPRRK NPQEGLYNEL QKDKMAEAYS
901   EIGMKGERRR GKGHDGLYQG LSTATKDTYD ALHMQALPPR
```

FIGURE 3

CD19R-(g4s)4-BAFFscFv -IgG4(L235E,N297Q)-41BB-Zeta

```
  1    MLLLVTSLLL CELPHPAFLL IPDIQMTQTT SSLSASLGDR VTISCRASQD
       GMCFSRa signal peptide   CD19RscFv
 51    ISKYLNWYQQ KPDGTVKLLI YHTSRLHSGV PSRFSGSGSG TDYSLTISNL
101    EQEDIATYFC QQGNTLPYTF GGGTKLEITG STSGSGKPGS GEGSTKGEVK
151    LQESGPGLVA PSQSLSVTCT VSGVSLPDYG VSWIRQPPRK GLEWLGVIWG
201    SETTYYNSAL KSRLTIIKDN SKSQVFLKMN SLQTDDTAIY YCAKHYYYGG
251    SYAMDYWGQG TSVTVSSGGG GSGGGGSGGG GSGGGGSEVQ LQESGPGLVK
                             (g4s)4                BAFFscFv
301    PSQTLSLTCT VSGDSITSGY WNWIRQHPGK GLEYIGYISY SGSTYYNPSL
351    KSRVTISRDT SKNQYSLKLS SVTAADTAVY YCASPNYPFY AMDYWGQGTL
401    VTVSSGGGGS GGGGSGGGGS DIVLTQSPAT LSLSPGERAT LSCRASESVD
451    NYGISFMNWF QQKPGQAPRL LIYAASNRAT GIPARFSGSG SGTDFTLTIS
501    SLEPEDFAVY YCQQSKEVPW TFGGGTKVEI KRESKYGPPC PPCPAPEFEG IgG4(SmP)(L235E,N297Q)
551    GPSVFLFPPK PKDTLMISRT PEVTCVVVDV SQEDPEVQFN WYVDGVEVHN
601    AKTKPREEQF QSTYRVVSVL TVLHQDWLNG KEYKCKVSNK GLPSSIEKTI
651    SKAKGQPREP QVYTLPPSQE EMTKNQVSLT CLVKGFYPSD IAVEWESNGQ
701    PENNYKTTPP VLDSDGSFFL YSRLTVDKSR WQEGNVFSCS VMHEALHNHY
751    TQKSLSLSLG KMALIVLGGV AGLLLFIGLG IFFKRGRKKL LYIFKQPFMR
                  CD4 transmembrane         41BB cyto
801    PVQTTQEEDG CSCRFPEEEE GGCELGGGRV KFSRSADAPA YQQGQNQLYN
                                   CD3 Zeta
851    ELNLGRREEY DVLDKRRGRD PEMGGKPRRK NPQEGLYNEL QKDKMAEAYS
901    EIGMKGERRR GKGHDGLYQG LSTATKDTYD ALHMQALPPR
```

FIGURE 4

CD19VL-BAFFVH-linker-BAFFVL-CD19RVH-IgG4(L235E,N297Q)-CD4tm-41BB-Zeta

```
  1  MLLLVTSLLL CELPHPAFLL IPDIQMTQTT SSLSASLGDR VTISCRASQD
     GMCSFRa signal peptide  CD19R VL
 51  ISKYLNWYQQ KPDGTVKLLI YHTSRLHSGV PSRFSGSGSG TDYSLTISNL
101  EQEDIATYFC QQGNTLPYTF GGGTKLEITG GGGSEVQLQE SGPGLVKPSQ
                                       (g4s) BAFFscFv VH
151  TLSLTCTVSG DSITSGYWNW IRQHPGKGLE YIGYISYSGS TYYNPSLKSR
201  VTISRDTSKN QYSLKLSSVT AADTAVYYCA SPNYPFYAMD YWGQGTLVTV
251  SSGSTSGSGK PGSGEGSTKG DIVLTQSPAT LSLSPGERAT LSCRASESVD
         Linker                  BAFFscFv VL
301  NYGISFMNWF QQKPGQAPRL LIYAASNRAT GIPARFSGSG SGTDFTLTIS
351  SLEPEDFAVY YCQQSKEVPW TFGGGTKVEI KRGGGGSEVK LQESGPGLVA
                                       (g4s)CD19RscFv VH
401  PSQSLSVTCT VSGVSLPDYG VSWIRQPPRK GLEWLGVIWG SETTYYNSAL
451  KSRLTIIKDN SKSQVFLKMN SLQTDDTAIY YCAKHYYYGG SYAMDYWGQG
501  TSVTVSSESK YGPPCPPCPA PEFEGGPSVF LFPPKPKDTL MISRTPEVTC
         IgG4(SmP)(L235E,N297Q)
551  VVVDVSQEDP EVQFNWYVDG VEVHNAKTKP REEQFQSTYR VVSVLTVLHQ
601  DWLNGKEYKC KVSNKGLPSS IEKTISKAKG QPREPQVYTL PPSQEEMTKN
651  QVSLTCLVKG FYPSDIAVEW ESNGQPENNY KTTPPVLDSD GSFFLYSRLT
701  VDKSRWQEGN VFSCSVMHEA LHNHYTQKSL SLSLGKMALI VLGGVAGLLL
                                                CD4 transmembrane
751  FIGLGIFFKR GRKKLLYIFK QPFMRPVQTT QEEDGCSCRF PEEEEGGCEL
              41BB cyto
801  GGGRVKFSRS ADAPAYQQGQ NQLYNELNLG RREEYDVLDK RRGRDPEMGG
         CD3zeta
851  KPRRKNPQEG LYNELQKDKM AEAYSEIGMK GERRRGKGHD GLYQGLSTAT
901  KDTYDALHMQ ALPPR
```

FIGURE 5

CD19R-IgG4(L235E,N297Q)-CD28tm-CD28gg-Zeta_BAFFscFv -IgG4(L235E,N297Q)-41BB-Zeta bicistronic

CD19RscFv-IgG4(L235E, N297Q)-CD28tm-CD28gg-Zeta

```
  1 MLLLVTSLLL CELPHPAFLL IPDIQMTQTT SSLSASLGDR VTISCRASQD
    GMCFSRa signal peptide    CD19RscFv
 51 ISKYLNWYQQ KPDGTVKLLI YHTSRLHSGV PSRFSGSGSG TDYSLTISNL
101 EQEDIATYFC QQGNTLPYTF GGGTKLEITG STSGSGKPGS GEGSTKGEVK
151 LQESGPGLVA PSQSLSVTCT VSGVSLPDYG VSWIRQPPRK GLEWLGVIWG
201 SETTYYNSAL KSRLTIIKDN SKSQVFLKMN SLQTDDTAIY YCAKHYYYGG
251 SYAMDYWGQG TSVTVSSESK YGPPCPPCPA PEFEGGPSVF LFPPKPKDTL
                          IgG4(SmP)(L235E,N297Q)
301 MISRTPEVTC VVVDVSQEDP EVQFNWYVDG VEVHNAKTKP REEQFQSTYR
351 VVSVLTVLHQ DWLNGKEYKC KVSNKGLPSS IEKTISKAKG QPREPQVYTL
401 PPSQEEMTKN QVSLTCLVKG FYPSDIAVEW ESNGQPENNY KTTPPVLDSD
451 GSFFLYSRLT VDKSRWQEGN VFSCSVMHEA LHNHYTQKSL SLSLGKMFWV
                                                       CD28
501 LVVVGGVLAC YSLLVTVAFI IFWVRSKRSR GGHSDYMNMT PRRPGPTRKH
    Transmemebrane            CD28gg
551 YQPYAPPRDF AAYRSGGGRV KFSRSADAPA YQQGQNQLYN ELNLGRREEY
                                   CD3 Zeta
601 DVLDKRRGRD PEMGGKPRRK NPQEGLYNEL QKDKMAEAYS EIGMKGERRR
651 GKGHDGLYQG LSTATKDTYD ALHMQALPPR
```

BAFFscFv-IgG4(L235E, N297Q)-CD4tm-41BB-Zeta

```
  1 MLLLVTSLLL CELPHPAFLL IPEVQLQESG PGLVKPSQTL SLTCTVSGDS
    GMCFSRa signal peptide    BAFFscFv
 51 ITSGYWNWIR QHPGKGLEYI GYISYSGSTY YNPSLKSRVT ISRDTSKNQY
101 SLKLSSVTAA DTAVYYCASP NYPFYAMDYW GQGTLVTVSS GGGGSGGGGS
151 GGGGSDIVLT QSPATLSLSP GERATLSCRA SESVDNYGIS FMNWFQQKPG
201 QAPRLLIYAA SNRATGIPAR FSGSGSGTDF TLTISSLEPE DFAVYYCQQS
251 KEVPWTFGGG TKVEIKRESK YGPPCPPCPA PEFEGGPSVF LFPPKPKDTL
                          IgG4(SmP)(L235E,N297Q)
301 MISRTPEVTC VVVDVSQEDP EVQFNWYVDG VEVHNAKTKP REEQFQSTYR
351 VVSVLTVLHQ DWLNGKEYKC KVSNKGLPSS IEKTISKAKG QPREPQVYTL
401 PPSQEEMTKN QVSLTCLVKG FYPSDIAVEW ESNGQPENNY KTTPPVLDSD
451 GSFFLYSRLT VDKSRWQEGN VFSCSVMHEA LHNHYTQKSL SLSLGKMALI
                                                       CD4
501 VLGGVAGLLL FIGLGIFFKR GRKKLLYIFK QPFMRPVQTT QEEDGCSCRF
    Transmembrane         41BB cyto
551 PEEEEGGCEL GGGRVKFSRS ADAPAYQQGQ NQLYNELNLG RREEYDVLDK
                         CD3 Zeta
601 RRGRDPEMGG KPRRKNPQEG LYNELQKDKM AEAYSEIGMK GERRRGKGHD
651 GLYQGLSTAT KDTYDALHMQ ALPPR
```

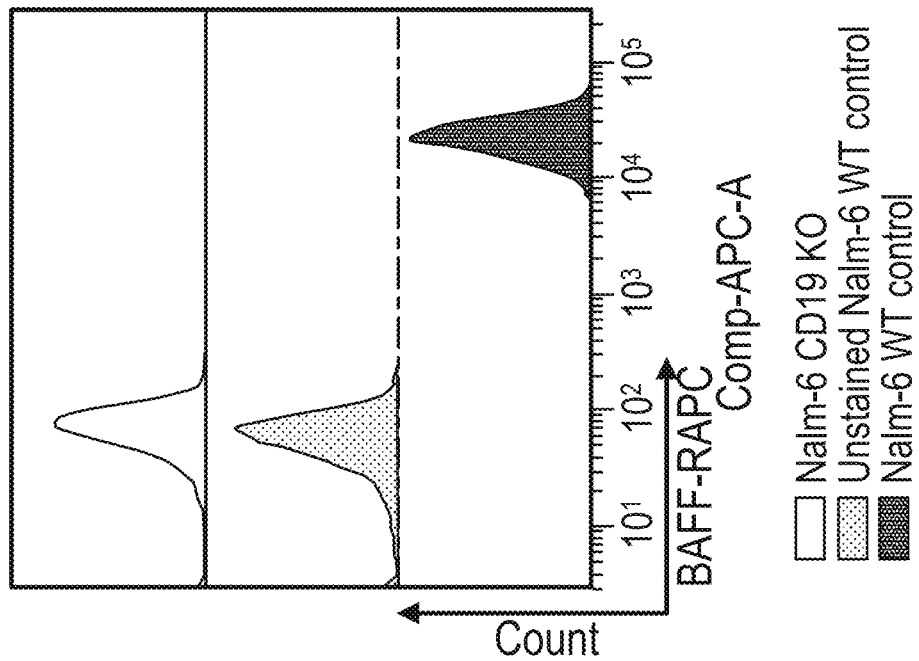
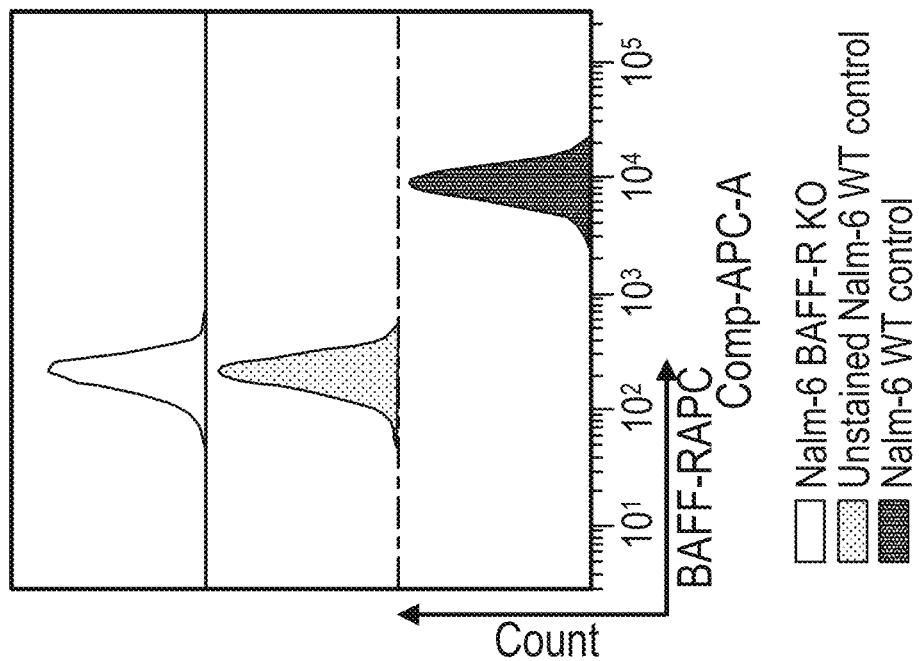
FIG. 9

FIGURE 11
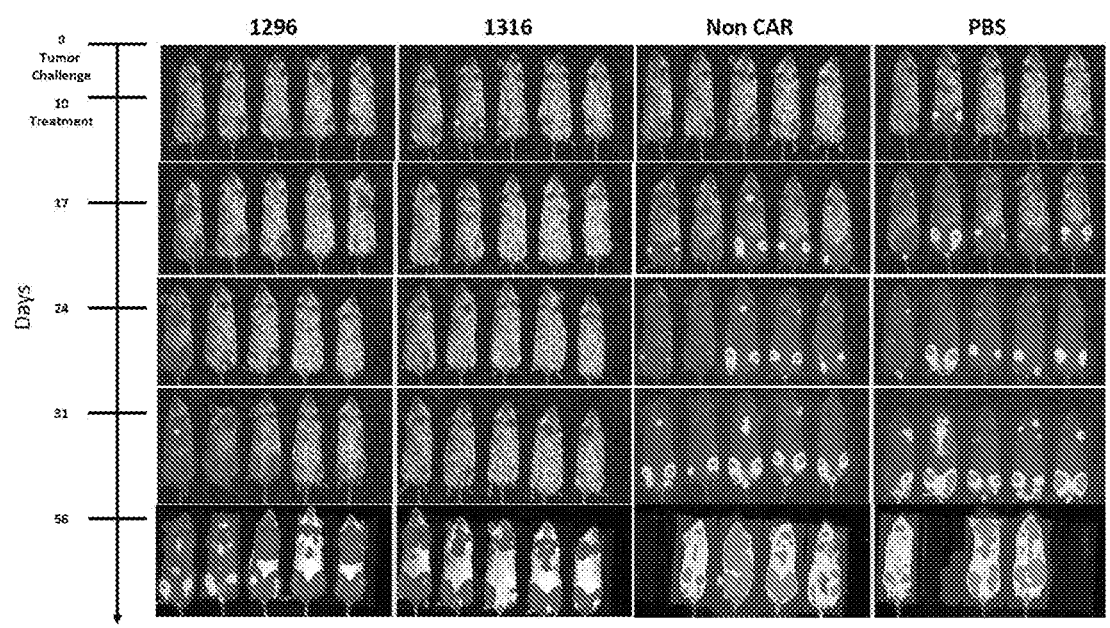
A
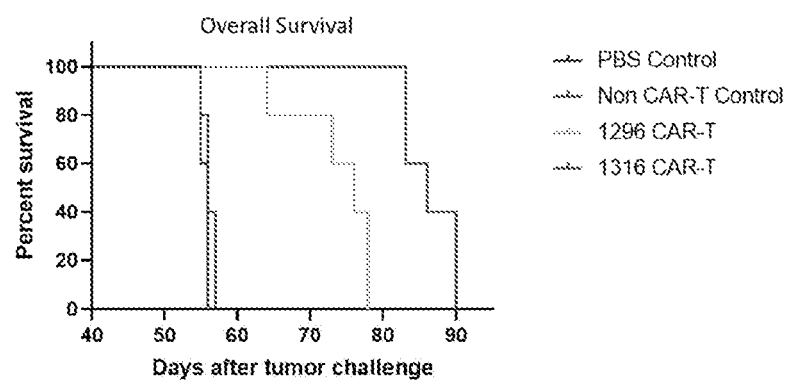
B

FIGURE 13
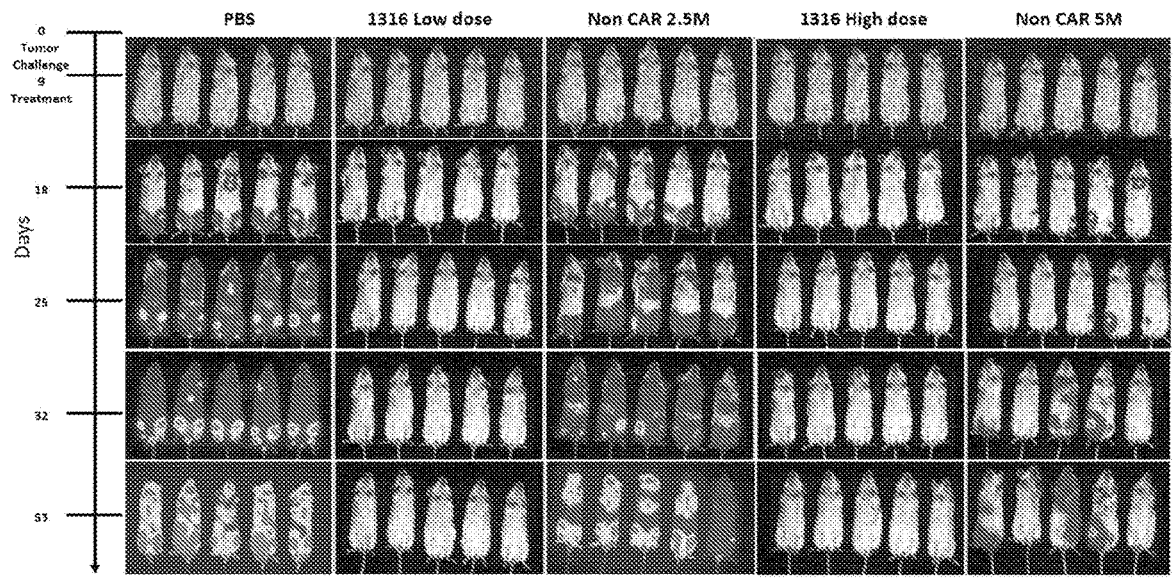
A
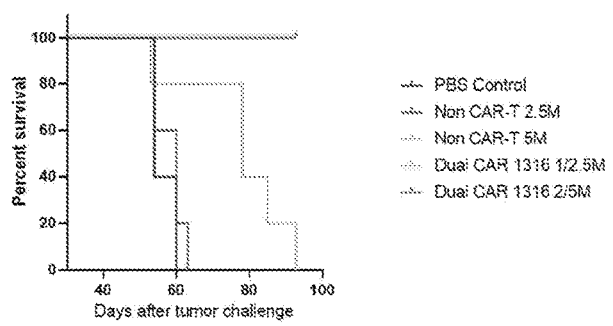
B

BAFF-R/CD19 TARGETED CHIMERIC ANTIGEN RECEPTOR-MODIFIED T CELLS AND USE THEREOF

CLAIM OF PRIORITY

This application is a U.S. National Phase Application under 35 U.S.C. § 371 of International Application No. PCT/US2020/019082, filed on Feb. 20, 2020, which claims priority to and the benefit of U.S. Provisional Application No. 62/808,222, filed Feb. 20, 2019. The entire contents of the foregoing are incorporated herein by reference.

SEQUENCE LISTING

This application contains a Sequence Listing that has been submitted electronically as an ASCII text file named 40056-0045US1_ST25.txt. The ASCII text file, created on Jul. 31, 2025, is 121,268 bytes in size. The material in the ASCII text file is hereby incorporated by reference in its entirety.

BACKGROUND

Tumor-specific T cell based immunotherapies, including therapies employing engineered T cells, have been investigated for anti-tumor treatment.

CD19 CAR-T cell therapy is effective in many patients with B-ALL and lymphoma. However, relapse due to antigen loss variants escaping CD19-directed CAR-T therapy can occur in up to 20-30% of patient. CD22 CAR-T cell therapy has been proposed as one alternative strategy to overcome relapse from CD19 antigen loss, as demonstrated by achievement of clinical responses in patients with CD19-negative B-ALL. However, CD22 expression density can vary particularly in mixed lineage leukemia (MLL) and its expression was reported to diminish after CD22-targeted therapy.

SUMMARY

Described herein are methods for treating B cell malignancies, including B-ALL and lymphoma, using T cells expressing a chimeric antigen receptor (CAR) targeted to B cell activating factor receptor (BAFF-R) and CD19. In some cases, a single CAR targets both BAFF-R and CD19. In the case of a single CAR targeting both BAFF-R and CD19 the extracellular targeting portion can have a tandem format in which an scFv to one of the targets precedes the other scFv or a loop format in which an scFv to one of the two targets is disposed between the VL and VH domains of a scFv to the other target. In any of these formats, the CAR includes: a transmembrane domain (e.g., a CD8 transmembrane domain), a co-stimulatory domain (e.g., a 4-1BB co-stimulatory domain) and a CD3 zeta signaling domain. The CAR can also include a spacer sequence between, for example, the scFv domain(s) and the transmembrane domain, between the transmembrane domain and the co-stimulatory domain, and/or between the co-stimulatory domain and the CD3 zeta signaling domain.

Described herein is a nucleic acid molecule comprising a nucleotide sequence encoding a chimeric antigen receptor targeted to both BAFF-R and CD19, wherein the chimeric antigen receptor comprises, from amino to carboxy terminus: a targeting domain for targeting BAFF-R and CD19; a spacer domain; a transmembrane domain; a costimulatory domain; and a CD3ζ signaling domain.

In various embodiments: (1) the targeting domain comprises, from amino to carboxy terminus: a) a scFv targeted to BAFF-R and a scFv targeted to CD19; or b) a scFv targeted to CD19 and a scFv targeted to BAFF-R; (2) the targeting domain comprises, from amino to carboxy terminus: a) a VL domain of a CD19 scFv; a scFv targeted to BAFF-R; and a VH of the CD19 scFv; or b) a VH domain of a CD19 scFv; a scFv targeted to BAFF-R; and a VL of the CD19 scFv; and (3) the targeting domain comprises, from amino to carboxy terminus: a) a VL domain of a BAFF-R scFv; a scFv targeted to CD19; and a VH of the BAFF-R scFv; or b) a VH domain of a BAFF-R scFv; a scFv targeted to CD19; and a VL of the BAFF-R scFv.

Also described herein is a nucleic acid molecule comprising a nucleotide sequence encoding a chimeric antigen receptor targeted to both BAFF-R and a chimeric antigen receptor targeted to CD19, wherein the chimeric antigen receptor targeted to BAFF-R comprises, from amino to carboxy terminus: a BAFF-R scFv; a spacer domain; a transmembrane domain; a costimulatory domain; and a CD3ζ signaling domain; and the chimeric antigen receptor targeted to CD19 comprises, from amino to carboxy terminus: a CD19 scFv; a spacer domain; a transmembrane domain; a costimulatory domain; and a CD3ζ signaling domain.

In various embodiments: the costimulatory domain is selected from the group consisting of: a CD28 costimulatory domain or a variant thereof having 1-5 amino acid modifications, a 4-1BB costimulatory domain or a variant thereof having 1-5 amino acid modifications and an OX40 costimulatory domain or a variant thereof having 1-5 amino acid modifications; the transmembrane domain is selected from: a CD4 transmembrane domain or variant thereof having 1-5 amino acid modifications, a CD8 transmembrane domain or variant thereof having 1-5 amino acid modifications, a CD28 transmembrane domain or a variant thereof having 1-5 amino acid modifications, and a CD3ζ transmembrane domain or a variant thereof having 1-5 amino acid modifications; a costimulatory domain; and CD3ζ signaling domain of a variant thereof having 1-5 amino acid modifications; and the spacer domain is selected from the group consisting of: IgG4 hinge (S→P), IgG4 hinge, IgG4 hinge (S228P)+linker, CD28 hinge, CD8 hinge-48aa, CD8 hinge-45aa, IgG4(HL-CH3), IgG4(L235E,N297Q), IgG4(S228P, L235E,N297Q), and IgG4(CH3), and a variant of each of IgG4 hinge (S→P), IgG4 hinge, IgG4 hinge (S228P)+linker, CD28 hinge, CD8 hinge-48aa, CD8 hinge-45aa, IgG4(HL-CH3), IgG4(L235E,N297Q), IgG4(S228P, L235E,N297Q), and IgG4(CH3) thereof having 1-5 amino acid modifications.

In various embodiments: (1) the BAFF-R scFv includes a light chain variable region and a heavy chain variable region, wherein the light chain variable region includes: CDR L1 (SEQ ID NO:1), CDR L2 (AAS) and CDR L3 (SEQ ID NO:3); and the heavy chain variable region includes: CDR H1 (SEQ ID NO:4), CDR H2 (SEQ ID NO:5), and CDR H3 (SEQ ID NO:6); (2) the BAFF-R scFv includes a light chain variable region and a heavy chain variable region, wherein the light chain variable region includes: CDR L1 (SEQ ID NO:7), CDR L2 (YTS) and CDR L3 (SEQ ID NO:9); and the heavy chain variable region includes: CDR H1 (SEQ ID NO:10), CDR H2 (SEQ ID NO:11), and CDR H3 (SEQ ID NO:12); (3) the BAFF-R scFv includes: a heavy chain variable domain selected from: Chi90 HC, Hu90 HC-1, Hu90 HC-2, Hu90 HC-3, Chi55 HC, Hu55 HC-1, Hu55 HC-2, and Hu55 HC-3 and a light chain variable domain selected from: Chi90 LC, Hu90 LC-1, Hu90 LC-2, Hu90 LC-3, Chi55 LC, Hu55 LC-1, Hu55 LC-2, and Hu55 LC-3; (4) the BAFF-R scFv includes a light chain variable domain having an amino acid sequence selected from SEQ ID NOs: 17-20 and 25-28; (5) the BAFF-R scFv includes a heavy chain variable domain having an amino acid sequence selected from SEQ ID NOs: 13-16 and 21-24; (6) the CD19 scFv comprises a VL comprising the amino acid sequence (SEQ ID NO: 30)
DIQMTQTTSSLSASLGDRVTISCRASQDISKYLNWYQQKPDGTVKLLIY
HTSRLHSGVPSRFSGSGSGTDYSLTISNLEQEDIATYFCQQGNTLPYTF
GGGTKLEIT and a VH comprising the amino acid sequence EVK (SEQ ID NO: 31)
LQESGPGLVAPSQSLSVTCTVSGVSLPDYGVSWIRQPPRKGLEWLGVIW
GSETTYYNSALKSRLTIIKDNSKSQVFLKIVINSLQTDDTAIYYCAKHY
YYGGSYAMDYWGQGTSVTVSS.

Also described herein is a vector comprising one or more of the nucleic acid molecules described above. In various embodiments the vector is a lentiviral vector. Also described is a population of human T cells transduced by a vector described herein.

Also described is a method of treating cancer in a subject in need thereof comprising administering to a subject a therapeutically effective amount of a composition comprising a population of human T cells as described herein. In various embodiments of the method: the cancer is lymphoma, leukemia or myeloma; the lymphoma is mantle cell lymphoma, follicular lymphoma, diffuse large B-cell lymphoma, marginal zone lymphoma or Burkitt's lymphoma; the leukemia is acute lymphoblastic leukemia, chronic lymphocytic leukemia or hairy cell leukemia; the myeloma is multiple myeloma; the population of T cells are autologous or allogeneic to the patient; and the population of human T cells comprise cells comprise CD4+ cell and CD8+ cells.

In some embodiments, the BAFF-R scFv includes a light chain variable region and a heavy chain variable region, wherein the light chain variable region includes CDR L1 as set forth in SEQ ID NO:7, a CDR L2 of YTS and a CDR L3 as set forth in SEQ ID NO:9; and the heavy chain variable region includes a CDR H1 as set forth in SEQ ID NO:10, a CDR H2 as set forth in SEQ ID NO:11, and a CDR H3 as set forth in SEQ ID NO:12. In embodiments, the antibody is a humanized antibody.

In some embodiments, the BAFF-R scFv includes: CDR L1 of SEQ ID NO:1 or 7, CDR L2 of AAS or YTS, CDR L3 of SEQ ID NO:3 or 9, CDR H1 of SEQ ID NO:4 or 10, CDR H2 of SEQ ID NO:5 or 11, and CDR H3 of SEQ ID NO:7 or 13.

In some embodiments, the portion of the BAFF-R scFv includes: the light chain variable domain of monoclonal antibody H90 and the heavy chain variable domain of monoclonal antibody H90 or the light chain variable domain of monoclonal antibody H55 and the heavy chain variable domain of monoclonal antibody H55. The heavy and light chain variable domains can be joined by a linker of, 5-100, 10-50 or 10-20 amino acids (e.g., GGGGSGGGGSGGGGS; SEQ ID NO:69).

In some embodiments, the BAFF-R scFv includes: a) a humanized variant of the light chain variable domain of monoclonal antibody H90 and a humanized variant of the heavy chain variable domain of monoclonal antibody H90; or b) a humanized variant of the light chain variable domain of monoclonal antibody H55 and a humanized variant of the heavy chain variable domain of monoclonal antibody H55. The heavy and light chain variable domains can be joined by a linker of 10-20 amino acids (e.g., GGGGSGGGGSGGGGS; SEQ ID NO:69). In some cases, the humanized variant of the H90 light chain variable domain is selected from: Hu90 LC-1, Hu90 LC-2 and Hu90 LC-3 and the humanized variant of the H90 heavy chain variable domain is selected from: Hu90 HC-1, Hu90 HC-2 and Hu90 HC-3. In some cases, the humanized variant of the H55 light chain variable domain is selected from: Hu55 LC-1, Hu55 LC-2 and Hu55 LC-3 and the humanized variant of the H55 heavy chain variable domain is selected from: Hu55 HC-1, Hu55 HC-2 and Hu90 HC-3.

In embodiments, the BAFF-R scFv light chain variable region includes a serine at a position corresponding to Kabat position 7. In embodiments, the light chain variable region includes a proline at a position corresponding to Kabat position 8. In embodiments, the light chain variable region includes a valine at a position corresponding to Kabat position 15. In embodiments, the light chain variable region includes a threonine at a position corresponding to Kabat position 22. In embodiments, the light chain variable region includes a glutamine at a position corresponding to Kabat position 24. In embodiments, the light chain variable region includes a glycine at a position corresponding to Kabat position 41. In embodiments, the light chain variable region includes a lysine at a position corresponding to Kabat position 42. In embodiments, the light chain variable region includes an alanine at a position corresponding to Kabat position 43. In embodiments, the light chain variable region includes a proline at a position corresponding to Kabat position 44. In embodiments, the light chain variable region includes a threonine at a position corresponding to Kabat position 56. In embodiments, the light chain variable region includes a threonine at a position corresponding to Kabat position 72. In embodiments, the light chain variable region includes a phenylalanine at a position corresponding to Kabat position 73. In embodiments, the light chain variable region includes a glutamine at a position corresponding to Kabat position 79. In embodiments, the light chain variable region includes a valine at a position corresponding to Kabat position 104.

In embodiments, the BAFF-R scFv the light chain variable region includes a serine at a position corresponding to Kabat position 7, a proline at a position corresponding to Kabat position 8, a valine at a position corresponding to Kabat position 15, a threonine at a position corresponding to Kabat position 22, a glutamine or a serine at a position corresponding to Kabat position 24, a glycine at a position corresponding to Kabat position 41, a lysine at a position corresponding to Kabat position 42, an alanine or a threonine at a position corresponding to Kabat position 43, a proline at a position corresponding to Kabat position 44, a threonine at a position corresponding to Kabat position 56, a threonine at a position corresponding to Kabat position 72, a phenylalanine or a lysine at a position corresponding to Kabat position 73, a glutamine at a position corresponding to Kabat position 79 or a valine at a position corresponding to Kabat position 104.

In embodiments, the BAFF-R scFv the light chain variable region includes a binding framework region residue that is a serine at a position corresponding to Kabat position 7, a proline at a position corresponding to Kabat position 8, a valine at a position corresponding to Kabat position 15, a threonine at a position corresponding to Kabat position 22, a glutamine or a serine at a position corresponding to Kabat position 24, a glycine at a position corresponding to Kabat position 41, a lysine at a position corresponding to Kabat position 42, an alanine or a threonine at a position corresponding to Kabat position 43, a proline at a position corresponding to Kabat position 44, a threonine at a position corresponding to Kabat position 56, a threonine at a position corresponding to Kabat position 72, a phenylalanine or a lysine at a position corresponding to Kabat position 73, a glutamine at a position corresponding to Kabat position 79 or a valine at a position corresponding to Kabat position 104.

In embodiments, the BAFF-R scFv the heavy chain variable region includes a threonine or an alanine at a position corresponding to Kabat position 10. In embodiments, the heavy chain variable region includes a lysine at a position corresponding to Kabat position 11. In embodiments, the heavy chain variable region includes a valine at a position corresponding to Kabat position 12. In embodiments, the heavy chain variable region includes a threonine at a position corresponding to Kabat position 15. In embodiments, the heavy chain variable region includes a threonine at a position corresponding to Kabat position 19. In embodiments, the heavy chain variable region includes a threonine at a position corresponding to Kabat position 23. In embodiments, the heavy chain variable region includes a proline at a position corresponding to Kabat position 41. In embodiments, the heavy chain variable region includes an alanine at a position corresponding to Kabat position 44. In embodiments, the heavy chain variable region includes a proline or a threonine at a position corresponding to Kabat position 61. In embodiments, the heavy chain variable region includes an arginine at a position corresponding to Kabat position 66. In embodiments, the heavy chain variable region includes a threonine at a position corresponding to Kabat position 70. In embodiments, the heavy chain variable region includes a lysine at a position corresponding to Kabat position 75. In embodiments, the heavy chain variable region includes a valine at a position corresponding to Kabat position 79. In embodiments, the heavy chain variable region includes a threonine at a position corresponding to Kabat position 81. In embodiments, the heavy chain variable region includes a methionine at a position corresponding to Kabat position 82. In embodiments, the heavy chain variable region includes an asparagine at a position corresponding to Kabat position 82B. In embodiments, the heavy chain variable region includes a methionine at a position corresponding to Kabat position 82C. In embodiments, the heavy chain variable region includes a proline at a position corresponding to Kabat position 84. In embodiments, the heavy chain variable region includes a valine at a position corresponding to Kabat position 85. In embodiments, the heavy chain variable region includes a lysine at a position corresponding to Kabat position 108. In embodiments, the heavy chain variable region includes a valine at a position corresponding to Kabat position 109.

In embodiments, the BAFF-R scFv heavy chain variable region includes a threonine or an alanine at a position corresponding to Kabat position 10, a lysine at a position corresponding to Kabat position 11, a valine at a position corresponding to Kabat position 12, a threonine at a position corresponding to Kabat position 15, a threonine at a position corresponding to Kabat position 19, a threonine at a position corresponding to Kabat position 23, a proline at a position corresponding to Kabat position 41, an alanine at a position corresponding to Kabat position 44, a proline, a serine or a threonine at a position corresponding to Kabat position 61, an arginine at a position corresponding to Kabat position 66, a threonine at a position corresponding to Kabat position 70, a lysine at a position corresponding to Kabat position 75, a valine at a position corresponding to Kabat position 79, a threonine or a lysine at a position corresponding to Kabat position 81, a methionine at a position corresponding to Kabat position 82, an asparagine at a position corresponding to Kabat position 82B, a methionine at a position corresponding to Kabat position 82C, a proline at a position corresponding to Kabat position 84, a valine at a position corresponding to Kabat position 85, a lysine at a position corresponding to Kabat position 108 or a valine at a position corresponding to Kabat position 109.

In embodiments, the BAFF-R scFv heavy chain variable region includes a binding framework region residue that is a threonine or an alanine at a position corresponding to Kabat position 10, a lysine at a position corresponding to Kabat position 11, a valine at a position corresponding to Kabat position 12, a threonine at a position corresponding to Kabat position 15, a threonine at a position corresponding to Kabat position 19, a threonine at a position corresponding to Kabat position 23, a proline at a position corresponding to Kabat position 41, an alanine at a position corresponding to Kabat position 44, a proline, a serine or a threonine at a position corresponding to Kabat position 61, an arginine at a position corresponding to Kabat position 66, a threonine at a position corresponding to Kabat position 70, a lysine at a position corresponding to Kabat position 75, a valine at a position corresponding to Kabat position 79, a threonine or a lysine at a position corresponding to Kabat position 81, a methionine at a position corresponding to Kabat position 82, an asparagine at a position corresponding to Kabat position 82B, a methionine at a position corresponding to Kabat position 82C, a proline at a position corresponding to Kabat position 84, a valine at a position corresponding to Kabat position 85, a lysine at a position corresponding to Kabat position 108 or a valine at a position corresponding to Kabat position 109.

DESCRIPTION OF DRAWINGS

FIG. 2 depicts the amino acid sequence of an immature 1250 dual CAR, including signal sequence (SEQ ID NO:58). The mature CAR (SEQ ID NO:59) includes, from amino to carboxy terminus: a BAFF-R scFv, a linker, a CD19 scFv (derived from FMC63), an IgG4 (SmP/L235E, N297Q) spacer domain, a CD4 transmembrane domain, a 4-1BB cytoplasmic domain, a GGG linker, and a CD3 signaling domain.

FIG. 3 depicts the amino acid sequence of an immature 1296 dual CAR, including signal sequence (SEQ ID NO:60). The mature CAR (SEQ ID NO:61) includes, from amino to carboxy terminus: a CD19 scFv (derived from FMC63), a linker, a BAFF-R scFv, an IgG4 (SmP/L235E, N297Q) spacer domain, a CD4 transmembrane domain, a 4-1BB cytoplasmic domain, a GGG linker, and a CD3 signaling domain.

FIG. 4 depicts the amino acid sequence of an immature 1316 dual CAR, including signal sequence (SEQ ID NO:62). The mature CAR (SEQ ID NO:63) includes, from amino to carboxy terminus: a CD19 VL (derived from FMC63), a GGGS (SEQ ID NO:70) linker, a BAFF-R scFv, a CD19 VH (derived from FMC63), an IgG4 (SmP/L235E, N297Q) spacer domain, a CD4 transmembrane domain, a 41BB cytoplasmic domain, a GGG linker, and a CD3 signaling domain.

FIG. 5 depicts the amino acid sequence of: (A) an immature CD19 CAR, including signal sequence (SEQ ID NO:64) and B an immature BAFF-R CAR including a signal sequence (SEQ ID NO:66). The mature CD19 CAR (SEQ ID NO:65) includes, from amino to carboxy terminus: a CD19 scFv (derived from FMC63), an IgG4 (SmP/L235E, N297Q) spacer domain, a CD28 transmembrane domain, a CD28(GG) cytoplasmic domain, a GGG linker, and a CD3 signaling domain. The mature BAFF-R CAR (SEQ ID NO:67) includes, from amino to carboxy terminus: a BAFF-R scFv, an IgG4 (SmP/L235E,N297Q) spacer domain, a CD4 transmembrane domain, a 4-1BB cytoplasmic domain, a GGG linker, and a CD3 signaling domain.

FIG. 9 depicts the results of analysis related to development of cells lines used to develop a model for studying BAFF-R/CD19 dual CAR. FACS histograms of Nalm-6 knockout lines used for dual CAR model development. Nalm-6 B-ALL tumor line was gene edited with CRISPR to knockout BAFF-R (left) or CD19 (right). Surface protein expression was confirmed by FACS staining with commercial BAFF-R and CD19 antibodies. Nalm-6 wildtype (WT) was used as controls.

FIG. 11A-11B depicts the activity of BAFF-R/CD19 Dual CAR in BAFF-R-plus CD19-deficient mixed B-ALL tumor. A) Bioluminescence images of NSG mice following IV tumor challenge on day 0 with a mixture of $1\times10^5$ RFP-negative, luciferase-expressing Nalm-6-CD19KO plus $2.5\times10^5$ RFP-positive, luciferase-expressing Nalm-6-BAFF-RKO tumor cells. Groups of 5 tumor-bearing mice each were then randomly assigned to treatment with either $2.5\times10^6$ CD4 $T_N$ CAR-T+$10^6$ CD8 $T_N$ 1296 or 1316 dual CART cells/mouse IV on day 10, as a single infusion. Non-transduced CD4/CD8 T cells from the same donor were used as allogeneic controls (non-CAR). B) Kaplan-Meier plots of overall survival are shown. Log-rank test compare experimental groups as shown. 1316 treatment conferred significant prolonged survival compared to 1296 treatment.

FIG. 13A-13B depicts the activity of $T_{N/MEM}$ 1316 BAFF-R/CD19 Dual CAR in mixed B-ALL tumor. A) Bioluminescence images of NSG mice following IV tumor challenge on day 0 with a mixture of $1\times10^5$ RFP-negative, luciferase-expressing Nalm-6-CD19K0 plus $1\times10^5$ RFP-positive, luciferase-expressing Nalm-6-BAFF-RKO tumor cells. Groups of 5 tumor-bearing mice each were then randomly assigned to treatment with 1316 dual CAR T cells/mouse IV on day 9, as a single infusion of either low dose ($2.8\times10^6$ $T_{N/MEM}$), high dose ($5.6\times10^6$ $T_{N/MEM}$), which yielded $1\times10^6$ and $2\times10^6$ BAFF-R CAR T cells, respectively. 2.5 or $5\times10^6$ non-transduced $T_{N/MEM}$ cells from the same donor were used as allogeneic controls (non-CAR). B) Kaplan-Meier plots of overall survival are shown. Log-rank test compare experimental groups as shown. No significant difference in survival between the two dosing were observed.

DETAILED DESCRIPTION

The BAFF-R/CD19 dual CAR and BAFF-R/CD19 bicistronic CAR can employ any of a variety of BAFF-R scFv and CD19 scFv and, in the case of BAFF-R/CD19 dual CAR in which a first scFv is located between the variable domains of a second scFv, any of a variety of VL and VH can be used.

Figure 1:
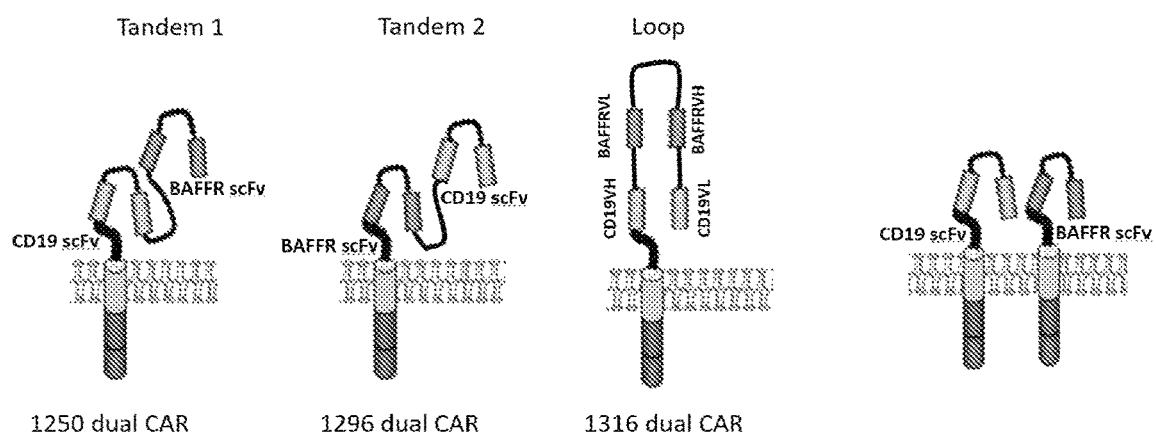
FIG. 1 depicts schematic drawings of two example of tandem constructs and one example of a loop construct for BAFF-R/CD19 dual CARs. Also shown is an example of bicistronic construct in which a single cell expresses two CARs, one targeted to BAFF-R and one targeted to CD19.
Figure 6:
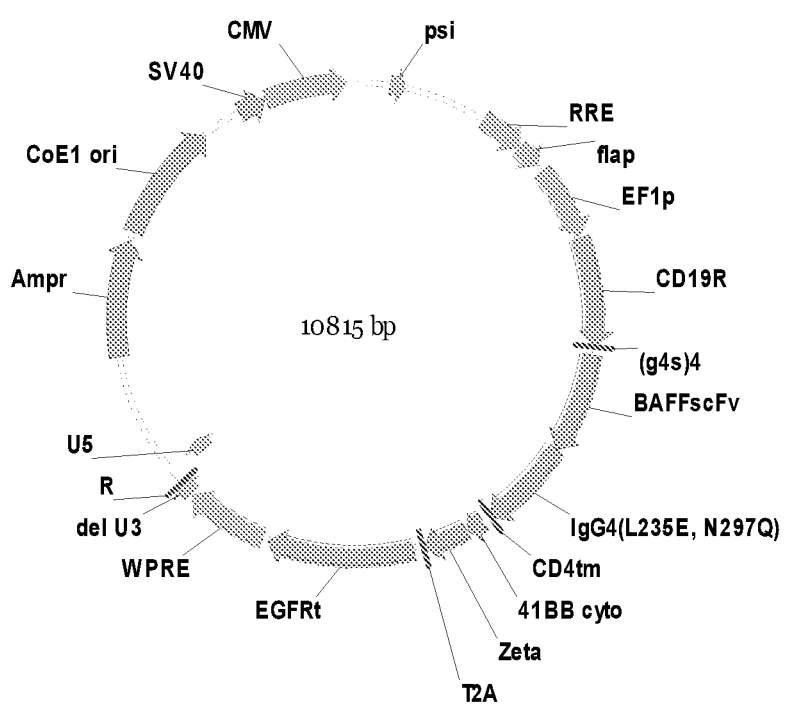
FIG. 6 is a schematic drawing of an example of a vector for expressing a BAFF-R/CD19 dual CAR. BAFF-R and CD19 scFv elements can be varied to express the different arrangement of dual CARs. Truncated EGFR (EGFRt) is expressed as a selection marker.

FIG. 1 depicts schematic drawings of two example of tandem construct, one in which the BAFF-R scFv is amino terminal to the CD19 scFv and one in which the CD19 scFv is amino terminal to the BAFF-R scFv. Also depicted is one example of a loop construct for BAFF-R/CD29 dual CARs. In this example a BAFF-R is located between the CD19 VL (amino terminal to the scFv) and the CD19 VH domain (carboxy terminal to the scFv). Also shown is an example of bicistronic construct in which a single cell expresses two CARs, one targeted to BAFF-R and one targeted to CD19.

BAFF-R scFv Sequences

The BAFF-R scFv sequences used in BAFF-R/CD19 dual CAR can be derived from two monoclonal antibodies, Clone 90 and Clone 55 described in greater detail in US PCT/

US2017/036181. For example, the VL can include the C90 CDR sequences or the C55 CDR sequences described below.

C90 CDR L1:
(SEQ ID NO: 1)
ESVDNYGISF

C90 CDR L2:
AAS

C90 CDR L3:
(SEQ ID NO: 3)
QQSKEVPWT

C90 CDR H1:
(SEQ ID NO: 4)
GDSITSGY

C90 CDR H2:
(SEQ ID NO: 5)
ISYSGST

C90 CDR H3:
(SEQ ID NO: 6)
ASPNYPFYAMDY

C55 CDR L1:
(SEQ ID NO: 7)
QDISNY

C55 CDR L2:
YTS

C55 CDR L3:
(SEQ ID NO: 9)
FSELPWT

C55 CDR H1:
(SEQ ID NO: 10)
GFSLSTSGMG

C55 CDR H2:
(SEQ ID NO: 11)
IWWDDDK

C55 CDR H3:
(SEQ ID NO: 12)
ARSFGYGLDY

Among the suitable heavy chain variable domains (VH) for use in the BAFF-R scFv of a dual CAR are the following heavy chain variable domains derived from monoclonal antibody Clone 90 (Described in greater detail in PCT/US2017/036181. Of these, Hu90 HC-1, HC-2 and HC-3 are humanized.

Chi90 HC:
(SEQ ID NO: 13)
MYRMQLLSCIALSLALVTNSEVQLQESGPSLVKPSQTLSLTCSVTGDSI
TSGYWNWIRKFPGNKLEYMGYISYSGSTYYNPSLKSRISITRDTSKNQY
YLQLNSVTPEDTATYYCASPNYPFYAMDYWGQGTSVTVSSDI

Hu90 HC-1:
(SEQ ID NO: 14)
MDPKGSLSWRILLFLSLAFELSYGQVQLQESGPGLVKPSQTLSLTCTVS
GDSITSGYWNWIRQHPGKGLEYIGYISYSGSTYYNPSLKSRVTISRDTS
KNQFSLKLSSVTAADTAVYYCASPNYPFYAMDYWGQGTLVTVSS

Hu90 HC-2:
(SEQ ID NO: 15)
MDPKGSLSWRILLFLSLAFELSYGEVQLQESGPGLVKPSQTLSLTCTVS
GDSITSGYWNWIRQHPGKGLEYIGYISYSGSTYYNPSLKSRVTISRDTS
KNQYSLKLSSVTAADTAVYYCASPNYPFYAMDYWGQGTLVTVSS

Hu90 HC-3:
(SEQ ID NO: 16)
MDPKGSLSWRILLFLSLAFELSYGEVQLQESGPGLVKPSETLSLTCSVS
GDSITSGYWNWIRQPPGKGLEYIGYISYSGSTYYNPSLKSRVTISRDTS
KNQYSLRLSSVTAADTALYYCASPNYPFYAMDYWGQGTRVTVSS

Among the suitable light chain variable domains (VL) for use in the BAFF-R scFv of a dual CAR are the following heavy chain variable domains derived from monoclonal antibody Clone 90 (Described in greater detail in PCT/US2017/036181. Of these, Hu90 LC-1, LC-2 and LC-3 are humanized.

Chi90 LC:
(SEQ ID NO: 17)
MYRMQLLSCIALSLALVTNSDIVLTQSPASLAVSLGQRATISCRASESV
DNYGISFMNWFQQKPGQPPKLLIYAASNQGSGVPARFSGSGSGTDFSLN
IHPMEEDDTAMYFCQQSKEVPWTFGGGTKLEIKTMEIKR

HuC90 LC-1:
(SEQ ID NO: 18)
METDTLLLWVLLLWVPGSTGEIVLTQSPATLSLSPGERATLSCRASESV
DNYGISFLNWFQQKPGQAPRLLIYAASNRATGIPARFSGSGSGTDFTLT
ISSLEPEDFAVYYCQQSKEVPWTFGGGTKVEIKRTV

Hu90 LC-2:
(SEQ ID NO: 19)
METDTLLLWVLLLWVPGSTGDIVLTQSPATLSLSPGERATLSCRASESV
DNYGISFMNWFQQKPGQAPRLLIYAASNRATGIPARFSGSGSGTDFTLT
ISSLEPEDFAVYYCQQSKEVPWTFGGGTKVEIKRTV

HuC90 LC-3:
(SEQ ID NO: 20)
METDTLLLWVLLLWVPGSTGDIVNITQSPSSLSASVGDRVTITCRASES
VDNYGISFMNWFQQKPGKAPKLLIYAASNLGSGVPSRFSGSGSGTDFTL
TISSLQPEDFATYYCQQSKEVPWTFGQGTKVEIKRTV

Also among the suitable heavy chain variable domains (VH) for use in the BAFF-R scFv of a dual CAR are the following heavy chain variable domains derived from monoclonal antibody Clone 55 (described in greater detail in PCT/US2017/036181). Of these, Hu55 HC-1, HC-2 and HC-3 are humanized.

Chi55 HC:
(SEQ ID NO: 21)
MYRMQLLSCIALSLALVTNSQVTLKESGPGILKPSQTLSLTCSFSGFSL
STSGMGVGWIRQPSGKGLEWLAHIWWDDDKYYNSSLKSHLTISKDTSRN
QVFLKITSVDTADTATYYCARSFGYGLDYWGQGTTLTVSSAS

Hu55 HC-1:
(SEQ ID NO: 22)
MDPKGSLSWRILLFLSLAFELSYGQVTLKESGPTLVKPTQTLTLTCTFS
GFSLSTSGMGVGWIRQPPGKALEWLAHIWWDDDKYYNPSLKSRLTITKD
TSKNQVVLTMTNMDPVDTATYYCARSFGYGLDYWGQGTLVTVSS

Hu55 HC-2:
(SEQ ID NO: 23)
MDPKGSLSWRILLFLSLAFELSYGQVTLKESGPTLVKPTQTLTLTCTFS
GFSLSTSGMGVGWIRQPPGKALEWLAHIWWDDDKYYNSSLKSRLTITKD
TSKNQVVLTMTNMDPVDTATYYCARSFGYGLDYWGQGTLVTVSS

Hu55 HC-3:
(SEQ ID NO: 24)
MDPKGSLSWRILLFLSLAFELSYGQVTLKESGPALVKPTQTLTLTCTFS
GFSLSTSGMGVGWIRQPPGKALEWLAHIWWDDDKYYNTSLKSRLTITKD
TSKNQVVLKMTNMDPVDTATYYCARSFGYGLDYWGQGTLVTVSS

Also among the suitable light chain variable domains (VL) for use in the BAFF-R scFv of a dual CAR are the following heavy chain variable domains derived from monoclonal antibody Clone 90 (described in greater detail in PCT/US2017/036181). Of these, Hu55 LC-1, LC-2 and HC-3 are humanized.

Chi55 LC:
(SEQ ID NO: 25)
MYRMQLLSCIALSLALVTNSDIQMTQTTSSLSASLGDRVTISCSASQDI
SNYLNWYQQKPDGTVKLLIYYTSSLHSGVPSRFSGSGSGTDYSLTISSL
EPEDIATYYCHQFSELPWTFGGGTKLEIKRT

Hu55 LC-1:
(SEQ ID NO: 26)
METDTLLLWVLLLWVPGSTGDIQMTQSPSSLSASVGDRVTITCQASQDI
SNYLNWYQQKPGKAPKLLIYYTSSLHTGVPSRFSGSGSGTDYTFTISSL
QPEDIATYYCHQFSELPWTFGGGTKVEIKRTV

Hu55 LC-2:
(SEQ ID NO: 27)
METDTLLLWVLLLWVPGSTGDIQMTQSPSSLSASVGDRVTITCSASQDI
SNYLNWYQQKPGKAPKLLIYYTSSLHTGVPSRFSGSGSGTDYTLTISSL
QPEDIATYYCHQFSELPWTFGGGTKVEIKRTV

Hu55 LC-3:
(SEQ ID NO: 28)
METDTLLLWVLLLWVPGSTGDIQMTQSPSSLSASVGDRVTITCQASQDI
SNYLNWYQQKPGKTPKLLIYYTSSLHTGVPSRFSGSGSGTDYTLTISSL
QPEDIATYYCHQFSELPWTFGGGTKVEIKRTV

The VH and VL domains of the BAFF-R scFv can be modified. Thus, each of Hu90 LC-1, Hu90 LC-2, Hu90 LC-3, Hu90 HC-1, Hu90 HC-2 and Hu90 HC-3, Hu55 LC-1, Hu55 LC-2, Hu55 LC-3, Hu55 HC-1, Hu55 HC-2 and Hu90 HC-3 in a scFv can include 1, 2, 3, 4 or 5 single amino acid substitutions. In some cases, the substitutions are confined to the framework regions (FRs) rather than the CDRs. In some cases, the substitutions are conservative substitutions.

The position of CDRs and FRs may be defined by the Kabat numbering system (Kabat et al., Sequences of Proteins of Immunological Interest, Fifth Edition, U.S. Department of Health and Human Services, U.S. Government Printing Office (1991)). Likewise, the positions occupied by individual residues within the light or the heavy chain of an antibody may be defined by the Kabat numbering system. Therefore, the location of residues required for binding within a humanized light chain and a humanized heavy chain of a humanized antibody may be defined by the position of the residue according to the Kabat numbering system as is well known in the art. As described above, a humanized antibody may be an antibody having CDRs from a donor antibody (e.g. mouse) and variable region framework (FR) from a human antibody. The framework regions (FRs) are said to hold the CDRs in place in a humanized antibody. Proceeding from the amino-terminus, these regions are designated FR L1, FR L2, FR L3, and FR L4 for the light chain and FR H1, FR H2, FR H3, and FR H4, for the heavy chain, respectively.

CD19 scFv Sequences

A variety of scFv targeting CD19 can be used in BAFF-R/CD19 dual CAR.

FMC63 scFv:
(SEQ ID NO: 29)
IPDIQMTQTTSSLSASLGDRVTISCRASQDISKYLNWYQQ

KPDGTVKLLI YHTSRLHSGV PSRFSGSGSGTDYSLTISNLEQEDIATYFC

QQGNTLPYTFGGGTKLEITGSTSGSGKPGSGEGSTKGEVKLQESGPGLVA

PSQSLSVTCT VSGVSLPDYG VSWIRQPPRKGLEWLGVIWGSETTYYNSAL

KSRLTIIKDN SKSQVFLKMN SLQTDDTAIYYCAKHYYYGGSYAMDYWGQG

TSVTVSS.

FMC63 VL:
(SEQ ID NO: 30)
DIQMTQTTSSLSASLGDRVTISCRASQDISKYLNWYQQ
KPDGTVKLLIYHTSRLHSGVPSRFSGSGSGTDYSLTISNLEQEDIATYFC
QQGNTLPYTFGGGTKLEIT.

FMC63 VH:
(SEQ ID NO: 31)
EVK LQESGPGLVAPSQSLSVTCTVSGVSLPDYG
VSWIRQPPRKGLEWLGVIWGSETTYYNSALKSRLTIIKDN SKSQVFLKMN
SLQTDDTAIYYCAKHYYYGGSYAMDYWGQGTSVTVSS.

Additional scFv that bind CD19 are described in US 2016/0152723 and in WO 2016/033570

Spacer Region

The dual CAR and bicistronic CAR described herein can include a spacer located between the targeting domain (e.g., the scFv) and the transmembrane domain. A variety of different spacers can be used. Some of them include at least portion of a human Fc region, for example a hinge portion of a human Fc region or a CH3 domain or variants thereof. Table 1 below provides various spacers that can be used in the CARs described herein.

TABLE 1

Examples of Spacers

| Name | Length | Sequence |
| --- | --- | --- |
| a3 | 3 aa | AAA |
| linker | 10 aa | GGGSSGGGSG (SEQ ID NO: 32) |
| IgG4 hinge (S→P) (S228P) | 12 aa | ESKYGPPCPPCP (SEQ ID NO: 33) |
| IgG4 hinge | 12 aa | ESKYGPPCPSCP (SEQ ID NO: 34) |
| IgG4 hinge(S228P) + linker | 22 aa | ESKYGPPCPPCPGGGSSGGGSG (SEQ ID NO: 35) |
| CD28 hinge | 39 aa | IEVMYPPPYLDNEKSNGTIIHVKGKHLCPSPLFPGPSKP (SEQ ID NO: 36) |
| CD8 hinge-48 aa | 48 aa | AKPTTTPAPRPPTPAPTIASQPLSLRPEACRPAAGGAVHTRGLDFACD (SEQ ID NO: 37) |
| CD8 hinge-45 aa | 45 aa | TTTPAPRPPTPAPTIASQPLSLRPEACRPAAGGAVHTRGLDFACD (SEQ ID NO: 38) |
| IgG4(HL-CH3) (includes S228P in hinge) | 129 aa | ESKYGPPCPPCPGGGSSGGGSGGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 39) |
| IgG4(L235E, N297Q) | 229 aa | ESKYGPPCPSCPAPEFEGGPSVFLFPPKPKDTLMISRTPEVTCVVVDVSQEDPEVQFNWYVDGVEVHQAKTKPREEQFQSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 40) |
| IgG4(S228P, L235E, N297Q) | 229 aa | ESKYGPPCPPCPAPEFEGGPSVFLFPPKPKDTLMISRTPEVTCVVVDVSQEDPEVQFNWYVDGVEVHQAKTKPREEQFQSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLIVDKSRWQEGNVFSCSVMHEALHNHYTQKSLSLSLGK (SEQ ID NO: 41) |
| IgG4(CH3) | 107 aa | GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 42) |

Some spacer regions include all or part of an immunoglobulin (e.g., IgG1, IgG2, IgG3, IgG4) hinge region, i.e., the sequence that falls between the CH1 and CH2 domains of an immunoglobulin, e.g., an IgG4 Fc hinge or a CD8 hinge. Some spacer regions include an immunoglobulin CH3 domain or both a CH3 domain and a CH2 domain. The immunoglobulin derived sequences can include one or more amino acid modifications, for example, 1, 2, 3, 4 or 5 substitutions, e.g., substitutions that reduce off-target binding.

The hinge/linker region can also comprise a IgG4 hinge region having the sequence ESKYGPPCPSCP (SEQ ID NO:34) or ESKYGPPCPPCP (SEQ ID NO:33).

The hinge/linger region can also comprise the sequence ESKYGPPCPPCP (SEQ ID NO:33) followed by the linker sequence GGGSSGGGSG (SEQ ID NO:32) followed by IgG4 CH3 sequence GQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO:41). Thus, the entire linker/spacer region can comprise the sequence: ESKYGPPCPPCPGGGSSGGGSGGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK (SEQ ID NO: 39). In some cases, the spacer has 1,2,3,4, or 5 single amino acid changes (e.g., conservative changes). In some cases, the IgG4 Fc hinge/linker region that is mutated at two positions (L235E; N297Q) in a manner that reduces binding by Fc receptors (FcRs).

Transmembrane Domain

A variety of transmembrane domains can be used in the dual CAR and biscistonic CAR described herein. Table 2 includes examples of suitable transmembrane domains. Where a spacer region is present, the transmembrane domain is located carboxy terminal to the spacer region.

TABLE 2

Examples of Transmembrane Domains

| Name | Accession | Length | Sequence |
| --- | --- | --- | --- |
| CD3z | J04132.1 | 21 aa | LCYLLDGILFIYGVILTALFL (SEQ ID NO: 43) |
| CD28 | NM_006139 | 27 aa | FWVLVVVGGVLACYSLLVTVAFIIFWV (SEQ ID |

TABLE 2-continued

Examples of Transmembrane Domains

| Name | Accession | Length | Sequence |
|---|---|---|---|
| | | | NO: 44) |
| CD28(M) | NM_006139 | 28 aa | MFWVLVVVGGVLACYSLLVIVAFIIFWV (SEQ ID NO: 45) |
| CD4 | M35160 | 22 aa | MALIVLGGVAGLLLFIGLGIFF (SEQ ID NO: 46) |
| CD8tm | NM_001768 | 21 aa | IYIWAPLAGTCGVLLLSLVIT (SEQ ID NO: 47) |
| CD8tm2 | NM_001768 | 23 aa | IYIWAPLAGTCGVLLLSLVITLY (SEQ ID NO: 48) |
| CD8tm3 | NM_001768 | 24 aa | IYIWAPLAGTCGVLLLSLVITLYC (SEQ ID NO: 49) |
| 41BB | NM_001561 | 27 aa | IISFFLALTSTALLFLLFF LTLRFSVV (SEQ ID NO: 50) |

Costimulatory and CD3zeta Domain

The costimulatory domain can be any domain that is suitable for use with a CD3ζ signaling domain. In some cases, the costimulatory domain is a CD28 costimulatory domain that includes a sequence that is at least 90%, at least 95%, at least 98% identical to or identical to: RSKRSRGGHSDYMNMTPRRPGPTRKHYQPYAPPRD-FAAYRS (SEQ ID NO:52; LL to GG amino acid change double underlined). In some cases, the CD28 co-signaling domain has 1, 2, 3, 4 of 5 amino acid changes (preferably conservative and preferably not in the underlined GG sequence) compared to SEQ ID NO:23. In some cases the co-signaling domain is a 4-1BB co-signaling domain that includes a sequence that is at least 90%, at least 95%, at least 98% identical to or identical to: KRGRKKLLY-IFKQPFMRPVQTTQEEDGCSCRFPEEEEGGCEL (SEQ ID NO:54). In some cases, the 4-1BB co-signaling domain has 1, 2, 3, 4 or 5 amino acid changes (preferably conservative) compared to SEQ ID NO:24.

The costimulatory domain(s) are located between the transmembrane domain and the CD3ζ signaling domain. Table 3 includes examples of suitable costimulatory domains together with the sequence of the CD3ζ signaling domain.

(e.g., 1 or 2) amino acid modifications, a CD28 costimulatory domain or a variant thereof having 1-5 (e.g., 1 or 2) amino acid modifications, a 4-1BB costimulatory domain or a variant thereof having 1-5 (e.g., 1 or 2) amino acid modifications and an OX40 costimulatory domain or a variant thereof having 1-5 (e.g., 1 or 2) amino acid modifications. In certain embodiments, a 4-1BB costimulatory domain or a variant thereof having 1-5 (e.g., 1 or 2) amino acid modifications in present. In some embodiments there are two costimulatory domains, for example a CD28 co-stimulatory domain or a variant thereof having 1-5 (e.g., 1 or 2) amino acid modifications (e.g., substitutions) and a 4-1BB co-stimulatory domain or a variant thereof having 1-5 (e.g., 1 or 2) amino acid modifications (e.g., substitutions). In various embodiments the 1-5 (e.g., 1 or 2) amino acid modification are substitutions. The costimulatory domain is amino terminal to the CD3ζ signaling domain and in some cases a short linker consisting of 2-10, e.g., 3 amino acids (e.g., GGG) is positioned between the costimulatory domain and the CD3ζ signaling domain.

CD3ζ Signaling Domain

The CD3ζ Signaling domain can be any domain that is suitable for use with a CD3ζ signaling domain. In some

TABLE 3

CD4 Domain and Examples of Costimulatory Domains

| Name | Accession | Length | Sequence |
|---|---|---|---|
| CD3ζ | J04132.1 | 113 aa | RVKFSRSADAPAYQQGQNQLYNELNLGRREEYDVLDK RRGRDPEMGGKPRRKNPQEGLYNELQKDKMAEAYSEI GMKGERRRGKGHDGLYQGLSTATKDTYDALHMQALP PR (SEQ ID NO: 51) |
| CD28 | NM_006139 | 42 aa | RSKRSRLLHSDYMNMTPRRPGPTRKHYQPYAPPRDFA AYRS (SEQ ID NO: 52) |
| CD28gg* | NM_006139 | 42 aa | RSKRSRGGHSDYMNMTPRRPGPTRKHYQPYAPPRDF AAYRS (SEQ ID NO: 53) |
| 4-1BB | NM_001561 | 42 aa | KRGRKKLLYIFKQPFMRPVQTTQEEDGCSCRFPEEEEG GCEL (SEQ ID NO: 54) |
| OX40 | | 42 aa | ALYLLRRDQRLPPDAHKPPGGGSFRTPIQEEQADAHST LAKI (SEQ ID NO: 55) |

In various embodiments: the costimulatory domain is selected from the group consisting of: a costimulatory domain depicted in Table 3 or a variant thereof having 1-5 cases, the CD3ζ signaling domain includes a sequence that is at least 90%, at least 95%, at least 98% identical to or identical to:

(SEQ ID NO: 51)
RVKFSRSADAPAYQQGQNQLYNELNLGRREEYDVLDKRRGRDPEMGGKP
RRKNPQEGLYNELQKDKMAEAYSEIGMKGERRRGKGEIDGLYQGLSTAT
KDTYDALHMQALPPR.

In some cases, the CD3ζ signaling has 1, 2, 3, 4 of 5 amino acid changes (preferably conservative) compared to SEQ ID NO:51.

Truncated EGFR

The CD3ζ signaling domain can be followed by a ribosomal skip sequence (e.g., LEGGGEGRGSLLTCGD-VEENPGPR; SEQ ID NO:56) and a truncated EGFR having a sequence that is at least 90%, at least 95%, at least 98% identical to or identical to:

(SEQ ID NO: 57)
LVTSLLLCELPHPAFLLIPRKVCNGIGIGEFKDSLSINATNIKHFKNCT

SISGDLHILPVAFRGDSFTHTPPLDPQELDILKTVKEITGFLLIQAWPE

NRTDLHAFENLEIIRGRTKQHGQFSLAVVSLNITSLGLRSLKEISDGDV

IISGNKNLCYANTINWKKLFGTSGQKTKIISNRGENSCKATGQVCHALC

SPEGCWGPEPRDCVSCRNVSRGRECVDKCNLLEGEPREFVENSECIQCH

PECLPQAMNITCTGRGPDNCIQCAHYIDGPHCVKTCPAGVMGENNTLVW

KYADAGHVCHLCHPNCTYGCTGPGLEGCPTNGPKIPSIATGMVGALLLL

LVVALGIGLFM.

In some cases, the truncated EGFR has 1, 2, 3, 4 of 5 amino acid changes (preferably conservative) compared to SEQ ID NO:57.

An amino acid modification refers to an amino acid substitution, insertion, and/or deletion in a protein or peptide sequence. An "amino acid substitution" or "substitution" refers to replacement of an amino acid at a particular position in a parent peptide or protein sequence with another amino acid. A substitution can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein. The following are examples of various groupings of amino acids: 1) Amino acids with nonpolar R groups: Alanine, Valine, Leucine, Isoleucine, Proline, Phenylalanine, Tryptophan, Methionine; 2) Amino acids with uncharged polar R groups: Glycine, Serine, Threonine, Cysteine, Tyrosine, Asparagine, Glutamine; 3) Amino acids with charged polar R groups (negatively charged at pH 6.0): Aspartic acid, Glutamic acid; 4) Basic amino acids (positively charged at pH 6.0): Lysine, Arginine, Histidine (at pH 6.0). Another grouping may be those amino acids with phenyl groups: Phenylalanine, Tryptophan, and Tyrosine.

The CAR can include a sequence that is at least 90%, at least 95%, at least 98% identical to or identical to the mature amino acid sequence depicted in FIG. 9 (SEQ ID Nos: 29-40), either including or excluding the GMCSFRa signal sequence and either including or excluding the T2A ribosomal skip sequence and the truncated EGFRt).

In some cases, the CAR can be produced using a vector in which the CAR open reading frame is followed by a T2A ribosome skip sequence and a truncated EGFR (EGFRt), which lacks the cytoplasmic signaling tail. In this arrangement, co-expression of EGFRt provides an inert, non-immunogenic surface marker that allows for accurate measurement of gene modified cells, and enables positive selection of gene-modified cells, as well as efficient cell tracking of the therapeutic T cells in vivo following adoptive transfer. Efficiently controlling proliferation to avoid cytokine storm and off-target toxicity is an important hurdle for the success of T cell immunotherapy. The EGFRt incorporated in the CAR lentiviral vector can act as suicide gene to ablate the CAR+ T cells in cases of treatment-related toxicity.

The CAR described herein can be produced by any means known in the art, though preferably it is produced using recombinant DNA techniques. Nucleic acids encoding the several regions of the chimeric receptor can be prepared and assembled into a complete coding sequence by standard techniques of molecular cloning known in the art (genomic library screening, overlapping PCR, primer-assisted ligation, site-directed mutagenesis, etc.) as is convenient. The resulting coding region is preferably inserted into an expression vector and used to transform a suitable expression host cell line, preferably a T lymphocyte cell line, and most preferably an autologous T lymphocyte cell line.

Various T cell subsets isolated from the patient can be transduced with a vector for CAR expression. Central memory T cells are one useful T cell subset. Central memory T cell can be isolated from peripheral blood mononuclear cells (PBMC) by selecting for CD45RO+/CD62L+ cells, using, for example, the CliniMACS® device to immuno-magnetically select cells expressing the desired receptors. The cells enriched for central memory T cells can be activated with anti-CD3/CD28, transduced with, for example, a lentiviral vector that directs the expression of the CAR as well as a non-immunogenic surface marker for in vivo detection, ablation, and potential ex vivo selection. The activated/genetically modified central memory T cells can be expanded in vitro with IL-2/IL-15 and then cryopreserved.

Example 1: Preparation of T Cell Populations for Expression of Dual CAR

The following T cell populations can be prepared for expression of BAFF-CD19 dual CAR: CD4+ naïve T cells (CD4+ $T_N$), CD8+ naïve T cells (CD8+ $T_N$), CD8+ central memory T cells (CD8+ $T_{CM}$), CD8+ memory stem cells (CD8+ MSC) and Pan T cells (Pan T). Briefly, 5 mL of a blood sample are added to 5 mL histopaque-1077 (Sigma Aldrich). The mixture is centrifuged for 20 min at 2500 RPM (room temperature (RT), no brake). The middle peripheral blood mononuclear cell (PBMC) layer is collected, washed with 50 mL PBS (Corning), centrifuged for 5 min at 1500 RPM (RT). The collected cells are combined with 10 mL RBC lysis buffer (Qiagen) and incubated for 7 min. The cells are then washed with PBS and centrifuged for 5 min (1500 RPM, RT).

Various T cell populations can be prepared using the following kits available from StemCell Technologies, Inc. using the manufacturer's instructions: EasySep™ Human Naïve CD4+ T Cell Enrichment Kit (CD4+$T_N$), EasySep™ Human Naïve CD8+ T Cell Enrichment Kit (CD8+$T_N$), and EasySep™ Human T Cell Enrichment Kit (Pan T). CD8+

$T_{CM}$ can be prepared by isolating CD8+ T cells using the EasySep™ Human CD8+ T Cell Enrichment Kit from StemCell Technologies, Inc. using the manufacturer's instructions and then stained with: CD8-PerCP-Cy5.5, CD45 RO-APC, and CD62L-PE. The stained cells are then sorted to isolate CD8+/CD45+/CD62L+ triple positive cells. CD8+ memory stem cells (CD8+ MSC) can be generated from CD8+ $T_N$ using the culture conditions shown in Table 4. The other T cell populations can be cultured as indicated in Table 4.

TABLE 4

| Population | Media | Serum | Cytokines | Additional Supplement |
|---|---|---|---|---|
| CD4+ $T_N$, CD8+ $T_N$, CD8+ $T_{CM}$ Pan T | X-VIVO 15 (Lonza) | 10% human Ab serum (Valley Biomedical) | 100 U/mL hIL-2 | 100 U/mL penicillin 100 µg/mL streptomycin |
| CD8+ MSC | AIM-V (Thermo Fisher) | 5% human Ab serum (Valley Biomedical) | 5 ng/mL IL-7 30 ng/mL IL-21 (Cellgenix) | 2 mM glutamax (Thermo Fisher Scientific) 5 mM TWS119 (Cayman Chemical) |

Example 2: Sequence of BAFF-R/CD19 Dual CAR

A variety of BAFF-R/CD19 dual CAR were prepared. The 1250 dual CAR (SEQ ID NO:59) includes, from amino to carboxy terminus: a BAFF-R scFv, a linker, a CD19 scFv (derived from FMC63), an IgG4 (SmP/L235E,N297Q) spacer domain, a CD4 transmembrane domain, a 41BB cytoplasmic domain, a GGG linker, and a CD3 zeta signaling domain. (FIG. 2). The 1296 dual CAR (SEQ ID NO:61) includes, from amino to carboxy terminus: a CD19 scFv (derived from FMC63), a linker, a BAFF-R scFv, an IgG4 (SmP/L235E,N297Q) spacer domain, a CD4 transmembrane domain, a 41BB cytoplasmic domain, a GGG linker, and a CD3 zeta signaling domain (FIG. 3). The 1316 dual CAR (SEQ ID NO:63) includes, from amino to carboxy terminus: a CD19 VL (derived from FMC63), a GGGS (SEQ ID NO:70) linker, a BAFF-R scFv, a CD19 VH (derived from FMC63), an IgG4 (SmP/L235E,N297Q) spacer domain, a CD4 transmembrane domain, a 41BB cytoplasmic domain, a GGG linker, and a CD3 zeta signaling domain.

A biscitronic CAR expresses a BAFF-R CAR and a CD19 CAR using the lentiviral vector. The two CAR are expressed in the same T cell. The mature CD19 CAR (SEQ ID NO:65) can include, from amino to carboxy terminus: a CD19 scFv (derived from FMC63), an IgG4 (SmP/L235E,N297Q) spacer domain, a CD28 transmembrane domain, a CD28 (GG) cytoplasmic domain, a GGG linker, and a CD3 signaling domain. The mature BAFF-R CAR (SEQ ID NO:67) can include, from amino to carboxy terminus: a BAFF-R scFv, an IgG4 (SmP/L235E,N297Q) spacer domain, a CD4 transmembrane domain, a 4-1BB cytoplasmic domain, a GGG linker, and a CD3 signaling domain.

Example 2: Preparation of Lentiviral Vectors Expressing BAFF-R/CD19 Dual CAR

FIG. 5 is a schematic diagram of the lentiviral vector used to express 1250 dual CAR. The 1296 dual CAR, and the 1316 dual CAR were produced using similar lentiviral vectors (with replacement of the svFv portion).

Example 3: Preparation of CAR Expressing Cells

Cells were activated in preparation for transduction with lenitviral vectors expressing a dual CAR by combining the cells with CD3/CD28 human T-cell activation beads (Thermo Fisher) at a 1:1 bead to cell ratio and incubating overnight (humidified, 5% $CO_2$, 37° C.). After incubation, the cells were counted and distributed $1\times10^6$ cell/well in a 48-well plate. Cells were infected at an MOI of 1. In each case the total culture media was supplemented to 250 µL, centrifuged for 30 min (800 g, RT). Cells are incubated overnight (humidified, 5% $CO_2$, 37° C.) and then cultured for 10 days in the media indicated in Table 1. Cultures of CD4+ $T_N$, CD8+ $T_N$, CD8+$T_{CM}$, and Pan T cells included CD3/CD28 beads at a 1:1 cell to bead ratio. The culture of CD8+ T MSC did not include CD3/CD28 beads. Expression of the CAR was assessed by the percentage of GFP positive cells using flow cytometry.

Example 4: Expression of CAR

Figure 7:
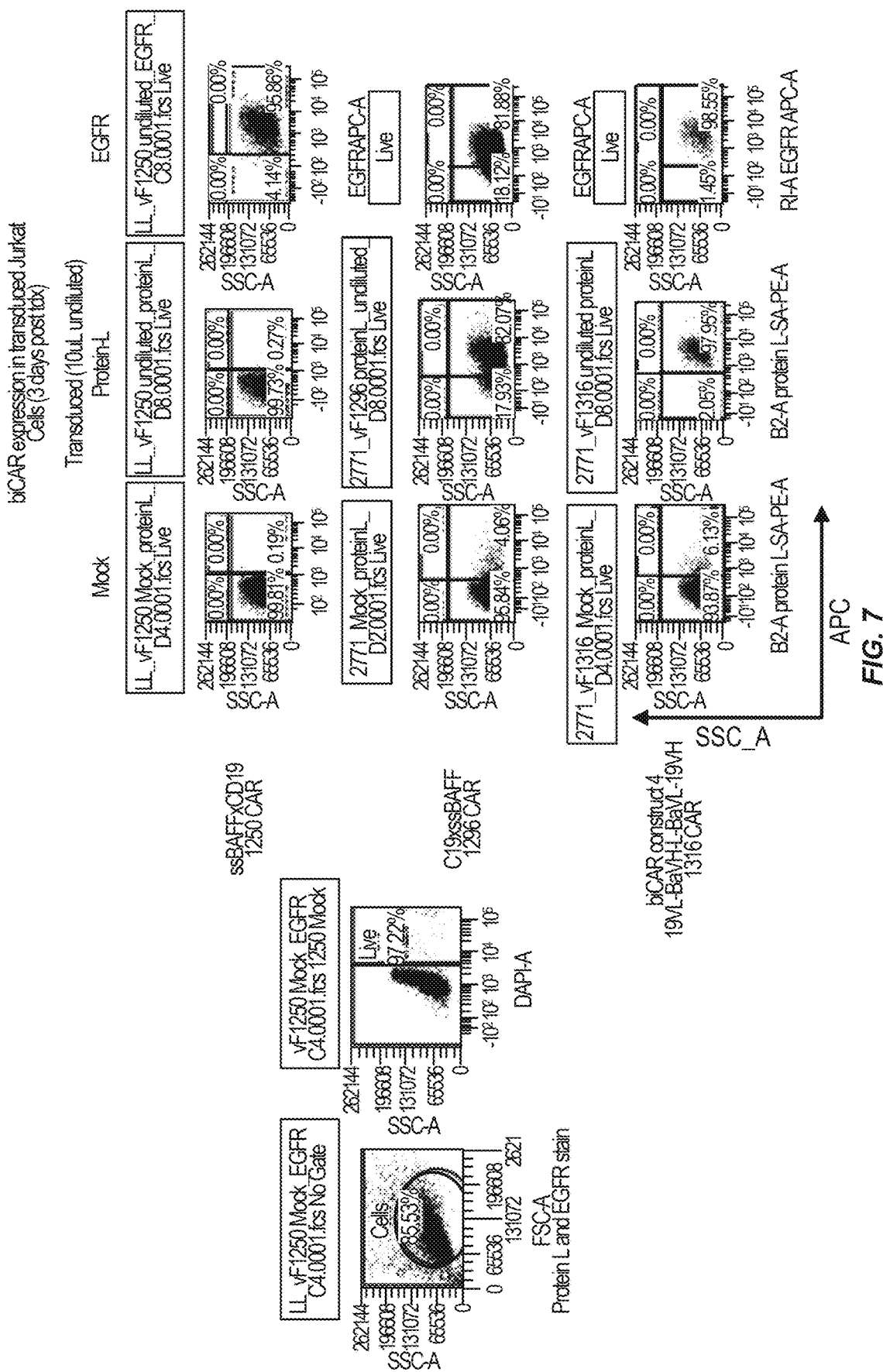
FIG. 7 depicts the results of a study of dual CAR expression. T cells (Jurkat) were transduced with each CAR construct or an empty vector (mock). Cells were stained with Protein L- or EGFR-APC conjugated antibodies. Protein L targets the variable light chain of the scFv, and truncated EGFR is co-expressed by the CAR vector. Constructs that were able to properly express dual CARs were further examined. Dual CAR 1296 and dual CAR 1316 expressed intact CAR and EGFRt selection marker, whereas dual CAR 1250 failed to express intact CAR.

T cells (Jurkat) were transduced with each CAR construct or an empty vector. To assess expression of the CAR, cells were stained with Protein L- or EGFR-APC conjugated antibodies. Protein L targets the variable light chain of the scFv, and truncated EGFR is co-expressed by the CAR vector. Constructs that were able to properly express dual CARs were further examined. As can be seen in FIG. 7, Dual CAR 1296 and dual CAR 1316 expressed intact CAR and EGFRt selection marker, whereas dual CAR 1250 failed to express intact CAR.

Example 5: In Vitro Cell Killing by BAFF-R Targeted CAR T Cells

Figure 8:
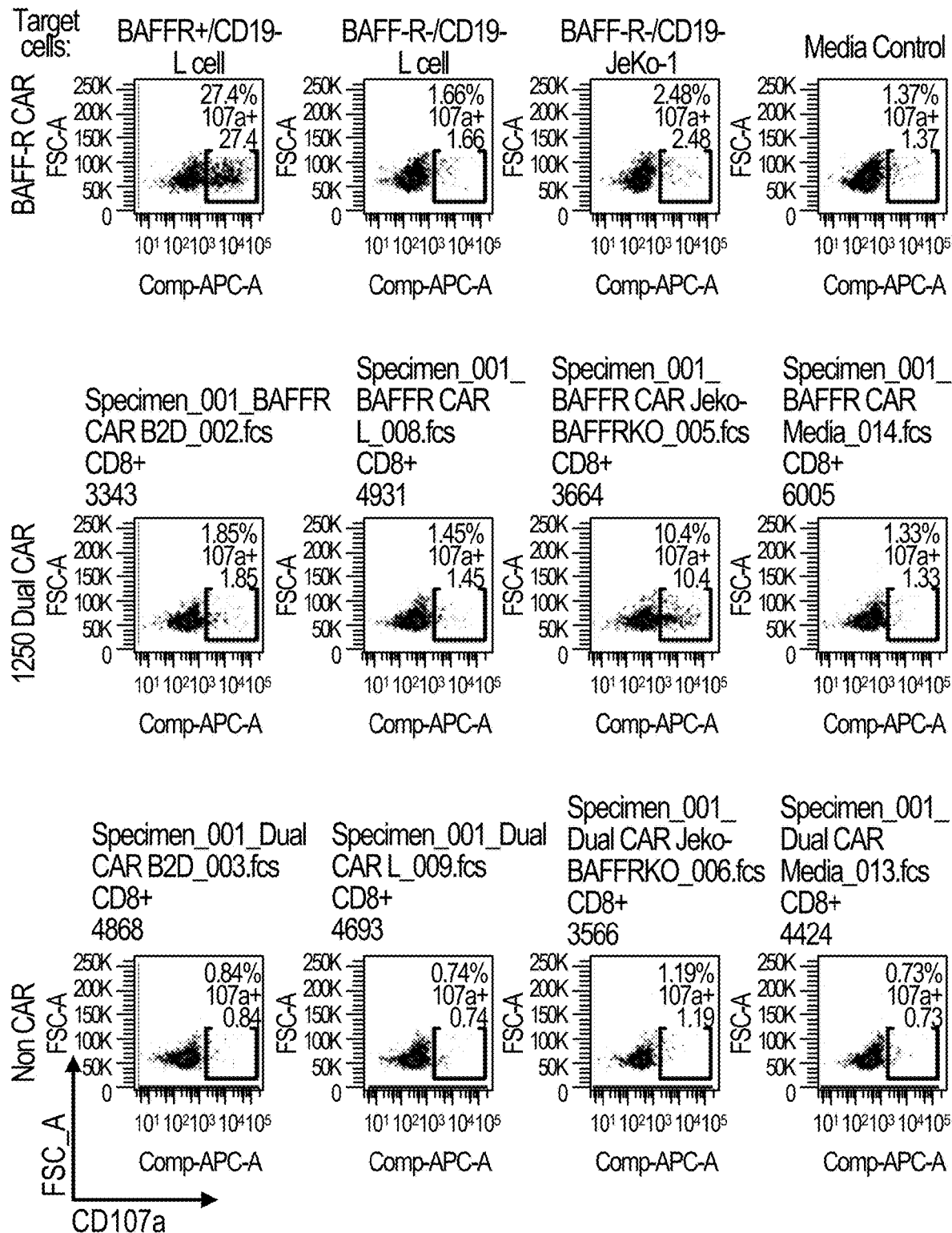
FIG. 8 depicts the result of a FACS assay assessing 1250 dual CAR T-cell degranulation following incubation with target cells. Targets cells are either BAFF-R single positive, CD19 single positive, or BAFF-R and CD19 double negative. Control BAFF-R single CAR and non-transduced T cells (non-CAR) were used as controls. The 1250 dual CAR failed to elicit response against BAFF-R-positive L cells suggesting BAFF-R-targeting scFv is not properly expressed.

An in vitro assay using various T cell populations expressing 1296 Dual CAR, 1316 Dual CAR, CD19 CAR or BAFF-R CAR cells. Target cell line Nalm-6 (WT, CD19 knockout, or BAFF-R knockout variants) were labeled with chromium-31 and incubated with effector CAR T cells. CARs included BAFF-R/CD19 dual-targeting CARs: 1296 and 1316; single-targeting CARs: BAFF-R CAR and CD19 CAR. Non-transduced T cells (non-CAR) were used as an allogeneic control. All T cells were derived from a single healthy donor. Chromium released by target cells due to effector T cell function was measured by a gamma counter and calculated as a percentage of maximum possible release. As can be seen in FIG. 8, 1250 dual CAR failed to elicit response against BAFF-R-positive L cells suggesting BAFF-R-targeting scFv is not properly expressed.

Example 6: BAFF-R- and CD19-Deficient Murine Model

Nalm-6 B-ALL tumor line was gene edited with CRISPR to knockout BAFF-R or CD19. Surface protein expression was confirmed by FACS staining with commercial BAFF-R and CD19 antibodies. Nalm-6 wild-type (WT) was used as controls. As shown in FIG. 9, FACS analysis confirms the knockout.

Example 7: CTL Function of Dual CAR T Cells

Figure 10:
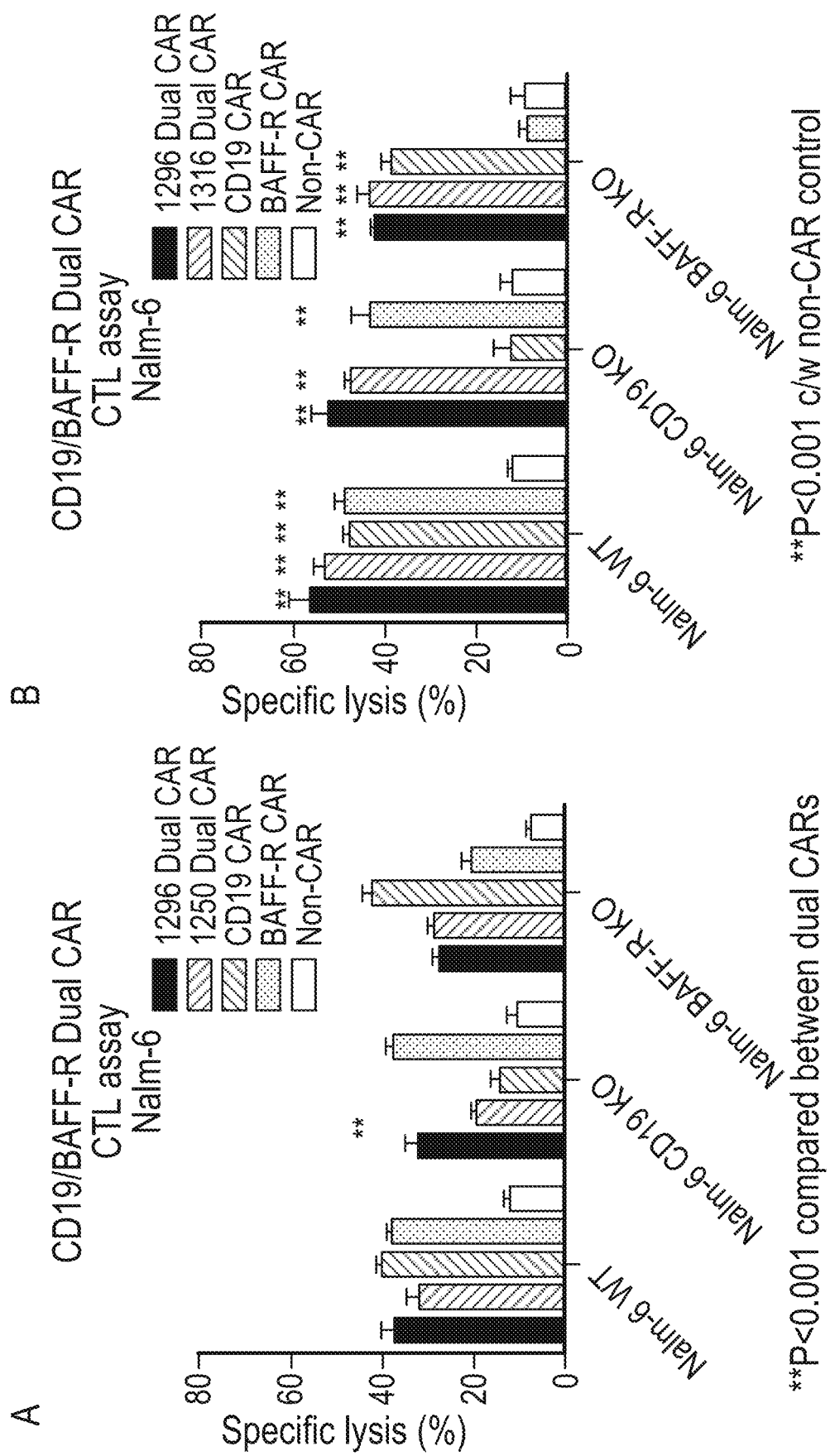
FIG. 10A-10B depicts the results of an analysis of the CTL function of BAFF-R/CD19 dual CAR. Graphs show calculated specific lysis are plotted from a cytotoxic T lymphocyte assay against Nalm-6 ALL tumor lines. Target cell line Nalm-6 (WT, CD19 knockout, or BAFF-R knockout variants) were labeled with chromium-51 and incubated with effector CAR T cells. CARs included BAFF-R/CD19 dual-targeting CARs: A). 1296 and 1250 or B). 1296 and 1316; controls in both panels include single-targeting CARs: BAFF-R CAR and CD19 CAR and non-transduced T cells (non-CAR, allogeneic control). All T cells were derived from a single healthy donor in each panel. Chromium released by target cells due to effector T cell function was measured by a gamma counter and calculated as a percentage of maximum possible release. Experiment was conducted in triplicate and analyzed by a Student's t-test; A.  P<0.001 compared between dual CARs; and B).  P<0.001 c/w non-CAR control. 1250 dual CAR CTL data suggests potential BAFF-R targeting deficiency.
Figure 12:
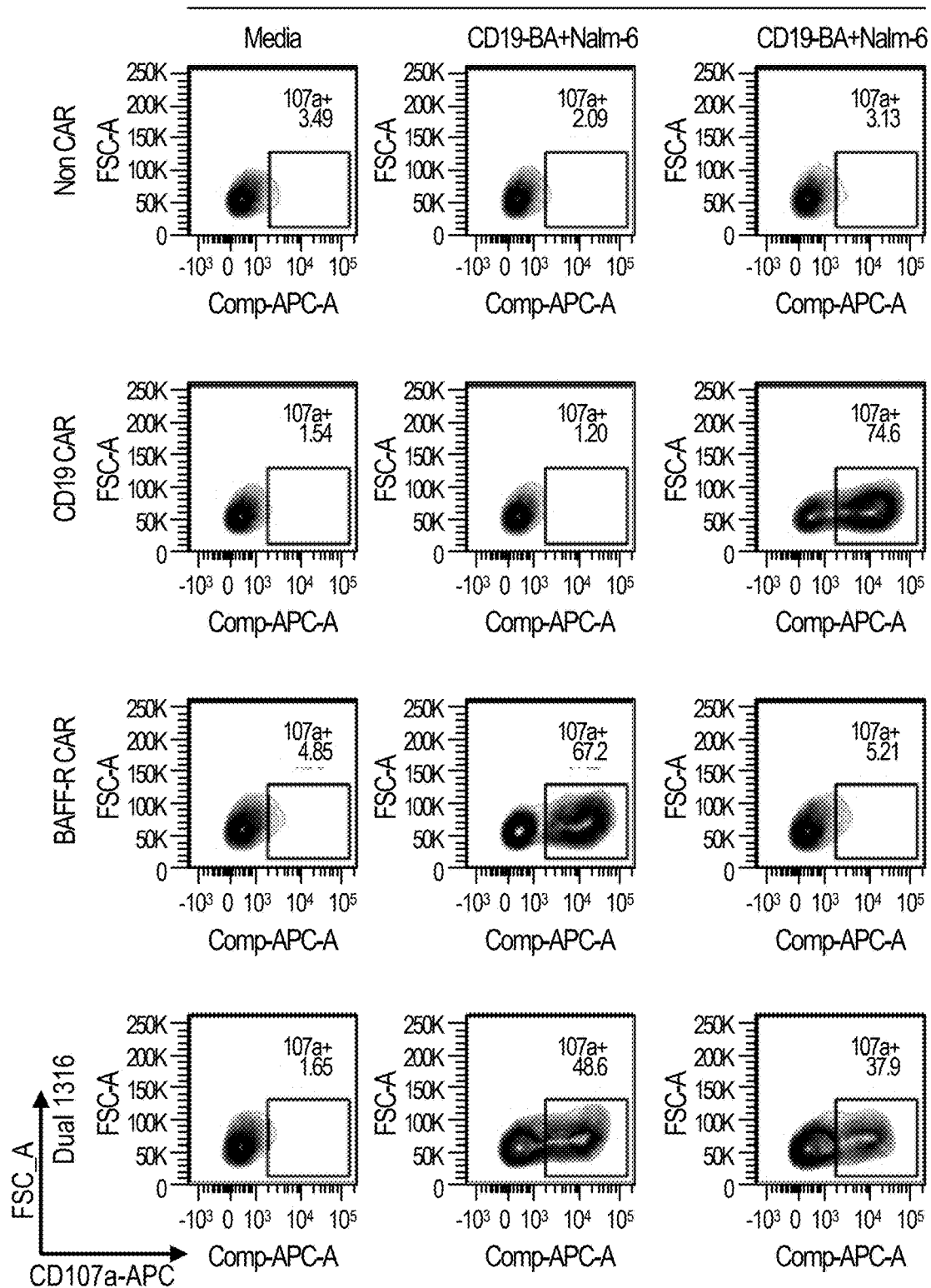
FIG. 12 depicts the activity of 1316 BAFF-R/CD19 Dual CAR against knock-out tumors. FACS plots of BAFF-R CAR T cell functional potency as measured by a CD107a degranulation assay. CD4 or CD8 BAFF-R CAR T cells were coincubated with either CD19⁻BAFF-R⁺ Nalm-6 or CD19⁺BAFF-R⁻ Nalm-6 lines. Single targeting CD19 or BAFF-R CAR T cells were used as controls.

In this study, the results of which are shown in FIG. 10, target cell lines Nalm-6, WT, CD19 knockout, or BAFF-R knockout variants, were labeled with chromium-51 and incubated with effector CART cells. CARs included BAFF- R/CD19 dual-targeting CARs. The 1250 dual CAR CTL data suggests potential BAFF-R targeting deficiency.

Example 8: Activity of BAFF-R/CD19 Dual CAR in BAFF-R-Positive CD19-Negative Mixed B-ALL Tumor FIG. 11A-11B shows the results of a study examining the impact of 1316 Dual CAR and 1296NSG mice following IV tumor challenge on day 0 with a mixture of $1 \times 10^5$ RFP-negative, luciferase-expressing Nalm-6-CD19KO plus $2.5 \times 10^5$ RFP-positive, luciferase-expressing Nalm-6-BAFF-RKO tumor cells. Groups of 5 tumor-bearing mice each were then randomly assigned to treatment with either $2.5 \times 10^6$ CD4 $T_N$ CAR-T+$10^6$ CD8 $T_N$ 1296 or 1316 dual CART cells/mouse IV on day 10, as a single infusion. Non-transduced CD4/CD8 T cells from the same donor were used as allogeneic controls (non-CAR). As can be seen, 1316 treatment conferred significant prolonged survival compared to 1296 treatment.

Example 9: Degranulation of 1316 BAFF-R/CD19 Dual CAR Against Knock-Out Tumors

A CD107a degranulation was used to assess Dual CAR 1316 potency against knockout tumors. CD4 or CD8 BAFF-R CAR T cells were incubated with either CD19⁻BAFF-R⁺ Nalm-6 or CD19⁺BAFF-R⁻ Nalm-6 lines. Single targeting CD19 or BAFF-R CAR T cells were used as controls.

Example 10: Activity of TN/MEM 1316 BAFF-R/CD19 Dual CAR in Mixed B-ALL Tumor

NSG mice were challenged on day 0 with a mixture of 1×105 RFP-negative, luciferase-expressing Nalm-6-CD19KO plus 1×105 RFP-positive, luciferase-expressing Nalm-6-BAFF-RKO tumor cells. Groups of 5 tumor-bearing mice each were then randomly assigned to treatment with 1316 dual CAR T cells/mouse IV on day 9, as a single infusion of either low dose (2.8×106 TN/MEM), high dose (5.6×106 TN/MEM), which yielded 1×106 and 2×106 BAFF-R CART cells, respectively.2.5 or 5×106 non-transduced TN/MEM cells from the same donor were used as allogeneic controls (non-CAR). 1316 Dual CAR conferred significant prolonger survival. No significant difference in survival between the two dosing were observed.

What is claimed is:

1. A chimeric antigen receptor targeted to both B cell activating factor receptor (BAFF-R) and CD19, wherein the chimeric antigen receptor comprises:
   a targeting domain comprising, from amino to carboxy terminus:
   a) a scFv targeted to CD19 and a scFv targeted to BAFF-R;
   b) a VL domain of a CD19 scFv, a scFv targeted to BAFF-R, and a VH of a CD19 scFv; or
   c) a VH domain of a CD19 scFv, a scFv targeted to BAFF-R, and a VL of a CD19 scFv;
   followed by:
   a spacer domain,
   a transmembrane domain,
   a costimulatory domain,
   and a CD3ξ signaling domain,
   wherein the scFv targeted to BAFF-R comprises amino acids 135-382 of SEQ ID NO: 62 or amino acids 266-510 of SEQ ID NO: 61 and the scFv targeted to CD19 comprises a VH domain and a VL domain.

2. The chimeric antigen receptor of claim 1, wherein the chimeric antigen receptor comprises the amino acid sequence of any one of SEQ ID NOs: 60-63.

3. The chimeric antigen receptor of claim 1, wherein the targeting domain comprising from amino to carboxy terminus a VL domain of a CD19 scFv, a scFv targeted to BAFF-R and a VH of a CD19 scFv further comprises (i) a linker between the VL domain of the CD19 scFv and the scFv targeted to BAFF-R and (ii) a linker between the scFv targeted to BAFF-R and the VH of the CD19 scFv.

4. The chimeric antigen receptor of claim 3, wherein the linker includes only G and S.

5. The chimeric antigen receptor of claim 1, wherein the CD19 scFv comprises amino acids 23-267 of SEQ ID NO: 60.

6. The chimeric antigen receptor of claim 1, wherein the costimulatory domain is: a CD28 costimulatory domain, a 4-1BB costimulatory domain, or an OX40 costimulatory domain.

7. The chimeric antigen receptor of claim 1, wherein the transmembrane domain is a CD4 transmembrane domain, a CD8 transmembrane domain, a CD28 transmembrane domain, or a CD3ξ transmembrane domain.

8. The chimeric antigen receptor of claim 1, wherein the spacer domain is IgG4 hinge (S→P), IgG4 hinge, IgG4 hinge (S228P)+linker, CD28 hinge, CD8 hinge-48aa, CD8 hinge-45aa, IgG4(HL-CH3), IgG4(L235E,N297Q), IgG4 (S228P, L235E,N297Q), or IgG4(CH3).

9. The chimeric antigen receptor of claim 1, wherein the CD19 scFv VL domain comprises the amino acid sequence (SEQ ID NO: 30)
DIQMTQTTSSLSASLGDRVTISCRASQDISKYLNWYQQKPDGTVKLLIY
HTSRLHSGVPSRFSGSGSGTDYSLTISNLEQEDIATYFCQQGNTLPYTF
GGGTKLEIT and the CD19 scFV VH domain comprises the amino acid sequence (SEQ ID NO: 31)
EVKLQESGPGLVAPSQSLSVTCTVSGVSLPDYGVSWIRQPPRKGLEWLG

VIWGSETTYYNSALKSRLTIIKDNSKSQVFLKMNSLQTDDTAIYYCAKH

YYYGGSYAMDYWGQGTSVTVSS.

10. The chimeric antigen receptor of claim 1, wherein the costimulatory domain comprises SEQ ID NO: 52, SEQ ID NO: 53, SEQ ID NO: 54 or SEQ ID NO: 55 and the CD3ξ signaling domain comprises SEQ ID NO: 51.

11. The chimeric antigen receptor of claim 1, wherein the transmembrane domain comprises any of SEQ ID NOs: 43-50.

12. The chimeric antigen receptor of claim 1, wherein the spacer domain comprises any of SEQ ID NOs: 32-42.

13. The chimeric antigen receptor of claim 1, wherein the chimeric antigen receptor comprises a targeting domain comprising, from amino to carboxy terminus:
   a) a scFv targeted to CD19 and a scFv targeted to BAFF-R; or
   b) a VL domain of a CD19 scFv, a scFv targeted to BAFF-R, and a VH of a CD19 scFv.

14. The chimeric antigen receptor of claim 1, wherein the chimeric antigen receptor comprises a targeting domain comprising, from amino to carboxy terminus:
   a VL domain of a CD19 scFv, a scFv targeted to BAFF-R, and a VH of a CD19 scFv.

15. A chimeric antigen receptor comprising or consisting of the amino acid sequence of any one of SEQ ID NOs: 58-63.

* * * * *

SEQUENCE LISTING

```
<160> NUMBER OF SEQ ID NOS: 70

<210> SEQ ID NO 1
<211> LENGTH: 10
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C90 CDR L1

<400> SEQUENCE: 1

Glu Ser Val Asp Asn Tyr Gly Ile Ser Phe
1               5                   10

<210> SEQ ID NO 2

<400> SEQUENCE: 2

000

<210> SEQ ID NO 3
<211> LENGTH: 9
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C90 CDR L3

<400> SEQUENCE: 3

Gln Gln Ser Lys Glu Val Pro Trp Thr
1               5

<210> SEQ ID NO 4
<211> LENGTH: 8
<212> TYPE: PRT
<213> ORGANISM: Artificial Sequence
<220> FEATURE:
<223> OTHER INFORMATION: Synthetic oligonucleotide
```

```
<220> FEATURE:
<221> NAME/KEY: MISC_FEATURE
<223> OTHER INFORMATION: C90 CDR H1

<400> SEQUENCE: 4

Gly Asp Ser Ile Thr Ser Gly Tyr
1               5

<210> SEQ ID NO 5
<211> LENGTH: 7
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C90 CDR H2

<400> SEQUENCE: 5

Ile Ser Tyr Ser Gly Ser Thr
1               5

<210> SEQ ID NO 6
<211> LENGTH: 12
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C90 CDR H3

<400> SEQUENCE: 6

Ala Ser Pro Asn Tyr Pro Phe Tyr Ala Met Asp Tyr
1               5                   10

<210> SEQ ID NO 7
<211> LENGTH: 6
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C55 CDR L1

<400> SEQUENCE: 7

Gln Asp Ile Ser Asn Tyr
1               5

<210> SEQ ID NO 8

<400> SEQUENCE: 8

000

<210> SEQ ID NO 9
<211> LENGTH: 7
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C55 CDR L3

<400> SEQUENCE: 9

Phe Ser Glu Leu Pro Trp Thr
1               5
```

```
<210> SEQ ID NO 10
<211> LENGTH: 10
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C55 CDR H1

<400> SEQUENCE: 10

Gly Phe Ser Leu Ser Thr Ser Gly Met Gly
1               5                   10

<210> SEQ ID NO 11
<211> LENGTH: 7
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C55 CDR H2

<400> SEQUENCE: 11

Ile Trp Trp Asp Asp Asp Lys
1               5

<210> SEQ ID NO 12
<211> LENGTH: 10
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: C55 CDR H3

<400> SEQUENCE: 12

Ala Arg Ser Phe Gly Tyr Gly Leu Asp Tyr
1               5                   10

<210> SEQ ID NO 13
<211> LENGTH: 140
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Chi90 HC

<400> SEQUENCE: 13

Met Tyr Arg Met Gln Leu Leu Ser Cys Ile Ala Leu Ser Leu Ala Leu
1               5                   10                  15

Val Thr Asn Ser Glu Val Gln Leu Gln Glu Ser Gly Pro Ser Leu Val
            20                  25                  30

Lys Pro Ser Gln Thr Leu Ser Leu Thr Cys Ser Val Thr Gly Asp Ser
        35                  40                  45

Ile Thr Ser Gly Tyr Trp Asn Trp Ile Arg Lys Phe Pro Gly Asn Lys
    50                  55                  60

Leu Glu Tyr Met Gly Tyr Ile Ser Tyr Ser Gly Ser Thr Tyr Tyr Asn
65                  70                  75                  80

Pro Ser Leu Lys Ser Arg Ile Ser Ile Thr Arg Asp Thr Ser Lys Asn
                85                  90                  95
```

```
Gln Tyr Tyr Leu Gln Leu Asn Ser Val Thr Pro Glu Asp Thr Ala Thr
            100                 105                 110

Tyr Tyr Cys Ala Ser Pro Asn Tyr Pro Phe Tyr Ala Met Asp Tyr Trp
            115                 120                 125

Gly Gln Gly Thr Ser Val Thr Val Ser Ser Asp Ile
            130                 135             140

<210> SEQ ID NO 14
<211> LENGTH: 142
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu90 HC-1

<400> SEQUENCE: 14

Met Asp Pro Lys Gly Ser Leu Ser Trp Arg Ile Leu Leu Phe Leu Ser
1               5                   10                  15

Leu Ala Phe Glu Leu Ser Tyr Gly Gln Val Gln Leu Gln Glu Ser Gly
            20                  25                  30

Pro Gly Leu Val Lys Pro Ser Gln Thr Leu Ser Leu Thr Cys Thr Val
            35                  40                  45

Ser Gly Asp Ser Ile Thr Ser Gly Tyr Trp Asn Trp Ile Arg Gln His
        50                  55                  60

Pro Gly Lys Gly Leu Glu Tyr Ile Gly Tyr Ile Ser Tyr Ser Gly Ser
65                  70                  75                  80

Thr Tyr Tyr Asn Pro Ser Leu Lys Ser Arg Val Thr Ile Ser Arg Asp
                85                  90                  95

Thr Ser Lys Asn Gln Phe Ser Leu Lys Leu Ser Ser Val Thr Ala Ala
            100                 105                 110

Asp Thr Ala Val Tyr Tyr Cys Ala Ser Pro Asn Tyr Pro Phe Tyr Ala
            115                 120                 125

Met Asp Tyr Trp Gly Gln Gly Thr Leu Val Thr Val Ser Ser
            130                 135                 140

<210> SEQ ID NO 15
<211> LENGTH: 142
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu90 HC-2

<400> SEQUENCE: 15

Met Asp Pro Lys Gly Ser Leu Ser Trp Arg Ile Leu Leu Phe Leu Ser
1               5                   10                  15

Leu Ala Phe Glu Leu Ser Tyr Gly Glu Val Gln Leu Gln Glu Ser Gly
            20                  25                  30

Pro Gly Leu Val Lys Pro Ser Gln Thr Leu Ser Leu Thr Cys Thr Val
            35                  40                  45

Ser Gly Asp Ser Ile Thr Ser Gly Tyr Trp Asn Trp Ile Arg Gln His
        50                  55                  60

Pro Gly Lys Gly Leu Glu Tyr Ile Gly Tyr Ile Ser Tyr Ser Gly Ser
65                  70                  75                  80

Thr Tyr Tyr Asn Pro Ser Leu Lys Ser Arg Val Thr Ile Ser Arg Asp
```

```
                    85                  90                  95

Thr Ser Lys Asn Gln Tyr Ser Leu Lys Leu Ser Ser Val Thr Ala Ala
                100                 105                 110

Asp Thr Ala Val Tyr Tyr Cys Ala Ser Pro Asn Tyr Pro Phe Tyr Ala
            115                 120                 125

Met Asp Tyr Trp Gly Gln Gly Thr Leu Val Thr Val Ser Ser
        130                 135                 140

<210> SEQ ID NO 16
<211> LENGTH: 142
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu90 HC-3

<400> SEQUENCE: 16

Met Asp Pro Lys Gly Ser Leu Ser Trp Arg Ile Leu Leu Phe Leu Ser
1               5                   10                  15

Leu Ala Phe Glu Leu Ser Tyr Gly Glu Val Gln Leu Gln Glu Ser Gly
            20                  25                  30

Pro Gly Leu Val Lys Pro Ser Glu Thr Leu Ser Leu Thr Cys Ser Val
        35                  40                  45

Ser Gly Asp Ser Ile Thr Ser Gly Tyr Trp Asn Trp Ile Arg Gln Pro
    50                  55                  60

Pro Gly Lys Gly Leu Glu Tyr Ile Gly Tyr Ile Ser Tyr Ser Gly Ser
65                  70                  75                  80

Thr Tyr Tyr Asn Pro Ser Leu Lys Ser Arg Val Thr Ile Ser Arg Asp
                85                  90                  95

Thr Ser Lys Asn Gln Tyr Ser Leu Arg Leu Ser Ser Val Thr Ala Ala
                100                 105                 110

Asp Thr Ala Leu Tyr Tyr Cys Ala Ser Pro Asn Tyr Pro Phe Tyr Ala
            115                 120                 125

Met Asp Tyr Trp Gly Gln Gly Thr Arg Val Thr Val Ser Ser
        130                 135                 140

<210> SEQ ID NO 17
<211> LENGTH: 137
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Chi90 LC

<400> SEQUENCE: 17

Met Tyr Arg Met Gln Leu Leu Ser Cys Ile Ala Leu Ser Leu Ala Leu
1               5                   10                  15

Val Thr Asn Ser Asp Ile Val Leu Thr Gln Ser Pro Ala Ser Leu Ala
            20                  25                  30

Val Ser Leu Gly Gln Arg Ala Thr Ile Ser Cys Arg Ala Ser Glu Ser
        35                  40                  45

Val Asp Asn Tyr Gly Ile Ser Phe Met Asn Trp Phe Gln Gln Lys Pro
    50                  55                  60

Gly Gln Pro Pro Lys Leu Leu Ile Tyr Ala Ala Ser Asn Gln Gly Ser
65                  70                  75                  80
```

```
Gly Val Pro Ala Arg Phe Ser Gly Ser Gly Ser Gly Thr Asp Phe Ser
                85                  90                  95

Leu Asn Ile His Pro Met Glu Asp Asp Thr Ala Met Tyr Phe Cys
            100                 105                 110

Gln Gln Ser Lys Glu Val Pro Trp Thr Phe Gly Gly Gly Thr Lys Leu
        115                 120                 125

Glu Ile Lys Thr Met Glu Ile Lys Arg
    130                 135
```

<210> SEQ ID NO 18
<211> LENGTH: 134
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu90 LC-1

<400> SEQUENCE: 18

```
Met Glu Thr Asp Thr Leu Leu Leu Trp Val Leu Leu Leu Trp Val Pro
1               5                   10                  15

Gly Ser Thr Gly Glu Ile Val Leu Thr Gln Ser Pro Ala Thr Leu Ser
            20                  25                  30

Leu Ser Pro Gly Glu Arg Ala Thr Leu Ser Cys Arg Ala Ser Glu Ser
        35                  40                  45

Val Asp Asn Tyr Gly Ile Ser Phe Leu Asn Trp Phe Gln Gln Lys Pro
    50                  55                  60

Gly Gln Ala Pro Arg Leu Leu Ile Tyr Ala Ala Ser Asn Arg Ala Thr
65                  70                  75                  80

Gly Ile Pro Ala Arg Phe Ser Gly Ser Gly Ser Gly Thr Asp Phe Thr
                85                  90                  95

Leu Thr Ile Ser Ser Leu Glu Pro Glu Asp Phe Ala Val Tyr Tyr Cys
            100                 105                 110

Gln Gln Ser Lys Glu Val Pro Trp Thr Phe Gly Gly Gly Thr Lys Val
        115                 120                 125

Glu Ile Lys Arg Thr Val
    130
```

<210> SEQ ID NO 19
<211> LENGTH: 134
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu90 LC-2

<400> SEQUENCE: 19

```
Met Glu Thr Asp Thr Leu Leu Leu Trp Val Leu Leu Leu Trp Val Pro
1               5                   10                  15

Gly Ser Thr Gly Asp Ile Val Leu Thr Gln Ser Pro Ala Thr Leu Ser
            20                  25                  30

Leu Ser Pro Gly Glu Arg Ala Thr Leu Ser Cys Arg Ala Ser Glu Ser
        35                  40                  45

Val Asp Asn Tyr Gly Ile Ser Phe Met Asn Trp Phe Gln Gln Lys Pro
    50                  55                  60

Gly Gln Ala Pro Arg Leu Leu Ile Tyr Ala Ala Ser Asn Arg Ala Thr
65                  70                  75                  80
```

Gly Ile Pro Ala Arg Phe Ser Gly Ser Gly Ser Gly Thr Asp Phe Thr
                85                  90                  95

Leu Thr Ile Ser Ser Leu Glu Pro Glu Asp Phe Ala Val Tyr Tyr Cys
            100                 105                 110

Gln Gln Ser Lys Glu Val Pro Trp Thr Phe Gly Gly Gly Thr Lys Val
        115                 120                 125

Glu Ile Lys Arg Thr Val
    130

<210> SEQ ID NO 20
<211> LENGTH: 134
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu90 LC-3

<400> SEQUENCE: 20

Met Glu Thr Asp Thr Leu Leu Leu Trp Val Leu Leu Leu Trp Val Pro
1               5                   10                  15

Gly Ser Thr Gly Asp Ile Val Met Thr Gln Ser Pro Ser Ser Leu Ser
            20                  25                  30

Ala Ser Val Gly Asp Arg Val Thr Ile Thr Cys Arg Ala Ser Glu Ser
        35                  40                  45

Val Asp Asn Tyr Gly Ile Ser Phe Met Asn Trp Phe Gln Gln Lys Pro
    50                  55                  60

Gly Lys Ala Pro Lys Leu Leu Ile Tyr Ala Ala Ser Asn Leu Gly Ser
65                  70                  75                  80

Gly Val Pro Ser Arg Phe Ser Gly Ser Gly Ser Gly Thr Asp Phe Thr
                85                  90                  95

Leu Thr Ile Ser Ser Leu Gln Pro Glu Asp Phe Ala Thr Tyr Tyr Cys
            100                 105                 110

Gln Gln Ser Lys Glu Val Pro Trp Thr Phe Gly Gln Gly Thr Lys Val
        115                 120                 125

Glu Ile Lys Arg Thr Val
    130

<210> SEQ ID NO 21
<211> LENGTH: 140
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Chi55 HC

<400> SEQUENCE: 21

Met Tyr Arg Met Gln Leu Leu Ser Cys Ile Ala Leu Ser Leu Ala Leu
1               5                   10                  15

Val Thr Asn Ser Gln Val Thr Leu Lys Glu Ser Gly Pro Gly Ile Leu
            20                  25                  30

Lys Pro Ser Gln Thr Leu Ser Leu Thr Cys Ser Phe Ser Gly Phe Ser
        35                  40                  45

Leu Ser Thr Ser Gly Met Gly Val Gly Trp Ile Arg Gln Pro Ser Gly
    50                  55                  60

Lys Gly Leu Glu Trp Leu Ala His Ile Trp Trp Asp Asp Asp Lys Tyr

```
                    65                  70                  75                  80
Tyr Asn Ser Ser Leu Lys Ser His Leu Thr Ile Ser Lys Asp Thr Ser
                    85                  90                  95

Arg Asn Gln Val Phe Leu Lys Ile Thr Ser Val Asp Thr Ala Asp Thr
                100                 105                 110

Ala Thr Tyr Tyr Cys Ala Arg Ser Phe Gly Tyr Gly Leu Asp Tyr Trp
            115                 120                 125

Gly Gln Gly Thr Thr Leu Thr Val Ser Ser Ala Ser
        130                 135                 140

<210> SEQ ID NO 22
<211> LENGTH: 142
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu55 HC-1

<400> SEQUENCE: 22

Met Asp Pro Lys Gly Ser Leu Ser Trp Arg Ile Leu Leu Phe Leu Ser
1                   5                   10                  15

Leu Ala Phe Glu Leu Ser Tyr Gly Gln Val Thr Leu Lys Glu Ser Gly
                20                  25                  30

Pro Thr Leu Val Lys Pro Thr Gln Thr Leu Thr Leu Thr Cys Thr Phe
            35                  40                  45

Ser Gly Phe Ser Leu Ser Thr Ser Gly Met Gly Val Gly Trp Ile Arg
        50                  55                  60

Gln Pro Pro Gly Lys Ala Leu Glu Trp Leu Ala His Ile Trp Trp Asp
65                  70                  75                  80

Asp Asp Lys Tyr Tyr Asn Pro Ser Leu Lys Ser Arg Leu Thr Ile Thr
                85                  90                  95

Lys Asp Thr Ser Lys Asn Gln Val Val Leu Thr Met Thr Asn Met Asp
                100                 105                 110

Pro Val Asp Thr Ala Thr Tyr Tyr Cys Ala Arg Ser Phe Gly Tyr Gly
            115                 120                 125

Leu Asp Tyr Trp Gly Gln Gly Thr Leu Val Thr Val Ser Ser
        130                 135                 140

<210> SEQ ID NO 23
<211> LENGTH: 142
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu55 HC-2

<400> SEQUENCE: 23

Met Asp Pro Lys Gly Ser Leu Ser Trp Arg Ile Leu Leu Phe Leu Ser
1                   5                   10                  15

Leu Ala Phe Glu Leu Ser Tyr Gly Gln Val Thr Leu Lys Glu Ser Gly
                20                  25                  30

Pro Thr Leu Val Lys Pro Thr Gln Thr Leu Thr Leu Thr Cys Thr Phe
            35                  40                  45

Ser Gly Phe Ser Leu Ser Thr Ser Gly Met Gly Val Gly Trp Ile Arg
        50                  55                  60
```

```
Gln Pro Pro Gly Lys Ala Leu Glu Trp Leu Ala His Ile Trp Trp Asp
 65                 70                  75                  80

Asp Asp Lys Tyr Tyr Asn Ser Ser Leu Lys Ser Arg Leu Thr Ile Thr
                 85                  90                  95

Lys Asp Thr Ser Lys Asn Gln Val Val Leu Thr Met Thr Asn Met Asp
            100                 105                 110

Pro Val Asp Thr Ala Thr Tyr Tyr Cys Ala Arg Ser Phe Gly Tyr Gly
        115                 120                 125

Leu Asp Tyr Trp Gly Gln Gly Thr Leu Val Thr Val Ser Ser
    130                 135                 140
```

<210> SEQ ID NO 24
<211> LENGTH: 142
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu55 HC-3

<400> SEQUENCE: 24

```
Met Asp Pro Lys Gly Ser Leu Ser Trp Arg Ile Leu Leu Phe Leu Ser
  1               5                  10                  15

Leu Ala Phe Glu Leu Ser Tyr Gly Gln Val Thr Leu Lys Glu Ser Gly
                 20                  25                  30

Pro Ala Leu Val Lys Pro Thr Gln Thr Leu Thr Leu Thr Cys Thr Phe
             35                  40                  45

Ser Gly Phe Ser Leu Ser Thr Ser Gly Met Gly Val Gly Trp Ile Arg
 50                  55                  60

Gln Pro Pro Gly Lys Ala Leu Glu Trp Leu Ala His Ile Trp Trp Asp
 65                  70                  75                  80

Asp Asp Lys Tyr Tyr Asn Thr Ser Leu Lys Ser Arg Leu Thr Ile Thr
                 85                  90                  95

Lys Asp Thr Ser Lys Asn Gln Val Val Leu Lys Met Thr Asn Met Asp
            100                 105                 110

Pro Val Asp Thr Ala Thr Tyr Tyr Cys Ala Arg Ser Phe Gly Tyr Gly
        115                 120                 125

Leu Asp Tyr Trp Gly Gln Gly Thr Leu Val Thr Val Ser Ser
    130                 135                 140
```

<210> SEQ ID NO 25
<211> LENGTH: 129
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Chi55 LC

<400> SEQUENCE: 25

```
Met Tyr Arg Met Gln Leu Leu Ser Cys Ile Ala Leu Ser Leu Ala Leu
  1               5                  10                  15

Val Thr Asn Ser Asp Ile Gln Met Thr Gln Thr Thr Ser Ser Leu Ser
                 20                  25                  30

Ala Ser Leu Gly Asp Arg Val Thr Ile Ser Cys Ser Ala Ser Gln Asp
             35                  40                  45

Ile Ser Asn Tyr Leu Asn Trp Tyr Gln Gln Lys Pro Asp Gly Thr Val
 50                  55                  60
```

```
Lys Leu Leu Ile Tyr Tyr Thr Ser Ser Leu His Ser Gly Val Pro Ser
 65                  70                  75                  80

Arg Phe Ser Gly Ser Gly Ser Gly Thr Asp Tyr Ser Leu Thr Ile Ser
                 85                  90                  95

Ser Leu Glu Pro Glu Asp Ile Ala Thr Tyr Tyr Cys His Gln Phe Ser
            100                 105                 110

Glu Leu Pro Trp Thr Phe Gly Gly Gly Thr Lys Leu Glu Ile Lys Arg
        115                 120                 125

Thr
```

```
<210> SEQ ID NO 26
<211> LENGTH: 130
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu55 LC-1

<400> SEQUENCE: 26

Met Glu Thr Asp Thr Leu Leu Leu Trp Val Leu Leu Leu Trp Val Pro
  1               5                  10                  15

Gly Ser Thr Gly Asp Ile Gln Met Thr Gln Ser Pro Ser Ser Leu Ser
                 20                  25                  30

Ala Ser Val Gly Asp Arg Val Thr Ile Thr Cys Gln Ala Ser Gln Asp
             35                  40                  45

Ile Ser Asn Tyr Leu Asn Trp Tyr Gln Gln Lys Pro Gly Lys Ala Pro
 50                  55                  60

Lys Leu Leu Ile Tyr Tyr Thr Ser Ser Leu His Thr Gly Val Pro Ser
 65                  70                  75                  80

Arg Phe Ser Gly Ser Gly Ser Gly Thr Asp Tyr Thr Phe Thr Ile Ser
                 85                  90                  95

Ser Leu Gln Pro Glu Asp Ile Ala Thr Tyr Tyr Cys His Gln Phe Ser
            100                 105                 110

Glu Leu Pro Trp Thr Phe Gly Gly Gly Thr Lys Val Glu Ile Lys Arg
        115                 120                 125

Thr Val
    130
```

```
<210> SEQ ID NO 27
<211> LENGTH: 130
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu55 LC-2

<400> SEQUENCE: 27

Met Glu Thr Asp Thr Leu Leu Leu Trp Val Leu Leu Leu Trp Val Pro
  1               5                  10                  15

Gly Ser Thr Gly Asp Ile Gln Met Thr Gln Ser Pro Ser Ser Leu Ser
                 20                  25                  30

Ala Ser Val Gly Asp Arg Val Thr Ile Thr Cys Ser Ala Ser Gln Asp
             35                  40                  45

Ile Ser Asn Tyr Leu Asn Trp Tyr Gln Gln Lys Pro Gly Lys Ala Pro
 50                  55                  60
```

```
Lys Leu Leu Ile Tyr Tyr Thr Ser Ser Leu His Thr Gly Val Pro Ser
 65                  70                  75                  80

Arg Phe Ser Gly Ser Gly Ser Gly Thr Asp Tyr Thr Leu Thr Ile Ser
                 85                  90                  95

Ser Leu Gln Pro Glu Asp Ile Ala Thr Tyr Tyr Cys His Gln Phe Ser
            100                 105                 110

Glu Leu Pro Trp Thr Phe Gly Gly Gly Thr Lys Val Glu Ile Lys Arg
        115                 120                 125

Thr Val
    130

<210> SEQ ID NO 28
<211> LENGTH: 130
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Hu55 LC-3

<400> SEQUENCE: 28

Met Glu Thr Asp Thr Leu Leu Leu Trp Val Leu Leu Leu Trp Val Pro
  1               5                  10                  15

Gly Ser Thr Gly Asp Ile Gln Met Thr Gln Ser Pro Ser Ser Leu Ser
             20                  25                  30

Ala Ser Val Gly Asp Arg Val Thr Ile Thr Cys Gln Ala Ser Gln Asp
         35                  40                  45

Ile Ser Asn Tyr Leu Asn Trp Tyr Gln Gln Lys Pro Gly Lys Thr Pro
 50                  55                  60

Lys Leu Leu Ile Tyr Tyr Thr Ser Ser Leu His Thr Gly Val Pro Ser
 65                  70                  75                  80

Arg Phe Ser Gly Ser Gly Ser Gly Thr Asp Tyr Thr Leu Thr Ile Ser
                 85                  90                  95

Ser Leu Gln Pro Glu Asp Ile Ala Thr Tyr Tyr Cys His Gln Phe Ser
            100                 105                 110

Glu Leu Pro Trp Thr Phe Gly Gly Gly Thr Lys Val Glu Ile Lys Arg
        115                 120                 125

Thr Val
    130

<210> SEQ ID NO 29
<211> LENGTH: 247
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: FMC63 scFv

<400> SEQUENCE: 29

Ile Pro Asp Ile Gln Met Thr Gln Thr Thr Ser Ser Leu Ser Ala Ser
  1               5                  10                  15

Leu Gly Asp Arg Val Thr Ile Ser Cys Arg Ala Ser Gln Asp Ile Ser
             20                  25                  30

Lys Tyr Leu Asn Trp Tyr Gln Gln Lys Pro Asp Gly Thr Val Lys Leu
         35                  40                  45

Leu Ile Tyr His Thr Ser Arg Leu His Ser Gly Val Pro Ser Arg Phe
```

```
                    50                  55                  60
Ser Gly Ser Gly Ser Gly Thr Asp Tyr Ser Leu Thr Ile Ser Asn Leu
 65                  70                  75                  80

Glu Gln Glu Asp Ile Ala Thr Tyr Phe Cys Gln Gln Gly Asn Thr Leu
                     85                  90                  95

Pro Tyr Thr Phe Gly Gly Gly Thr Lys Leu Glu Ile Thr Gly Ser Thr
                100                 105                 110

Ser Gly Ser Gly Lys Pro Gly Ser Gly Glu Gly Ser Thr Lys Gly Glu
            115                 120                 125

Val Lys Leu Gln Glu Ser Gly Pro Gly Leu Val Ala Pro Ser Gln Ser
        130                 135                 140

Leu Ser Val Thr Cys Thr Val Ser Gly Val Ser Leu Pro Asp Tyr Gly
145                 150                 155                 160

Val Ser Trp Ile Arg Gln Pro Pro Arg Lys Gly Leu Glu Trp Leu Gly
                165                 170                 175

Val Ile Trp Gly Ser Glu Thr Thr Tyr Tyr Asn Ser Ala Leu Lys Ser
                180                 185                 190

Arg Leu Thr Ile Ile Lys Asp Asn Ser Lys Ser Gln Val Phe Leu Lys
                195                 200                 205

Met Asn Ser Leu Gln Thr Asp Asp Thr Ala Ile Tyr Tyr Cys Ala Lys
210                 215                 220

His Tyr Tyr Tyr Gly Gly Ser Tyr Ala Met Asp Tyr Trp Gly Gln Gly
225                 230                 235                 240

Thr Ser Val Thr Val Ser Ser
                245

<210> SEQ ID NO 30
<211> LENGTH: 107
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: FMC63 scFv Vl

<400> SEQUENCE: 30

Asp Ile Gln Met Thr Gln Thr Thr Ser Ser Leu Ser Ala Ser Leu Gly
 1               5                  10                  15

Asp Arg Val Thr Ile Ser Cys Arg Ala Ser Gln Asp Ile Ser Lys Tyr
                20                  25                  30

Leu Asn Trp Tyr Gln Gln Lys Pro Asp Gly Thr Val Lys Leu Leu Ile
             35                  40                  45

Tyr His Thr Ser Arg Leu His Ser Gly Val Pro Ser Arg Phe Ser Gly
         50                  55                  60

Ser Gly Ser Gly Thr Asp Tyr Ser Leu Thr Ile Ser Asn Leu Glu Gln
 65                  70                  75                  80

Glu Asp Ile Ala Thr Tyr Phe Cys Gln Gln Gly Asn Thr Leu Pro Tyr
                 85                  90                  95

Thr Phe Gly Gly Gly Thr Lys Leu Glu Ile Thr
                100                 105

<210> SEQ ID NO 31
<211> LENGTH: 120
<212> TYPE: PRT
<213> ORGANISM: Artificial Sequence
<220> FEATURE:
<223> OTHER INFORMATION: Synthetic oligonucleotide
```

```
<220> FEATURE:
<221> NAME/KEY: MISC_FEATURE
<223> OTHER INFORMATION: FMC63 scFv Vh

<400> SEQUENCE: 31

Glu Val Lys Leu Gln Glu Ser Gly Pro Gly Leu Val Ala Pro Ser Gln
1               5                   10                  15

Ser Leu Ser Val Thr Cys Thr Val Ser Gly Val Ser Leu Pro Asp Tyr
            20                  25                  30

Gly Val Ser Trp Ile Arg Gln Pro Pro Arg Lys Gly Leu Glu Trp Leu
        35                  40                  45

Gly Val Ile Trp Gly Ser Glu Thr Thr Tyr Tyr Asn Ser Ala Leu Lys
    50                  55                  60

Ser Arg Leu Thr Ile Ile Lys Asp Asn Ser Lys Ser Gln Val Phe Leu
65                  70                  75                  80

Lys Met Asn Ser Leu Gln Thr Asp Asp Thr Ala Ile Tyr Tyr Cys Ala
                85                  90                  95

Lys His Tyr Tyr Tyr Gly Gly Ser Tyr Ala Met Asp Tyr Trp Gly Gln
            100                 105                 110

Gly Thr Ser Val Thr Val Ser Ser
        115                 120

<210> SEQ ID NO 32
<211> LENGTH: 10
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: Linker 10aa

<400> SEQUENCE: 32

Gly Gly Gly Ser Ser Gly Gly Ser Gly
1               5                   10

<210> SEQ ID NO 33
<211> LENGTH: 12
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4 hinge

<400> SEQUENCE: 33

Glu Ser Lys Tyr Gly Pro Pro Cys Pro Pro Cys Pro
1               5                   10

<210> SEQ ID NO 34
<211> LENGTH: 12
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4 hinge

<400> SEQUENCE: 34

Glu Ser Lys Tyr Gly Pro Pro Cys Pro Ser Cys Pro
1               5                   10
```

<210> SEQ ID NO 35
<211> LENGTH: 22
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4 hinge

<400> SEQUENCE: 35

Glu Ser Lys Tyr Gly Pro Pro Cys Pro Pro Cys Pro Gly Gly Gly Ser
1               5                   10                  15

Ser Gly Gly Gly Ser Gly
            20

<210> SEQ ID NO 36
<211> LENGTH: 39
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD28 hinge

<400> SEQUENCE: 36

Ile Glu Val Met Tyr Pro Pro Pro Tyr Leu Asp Asn Glu Lys Ser Asn
1               5                   10                  15

Gly Thr Ile Ile His Val Lys Gly Lys His Leu Cys Pro Ser Pro Leu
            20                  25                  30

Phe Pro Gly Pro Ser Lys Pro
        35

<210> SEQ ID NO 37
<211> LENGTH: 48
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD8 hinge-48aa

<400> SEQUENCE: 37

Ala Lys Pro Thr Thr Thr Pro Ala Pro Arg Pro Pro Thr Pro Ala Pro
1               5                   10                  15

Thr Ile Ala Ser Gln Pro Leu Ser Leu Arg Pro Glu Ala Cys Arg Pro
            20                  25                  30

Ala Ala Gly Gly Ala Val His Thr Arg Gly Leu Asp Phe Ala Cys Asp
        35                  40                  45

<210> SEQ ID NO 38
<211> LENGTH: 45
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD8 hinge-45aa

<400> SEQUENCE: 38

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly

-continued

```
                    20                  25                  30
Gly Ala Val His Thr Arg Gly Leu Asp Phe Ala Cys Asp
        35                  40                  45

<210> SEQ ID NO 39
<211> LENGTH: 129
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4(HL-CH3) (includes S228P in hinge)

<400> SEQUENCE: 39

Glu Ser Lys Tyr Gly Pro Pro Cys Pro Pro Cys Pro Gly Gly Gly Ser
1               5                   10                  15

Ser Gly Gly Gly Ser Gly Gly Gln Pro Arg Glu Pro Gln Val Tyr Thr
                20                  25                  30

Leu Pro Pro Ser Gln Glu Glu Met Thr Lys Asn Gln Val Ser Leu Thr
        35                  40                  45

Cys Leu Val Lys Gly Phe Tyr Pro Ser Asp Ile Ala Val Glu Trp Glu
    50                  55                  60

Ser Asn Gly Gln Pro Glu Asn Asn Tyr Lys Thr Thr Pro Pro Val Leu
65                  70                  75                  80

Asp Ser Asp Gly Ser Phe Phe Leu Tyr Ser Arg Leu Thr Val Asp Lys
                85                  90                  95

Ser Arg Trp Gln Glu Gly Asn Val Phe Ser Cys Ser Val Met His Glu
            100                 105                 110

Ala Leu His Asn His Tyr Thr Gln Lys Ser Leu Ser Leu Ser Leu Gly
        115                 120                 125

Lys

<210> SEQ ID NO 40
<211> LENGTH: 229
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4(L235E,N297Q)

<400> SEQUENCE: 40

Glu Ser Lys Tyr Gly Pro Pro Cys Pro Ser Cys Pro Ala Pro Glu Phe
1               5                   10                  15

Glu Gly Gly Pro Ser Val Phe Leu Phe Pro Pro Lys Pro Lys Asp Thr
                20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Gln Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
```

```
                115                 120                 125
Gln Val Tyr Thr Leu Pro Pro Ser Gln Glu Glu Met Thr Lys Asn Gln
        130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
210                 215                 220

Leu Ser Leu Gly Lys
225

<210> SEQ ID NO 41
<211> LENGTH: 229
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4(S228P, L235E,N297Q)

<400> SEQUENCE: 41

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Gln Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
210                 215                 220

Leu Ser Leu Gly Lys
```

<210> SEQ ID NO 42
<211> LENGTH: 107
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4(CH3)

<400> SEQUENCE: 42

Gly Gln Pro Arg Glu Pro Gln Val Tyr Thr Leu Pro Pro Ser Gln Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Arg Leu Thr Val Asp Lys Ser Arg Trp Gln Glu Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Leu Gly Lys
            100                 105

<210> SEQ ID NO 43
<211> LENGTH: 21
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD3z

<400> SEQUENCE: 43

Leu Cys Tyr Leu Leu Asp Gly Ile Leu Phe Ile Tyr Gly Val Ile Leu
1               5                   10                  15

Thr Ala Leu Phe Leu
            20

<210> SEQ ID NO 44
<211> LENGTH: 27
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD28

<400> SEQUENCE: 44

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 45
<211> LENGTH: 28
<212> TYPE: PRT
<213> ORGANISM: Artificial Sequence

```
<220> FEATURE:
<223> OTHER INFORMATION: Synthetic oligonucleotide
<220> FEATURE:
<221> NAME/KEY: MISC_FEATURE
<223> OTHER INFORMATION: CD28(M)

<400> SEQUENCE: 45

Met Phe Trp Val Leu Val Val Val Gly Gly Val Leu Ala Cys Tyr Ser
1               5                   10                  15

Leu Leu Val Thr Val Ala Phe Ile Ile Phe Trp Val
            20                  25

<210> SEQ ID NO 46
<211> LENGTH: 22
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD4

<400> SEQUENCE: 46

Met Ala Leu Ile Val Leu Gly Gly Val Ala Gly Leu Leu Leu Phe Ile
1               5                   10                  15

Gly Leu Gly Ile Phe Phe
            20

<210> SEQ ID NO 47
<211> LENGTH: 21
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD8tm

<400> SEQUENCE: 47

Ile Tyr Ile Trp Ala Pro Leu Ala Gly Thr Cys Gly Val Leu Leu Leu
1               5                   10                  15

Ser Leu Val Ile Thr
            20

<210> SEQ ID NO 48
<211> LENGTH: 23
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD8tm2

<400> SEQUENCE: 48

Ile Tyr Ile Trp Ala Pro Leu Ala Gly Thr Cys Gly Val Leu Leu Leu
1               5                   10                  15

Ser Leu Val Ile Thr Leu Tyr
            20

<210> SEQ ID NO 49
<211> LENGTH: 24
<212> TYPE: PRT
<213> ORGANISM: Artificial Sequence
<220> FEATURE:
<223> OTHER INFORMATION: Synthetic oligonucleotide
<220> FEATURE:
```

```
<221> NAME/KEY: MISC_FEATURE
<223> OTHER INFORMATION: CD8tm3

<400> SEQUENCE: 49

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 50
<211> LENGTH: 27
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 41BB

<400> SEQUENCE: 50

Ile Ile Ser Phe Phe Leu Ala Leu Thr Ser Thr Ala Leu Leu Phe Leu
1               5                   10                  15

Leu Phe Phe Leu Thr Leu Arg Phe Ser Val Val
            20                  25

<210> SEQ ID NO 51
<211> LENGTH: 112
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD3

<400> SEQUENCE: 51

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 52
<211> LENGTH: 41
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD28

<400> SEQUENCE: 52

Arg Ser Lys Arg Ser Arg Leu Leu His Ser Asp Tyr Met Asn Met Thr
1               5                   10                  15
```

Pro Arg Arg Pro Gly Pro Thr Arg Lys His Tyr Gln Pro Tyr Ala Pro
            20                  25                  30

Pro Arg Asp Phe Ala Ala Tyr Arg Ser
            35                  40

<210> SEQ ID NO 53
<211> LENGTH: 41
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD28gg

<400> SEQUENCE: 53

Arg Ser Lys Arg Ser Arg Gly Gly His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
            35                  40

<210> SEQ ID NO 54
<211> LENGTH: 42
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 4-1BB

<400> SEQUENCE: 54

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
            20                  25                  30

Pro Glu Glu Glu Glu Gly Gly Cys Glu Leu
            35                  40

<210> SEQ ID NO 55
<211> LENGTH: 42
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: OX40

<400> SEQUENCE: 55

Ala Leu Tyr Leu Leu Arg Arg Asp Gln Arg Leu Pro Pro Asp Ala His
1               5                   10                  15

Lys Pro Pro Gly Gly Gly Ser Phe Arg Thr Pro Ile Gln Glu Glu Gln
            20                  25                  30

Ala Asp Ala His Ser Thr Leu Ala Lys Ile
            35                  40

<210> SEQ ID NO 56
<211> LENGTH: 24
<212> TYPE: PRT
<213> ORGANISM: Artificial Sequence
<220> FEATURE:

```
<223> OTHER INFORMATION: Synthetic oligonucleotide
<220> FEATURE:
<221> NAME/KEY: MISC_FEATURE
<223> OTHER INFORMATION: ribosomal skip sequence

<400> SEQUENCE: 56
```

Leu Glu Gly Gly Gly Glu Gly Arg Gly Ser Leu Leu Thr Cys Gly Asp
1               5                   10                  15

Val Glu Glu Asn Pro Gly Pro Arg
            20

```
<210> SEQ ID NO 57
<211> LENGTH: 354
<212> TYPE: PRT
<213> ORGANISM: Artificial Sequence
<220> FEATURE:
<223> OTHER INFORMATION: truncated EGFR

<400> SEQUENCE: 57
```

Leu Val Thr Ser Leu Leu Cys Glu Leu Pro His Pro Ala Phe Leu
1               5                   10                  15

Leu Ile Pro Arg Lys Val Cys Asn Gly Ile Gly Ile Gly Glu Phe Lys
            20                  25                  30

Asp Ser Leu Ser Ile Asn Ala Thr Asn Ile Lys His Phe Lys Asn Cys
                35                  40                  45

Thr Ser Ile Ser Gly Asp Leu His Ile Leu Pro Val Ala Phe Arg Gly
        50                  55                  60

Asp Ser Phe Thr His Thr Pro Pro Leu Asp Pro Gln Glu Leu Asp Ile
65                  70                  75                  80

Leu Lys Thr Val Lys Glu Ile Thr Gly Phe Leu Leu Ile Gln Ala Trp
                85                  90                  95

Pro Glu Asn Arg Thr Asp Leu His Ala Phe Glu Asn Leu Glu Ile Ile
            100                 105                 110

Arg Gly Arg Thr Lys Gln His Gly Gln Phe Ser Leu Ala Val Val Ser
        115                 120                 125

Leu Asn Ile Thr Ser Leu Gly Leu Arg Ser Leu Lys Glu Ile Ser Asp
130                 135                 140

Gly Asp Val Ile Ile Ser Gly Asn Lys Asn Leu Cys Tyr Ala Asn Thr
145                 150                 155                 160

Ile Asn Trp Lys Lys Leu Phe Gly Thr Ser Gly Gln Lys Thr Lys Ile
                165                 170                 175

Ile Ser Asn Arg Gly Glu Asn Ser Cys Lys Ala Thr Gly Gln Val Cys
            180                 185                 190

His Ala Leu Cys Ser Pro Glu Gly Cys Trp Gly Pro Glu Pro Arg Asp
        195                 200                 205

Cys Val Ser Cys Arg Asn Val Ser Arg Gly Arg Glu Cys Val Asp Lys
210                 215                 220

Cys Asn Leu Leu Glu Gly Glu Pro Arg Glu Phe Val Glu Asn Ser Glu
225                 230                 235                 240

Cys Ile Gln Cys His Pro Glu Cys Leu Pro Gln Ala Met Asn Ile Thr
                245                 250                 255

Cys Thr Gly Arg Gly Pro Asp Asn Cys Ile Gln Cys Ala His Tyr Ile
            260                 265                 270

Asp Gly Pro His Cys Val Lys Thr Cys Pro Ala Gly Val Met Gly Glu
        275                 280                 285

Asn Asn Thr Leu Val Trp Lys Tyr Ala Asp Ala Gly His Val Cys His
290                 295                 300

```
Leu Cys His Pro Asn Cys Thr Tyr Gly Cys Thr Gly Pro Gly Leu Glu
305                 310                 315                 320

Gly Cys Pro Thr Asn Gly Pro Lys Ile Pro Ser Ile Ala Thr Gly Met
            325                 330                 335

Val Gly Ala Leu Leu Leu Leu Val Val Ala Leu Gly Ile Gly Leu
            340                 345                 350

Phe Met

<210> SEQ ID NO 58
<211> LENGTH: 940
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 1250 dual CAR, including signal sequence

<400> SEQUENCE: 58

Met Leu Leu Leu Val Thr Ser Leu Leu Leu Cys Glu Leu Pro His Pro
1               5                   10                  15

Ala Phe Leu Leu Ile Pro Glu Val Gln Leu Gln Glu Ser Gly Pro Gly
            20                  25                  30

Leu Val Lys Pro Ser Gln Thr Leu Ser Leu Thr Cys Thr Val Ser Gly
        35                  40                  45

Asp Ser Ile Thr Ser Gly Tyr Trp Asn Trp Ile Arg Gln His Pro Gly
    50                  55                  60

Lys Gly Leu Glu Tyr Ile Gly Tyr Ile Ser Tyr Ser Gly Ser Thr Tyr
65                  70                  75                  80

Tyr Asn Pro Ser Leu Lys Ser Arg Val Thr Ile Ser Arg Asp Thr Ser
                85                  90                  95

Lys Asn Gln Tyr Ser Leu Lys Leu Ser Ser Val Thr Ala Ala Asp Thr
            100                 105                 110

Ala Val Tyr Tyr Cys Ala Ser Pro Asn Tyr Pro Phe Tyr Ala Met Asp
        115                 120                 125

Tyr Trp Gly Gln Gly Thr Leu Val Thr Val Ser Ser Gly Gly Gly Gly
    130                 135                 140

Ser Gly Gly Gly Gly Ser Gly Gly Gly Gly Ser Asp Ile Val Leu Thr
145                 150                 155                 160

Gln Ser Pro Ala Thr Leu Ser Leu Ser Pro Gly Glu Arg Ala Thr Leu
                165                 170                 175

Ser Cys Arg Ala Ser Glu Ser Val Asp Asn Tyr Gly Ile Ser Phe Met
            180                 185                 190

Asn Trp Phe Gln Gln Lys Pro Gly Gln Ala Pro Arg Leu Leu Ile Tyr
        195                 200                 205

Ala Ala Ser Asn Arg Ala Thr Gly Ile Pro Ala Arg Phe Ser Gly Ser
    210                 215                 220

Gly Ser Gly Thr Asp Phe Thr Leu Thr Ile Ser Ser Leu Glu Pro Glu
225                 230                 235                 240

Asp Phe Ala Val Tyr Tyr Cys Gln Gln Ser Lys Glu Val Pro Trp Thr
                245                 250                 255

Phe Gly Gly Gly Thr Lys Val Glu Ile Lys Arg Gly Gly Gly Gly Ser
            260                 265                 270

Gly Gly Gly Gly Ser Gly Gly Gly Ser Gly Gly Gly Gly Ser Asp
        275                 280                 285
```

-continued

```
Ile Gln Met Thr Gln Thr Thr Ser Ser Leu Ser Ala Ser Leu Gly Asp
290                 295                 300

Arg Val Thr Ile Ser Cys Arg Ala Ser Gln Asp Ile Ser Lys Tyr Leu
305                 310                 315                 320

Asn Trp Tyr Gln Gln Lys Pro Asp Gly Thr Val Lys Leu Leu Ile Tyr
                325                 330                 335

His Thr Ser Arg Leu His Ser Gly Val Pro Ser Arg Phe Ser Gly Ser
                340                 345                 350

Gly Ser Gly Thr Asp Tyr Ser Leu Thr Ile Ser Asn Leu Glu Gln Glu
            355                 360                 365

Asp Ile Ala Thr Tyr Phe Cys Gln Gln Gly Asn Thr Leu Pro Tyr Thr
370                 375                 380

Phe Gly Gly Gly Thr Lys Leu Glu Ile Thr Gly Ser Thr Ser Gly Ser
385                 390                 395                 400

Gly Lys Pro Gly Ser Gly Glu Gly Ser Thr Lys Gly Glu Val Lys Leu
                405                 410                 415

Gln Glu Ser Gly Pro Gly Leu Val Ala Pro Ser Gln Ser Leu Ser Val
            420                 425                 430

Thr Cys Thr Val Ser Gly Val Ser Leu Pro Asp Tyr Gly Val Ser Trp
            435                 440                 445

Ile Arg Gln Pro Pro Arg Lys Gly Leu Glu Trp Leu Gly Val Ile Trp
450                 455                 460

Gly Ser Glu Thr Thr Tyr Tyr Asn Ser Ala Leu Lys Ser Arg Leu Thr
465                 470                 475                 480

Ile Ile Lys Asp Asn Ser Lys Ser Gln Val Phe Leu Lys Met Asn Ser
                485                 490                 495

Leu Gln Thr Asp Asp Thr Ala Ile Tyr Tyr Cys Ala Lys His Tyr Tyr
                500                 505                 510

Tyr Gly Gly Ser Tyr Ala Met Asp Tyr Trp Gly Gln Gly Thr Ser Val
            515                 520                 525

Thr Val Ser Ser Glu Ser Lys Tyr Gly Pro Pro Cys Pro Pro Cys Pro
530                 535                 540

Ala Pro Glu Phe Glu Gly Gly Pro Ser Val Phe Leu Phe Pro Pro Lys
545                 550                 555                 560

Pro Lys Asp Thr Leu Met Ile Ser Arg Thr Pro Glu Val Thr Cys Val
                565                 570                 575

Val Val Asp Val Ser Gln Glu Asp Pro Glu Val Gln Phe Asn Trp Tyr
            580                 585                 590

Val Asp Gly Val Glu Val His Asn Ala Lys Thr Lys Pro Arg Glu Glu
            595                 600                 605

Gln Phe Gln Ser Thr Tyr Arg Val Val Ser Val Leu Thr Val Leu His
610                 615                 620

Gln Asp Trp Leu Asn Gly Lys Glu Tyr Lys Cys Lys Val Ser Asn Lys
625                 630                 635                 640

Gly Leu Pro Ser Ser Ile Glu Lys Thr Ile Ser Lys Ala Lys Gly Gln
                645                 650                 655

Pro Arg Glu Pro Gln Val Tyr Thr Leu Pro Pro Ser Gln Glu Glu Met
                660                 665                 670

Thr Lys Asn Gln Val Ser Leu Thr Cys Leu Val Lys Gly Phe Tyr Pro
            675                 680                 685

Ser Asp Ile Ala Val Glu Trp Glu Ser Asn Gly Gln Pro Glu Asn Asn
690                 695                 700

Tyr Lys Thr Thr Pro Pro Val Leu Asp Ser Asp Gly Ser Phe Phe Leu
```

Tyr Ser Arg Leu Thr Val Asp Lys Ser Arg Trp Gln Glu Gly Asn Val
705             710                 715                 720

Phe Ser Cys Ser Val Met His Glu Ala Leu His Asn His Tyr Thr Gln
            725                 730                 735

Lys Ser Leu Ser Leu Ser Leu Gly Lys Met Ala Leu Ile Val Leu Gly
                740                 745                 750

Gly Val Ala Gly Leu Leu Leu Phe Ile Gly Leu Gly Ile Phe Phe Lys
        755                 760                 765

Arg Gly Arg Lys Lys Leu Leu Tyr Ile Phe Lys Gln Pro Phe Met Arg
    770                 775                 780

Pro Val Gln Thr Thr Gln Glu Glu Asp Gly Cys Ser Cys Arg Phe Pro
785                 790                 795                 800

Glu Glu Glu Glu Gly Gly Cys Glu Leu Gly Gly Gly Arg Val Lys Phe
            805                 810                 815

Ser Arg Ser Ala Asp Ala Pro Ala Tyr Gln Gln Gly Gln Asn Gln Leu
                820                 825                 830

Tyr Asn Glu Leu Asn Leu Gly Arg Arg Glu Glu Tyr Asp Val Leu Asp
        835                 840                 845

Lys Arg Arg Gly Arg Asp Pro Glu Met Gly Gly Lys Pro Arg Arg Lys
    850                 855                 860

Asn Pro Gln Glu Gly Leu Tyr Asn Glu Leu Gln Lys Asp Lys Met Ala
865                 870                 875                 880

Glu Ala Tyr Ser Glu Ile Gly Met Lys Gly Glu Arg Arg Arg Gly Lys
            885                 890                 895

Gly His Asp Gly Leu Tyr Gln Gly Leu Ser Thr Ala Thr Lys Asp Thr
                900                 905                 910

Tyr Asp Ala Leu His Met Gln Ala Leu Pro Pro Arg
        915                 920                 925

Tyr Asp Ala Leu His Met Gln Ala Leu Pro Pro Arg
    930                 935                 940

<210> SEQ ID NO 59
<211> LENGTH: 918
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 1250 dual CAR

<400> SEQUENCE: 59

Glu Val Gln Leu Gln Glu Ser Gly Pro Gly Leu Val Lys Pro Ser Gln
1               5                   10                  15

Thr Leu Ser Leu Thr Cys Thr Val Ser Gly Asp Ser Ile Thr Ser Gly
            20                  25                  30

Tyr Trp Asn Trp Ile Arg Gln His Pro Gly Lys Gly Leu Glu Tyr Ile
        35                  40                  45

Gly Tyr Ile Ser Tyr Ser Gly Ser Thr Tyr Tyr Asn Pro Ser Leu Lys
    50                  55                  60

Ser Arg Val Thr Ile Ser Arg Asp Thr Ser Lys Asn Gln Tyr Ser Leu
65                  70                  75                  80

Lys Leu Ser Ser Val Thr Ala Ala Asp Thr Ala Val Tyr Tyr Cys Ala
                85                  90                  95

Ser Pro Asn Tyr Pro Phe Tyr Ala Met Asp Tyr Trp Gly Gln Gly Thr
            100                 105                 110

Leu Val Thr Val Ser Ser Gly Gly Gly Gly Ser Gly Gly Gly Gly Ser

```
                115                 120                 125
Gly Gly Gly Gly Ser Asp Ile Val Leu Thr Gln Ser Pro Ala Thr Leu
            130                 135                 140

Ser Leu Ser Pro Gly Glu Arg Ala Thr Leu Ser Cys Arg Ala Ser Glu
145                 150                 155                 160

Ser Val Asp Asn Tyr Gly Ile Ser Phe Met Asn Trp Phe Gln Gln Lys
                165                 170                 175

Pro Gly Gln Ala Pro Arg Leu Leu Ile Tyr Ala Ala Ser Asn Arg Ala
            180                 185                 190

Thr Gly Ile Pro Ala Arg Phe Ser Gly Ser Gly Ser Gly Thr Asp Phe
            195                 200                 205

Thr Leu Thr Ile Ser Ser Leu Glu Pro Glu Asp Phe Ala Val Tyr Tyr
            210                 215                 220

Cys Gln Gln Ser Lys Glu Val Pro Trp Thr Phe Gly Gly Gly Thr Lys
225                 230                 235                 240

Val Glu Ile Lys Arg Gly Gly Gly Ser Gly Gly Gly Ser Gly
                245                 250                 255

Gly Gly Ser Gly Gly Gly Ser Asp Ile Gln Met Thr Gln Thr
            260                 265                 270

Thr Ser Ser Leu Ser Ala Ser Leu Gly Asp Arg Val Thr Ile Ser Cys
            275                 280                 285

Arg Ala Ser Gln Asp Ile Ser Lys Tyr Leu Asn Trp Tyr Gln Gln Lys
            290                 295                 300

Pro Asp Gly Thr Val Lys Leu Leu Ile Tyr His Thr Ser Arg Leu His
305                 310                 315                 320

Ser Gly Val Pro Ser Arg Phe Ser Gly Ser Gly Ser Gly Thr Asp Tyr
                325                 330                 335

Ser Leu Thr Ile Ser Asn Leu Glu Gln Glu Asp Ile Ala Thr Tyr Phe
            340                 345                 350

Cys Gln Gln Gly Asn Thr Leu Pro Tyr Thr Phe Gly Gly Gly Thr Lys
            355                 360                 365

Leu Glu Ile Thr Gly Ser Thr Ser Gly Ser Gly Lys Pro Gly Ser Gly
            370                 375                 380

Glu Gly Ser Thr Lys Gly Glu Val Lys Leu Gln Glu Ser Gly Pro Gly
385                 390                 395                 400

Leu Val Ala Pro Ser Gln Ser Leu Ser Val Thr Cys Thr Val Ser Gly
                405                 410                 415

Val Ser Leu Pro Asp Tyr Gly Val Ser Trp Ile Arg Gln Pro Pro Arg
            420                 425                 430

Lys Gly Leu Glu Trp Leu Gly Val Ile Trp Gly Ser Glu Thr Thr Tyr
            435                 440                 445

Tyr Asn Ser Ala Leu Lys Ser Arg Leu Thr Ile Ile Lys Asp Asn Ser
            450                 455                 460

Lys Ser Gln Val Phe Leu Lys Met Asn Ser Leu Gln Thr Asp Asp Thr
465                 470                 475                 480

Ala Ile Tyr Tyr Cys Ala Lys His Tyr Tyr Tyr Gly Gly Ser Tyr Ala
                485                 490                 495

Met Asp Tyr Trp Gly Gln Gly Thr Ser Val Thr Val Ser Ser Glu Ser
            500                 505                 510

Lys Tyr Gly Pro Pro Cys Pro Pro Cys Pro Ala Pro Glu Phe Glu Gly
            515                 520                 525

Gly Pro Ser Val Phe Leu Phe Pro Pro Lys Pro Lys Asp Thr Leu Met
530                 535                 540
```

Ile Ser Arg Thr Pro Glu Val Thr Cys Val Val Asp Val Ser Gln
545                 550                 555                 560

Glu Asp Pro Glu Val Gln Phe Asn Trp Tyr Val Asp Gly Val Glu Val
            565                 570                 575

His Asn Ala Lys Thr Lys Pro Arg Glu Glu Gln Phe Gln Ser Thr Tyr
            580                 585                 590

Arg Val Val Ser Val Leu Thr Val Leu His Gln Asp Trp Leu Asn Gly
            595                 600                 605

Lys Glu Tyr Lys Cys Lys Val Ser Asn Lys Gly Leu Pro Ser Ser Ile
610                 615                 620

Glu Lys Thr Ile Ser Lys Ala Lys Gly Gln Pro Arg Glu Pro Gln Val
625                 630                 635                 640

Tyr Thr Leu Pro Pro Ser Gln Glu Glu Met Thr Lys Asn Gln Val Ser
                645                 650                 655

Leu Thr Cys Leu Val Lys Gly Phe Tyr Pro Ser Asp Ile Ala Val Glu
            660                 665                 670

Trp Glu Ser Asn Gly Gln Pro Glu Asn Asn Tyr Lys Thr Thr Pro Pro
            675                 680                 685

Val Leu Asp Ser Asp Gly Ser Phe Phe Leu Tyr Ser Arg Leu Thr Val
690                 695                 700

Asp Lys Ser Arg Trp Gln Glu Gly Asn Val Phe Ser Cys Ser Val Met
705                 710                 715                 720

His Glu Ala Leu His Asn His Tyr Thr Gln Lys Ser Leu Ser Leu Ser
                725                 730                 735

Leu Gly Lys Met Ala Leu Ile Val Leu Gly Gly Val Ala Gly Leu Leu
            740                 745                 750

Leu Phe Ile Gly Leu Gly Ile Phe Phe Lys Arg Gly Arg Lys Lys Leu
            755                 760                 765

Leu Tyr Ile Phe Lys Gln Pro Phe Met Arg Pro Val Gln Thr Thr Gln
770                 775                 780

Glu Glu Asp Gly Cys Ser Cys Arg Phe Pro Glu Glu Glu Glu Gly Gly
785                 790                 795                 800

Cys Glu Leu Gly Gly Gly Arg Val Lys Phe Ser Arg Ser Ala Asp Ala
                805                 810                 815

Pro Ala Tyr Gln Gln Gly Gln Asn Gln Leu Tyr Asn Glu Leu Asn Leu
            820                 825                 830

Gly Arg Arg Glu Glu Tyr Asp Val Leu Asp Lys Arg Gly Arg Asp
            835                 840                 845

Pro Glu Met Gly Gly Lys Pro Arg Arg Lys Asn Pro Gln Glu Gly Leu
850                 855                 860

Tyr Asn Glu Leu Gln Lys Asp Lys Met Ala Glu Ala Tyr Ser Glu Ile
865                 870                 875                 880

Gly Met Lys Gly Glu Arg Arg Arg Gly Lys Gly His Asp Gly Leu Tyr
                885                 890                 895

Gln Gly Leu Ser Thr Ala Thr Lys Asp Thr Tyr Asp Ala Leu His Met
            900                 905                 910

Gln Ala Leu Pro Pro Arg
            915

<210> SEQ ID NO 60
<211> LENGTH: 940
<212> TYPE: PRT
<213> ORGANISM: Artificial Sequence
<220> FEATURE:

```
<223> OTHER INFORMATION: Synthetic oligonucleotide
<220> FEATURE:
<221> NAME/KEY: MISC_FEATURE
<223> OTHER INFORMATION: 1296 dual CAR, including signal sequence

<400> SEQUENCE: 60

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Gly Gly Gly Gly Ser
            260                 265                 270

Gly Gly Gly Gly Ser Gly Gly Gly Ser Gly Gly Gly Gly Ser Glu
        275                 280                 285

Val Gln Leu Gln Glu Ser Gly Pro Gly Leu Val Lys Pro Ser Gln Thr
    290                 295                 300

Leu Ser Leu Thr Cys Thr Val Ser Gly Asp Ser Ile Thr Ser Gly Tyr
305                 310                 315                 320

Trp Asn Trp Ile Arg Gln His Pro Gly Lys Gly Leu Glu Tyr Ile Gly
                325                 330                 335

Tyr Ile Ser Tyr Ser Gly Ser Thr Tyr Tyr Asn Pro Ser Leu Lys Ser
            340                 345                 350

Arg Val Thr Ile Ser Arg Asp Thr Ser Lys Asn Gln Tyr Ser Leu Lys
        355                 360                 365

Leu Ser Ser Val Thr Ala Ala Asp Thr Ala Val Tyr Tyr Cys Ala Ser
    370                 375                 380
```

```
Pro Asn Tyr Pro Phe Tyr Ala Met Asp Tyr Trp Gly Gln Gly Thr Leu
385                 390                 395                 400

Val Thr Val Ser Ser Gly Gly Gly Gly Ser Gly Gly Gly Gly Ser Gly
            405                 410                 415

Gly Gly Gly Ser Asp Ile Val Leu Thr Gln Ser Pro Ala Thr Leu Ser
            420                 425                 430

Leu Ser Pro Gly Glu Arg Ala Thr Leu Ser Cys Arg Ala Ser Glu Ser
        435                 440                 445

Val Asp Asn Tyr Gly Ile Ser Phe Met Asn Trp Phe Gln Gln Lys Pro
450                 455                 460

Gly Gln Ala Pro Arg Leu Leu Ile Tyr Ala Ala Ser Asn Arg Ala Thr
465                 470                 475                 480

Gly Ile Pro Ala Arg Phe Ser Gly Ser Gly Ser Gly Thr Asp Phe Thr
                485                 490                 495

Leu Thr Ile Ser Ser Leu Glu Pro Glu Asp Phe Ala Val Tyr Tyr Cys
            500                 505                 510

Gln Gln Ser Lys Glu Val Pro Trp Thr Phe Gly Gly Gly Thr Lys Val
            515                 520                 525

Glu Ile Lys Arg Glu Ser Lys Tyr Gly Pro Pro Cys Pro Pro Cys Pro
530                 535                 540

Ala Pro Glu Phe Glu Gly Gly Pro Ser Val Phe Leu Phe Pro Pro Lys
545                 550                 555                 560

Pro Lys Asp Thr Leu Met Ile Ser Arg Thr Pro Glu Val Thr Cys Val
            565                 570                 575

Val Val Asp Val Ser Gln Glu Asp Pro Glu Val Gln Phe Asn Trp Tyr
            580                 585                 590

Val Asp Gly Val Glu Val His Asn Ala Lys Thr Lys Pro Arg Glu Glu
            595                 600                 605

Gln Phe Gln Ser Thr Tyr Arg Val Val Ser Val Leu Thr Val Leu His
            610                 615                 620

Gln Asp Trp Leu Asn Gly Lys Glu Tyr Lys Cys Lys Val Ser Asn Lys
625                 630                 635                 640

Gly Leu Pro Ser Ser Ile Glu Lys Thr Ile Ser Lys Ala Lys Gly Gln
                645                 650                 655

Pro Arg Glu Pro Gln Val Tyr Thr Leu Pro Pro Ser Gln Glu Glu Met
            660                 665                 670

Thr Lys Asn Gln Val Ser Leu Thr Cys Leu Val Lys Gly Phe Tyr Pro
            675                 680                 685

Ser Asp Ile Ala Val Glu Trp Glu Ser Asn Gly Gln Pro Glu Asn Asn
        690                 695                 700

Tyr Lys Thr Thr Pro Pro Val Leu Asp Ser Asp Gly Ser Phe Phe Leu
705                 710                 715                 720

Tyr Ser Arg Leu Thr Val Asp Lys Ser Arg Trp Gln Glu Gly Asn Val
                725                 730                 735

Phe Ser Cys Ser Val Met His Glu Ala Leu His Asn His Tyr Thr Gln
            740                 745                 750

Lys Ser Leu Ser Leu Ser Leu Gly Lys Met Ala Leu Ile Val Leu Gly
            755                 760                 765

Gly Val Ala Gly Leu Leu Phe Ile Gly Leu Gly Ile Phe Phe Lys
            770                 775                 780

Arg Gly Arg Lys Lys Leu Leu Tyr Ile Phe Lys Gln Pro Phe Met Arg
785                 790                 795                 800

Pro Val Gln Thr Thr Gln Glu Glu Asp Gly Cys Ser Cys Arg Phe Pro
```

```
                    805                 810                 815
Glu Glu Glu Glu Gly Gly Cys Glu Leu Gly Gly Gly Arg Val Lys Phe
            820                 825                 830

Ser Arg Ser Ala Asp Ala Pro Ala Tyr Gln Gln Gly Gln Asn Gln Leu
        835                 840                 845

Tyr Asn Glu Leu Asn Leu Gly Arg Arg Glu Glu Tyr Asp Val Leu Asp
    850                 855                 860

Lys Arg Arg Gly Arg Asp Pro Glu Met Gly Gly Lys Pro Arg Arg Lys
865                 870                 875                 880

Asn Pro Gln Glu Gly Leu Tyr Asn Glu Leu Gln Lys Asp Lys Met Ala
                885                 890                 895

Glu Ala Tyr Ser Glu Ile Gly Met Lys Gly Glu Arg Arg Arg Gly Lys
            900                 905                 910

Gly His Asp Gly Leu Tyr Gln Gly Leu Ser Thr Ala Thr Lys Asp Thr
        915                 920                 925

Tyr Asp Ala Leu His Met Gln Ala Leu Pro Pro Arg
    930                 935                 940

<210> SEQ ID NO 61
<211> LENGTH: 918
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 1296 dual CAR

<400> SEQUENCE: 61

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
            20                  25                  30

Leu Asn Trp Tyr Gln Gln Lys Pro Asp Gly Thr Val Lys Leu Leu Ile
        35                  40                  45

Tyr His Thr Ser Arg Leu His Ser Gly Val Pro Ser Arg Phe Ser Gly
    50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr Gly Ser Thr Ser Gly
            100                 105                 110

Ser Gly Lys Pro Gly Ser Gly Glu Gly Ser Thr Lys Gly Glu Val Lys
        115                 120                 125

Leu Gln Glu Ser Gly Pro Gly Leu Val Ala Pro Ser Gln Ser Leu Ser
    130                 135                 140

Val Thr Cys Thr Val Ser Gly Val Ser Leu Pro Asp Tyr Gly Val Ser
145                 150                 155                 160

Trp Ile Arg Gln Pro Pro Arg Lys Gly Leu Glu Trp Leu Gly Val Ile
                165                 170                 175

Trp Gly Ser Glu Thr Thr Tyr Tyr Asn Ser Ala Leu Lys Ser Arg Leu
            180                 185                 190

Thr Ile Ile Lys Asp Asn Ser Lys Ser Gln Val Phe Leu Lys Met Asn
        195                 200                 205

Ser Leu Gln Thr Asp Asp Thr Ala Ile Tyr Tyr Cys Ala Lys His Tyr
```

-continued

```
                210                 215                 220
Tyr Tyr Gly Gly Ser Tyr Ala Met Asp Tyr Trp Gly Gln Gly Thr Ser
225                 230                 235                 240

Val Thr Val Ser Ser Gly Gly Gly Ser Gly Gly Gly Ser Gly
                245                 250                 255

Gly Gly Gly Ser Gly Gly Gly Ser Glu Val Gln Leu Gln Glu Ser
            260                 265                 270

Gly Pro Gly Leu Val Lys Pro Ser Gln Thr Leu Ser Leu Thr Cys Thr
            275                 280                 285

Val Ser Gly Asp Ser Ile Thr Ser Gly Tyr Trp Asn Trp Ile Arg Gln
            290                 295                 300

His Pro Gly Lys Gly Leu Glu Tyr Ile Gly Tyr Ile Ser Tyr Ser Gly
305                 310                 315                 320

Ser Thr Tyr Tyr Asn Pro Ser Leu Lys Ser Arg Val Thr Ile Ser Arg
                325                 330                 335

Asp Thr Ser Lys Asn Gln Tyr Ser Leu Lys Leu Ser Ser Val Thr Ala
            340                 345                 350

Ala Asp Thr Ala Val Tyr Tyr Cys Ala Ser Pro Asn Tyr Pro Phe Tyr
            355                 360                 365

Ala Met Asp Tyr Trp Gly Gln Gly Thr Leu Val Thr Val Ser Ser Gly
            370                 375                 380

Gly Gly Ser Gly Gly Gly Gly Ser Gly Gly Gly Gly Ser Asp Ile
385                 390                 395                 400

Val Leu Thr Gln Ser Pro Ala Thr Leu Ser Leu Ser Pro Gly Glu Arg
                405                 410                 415

Ala Thr Leu Ser Cys Arg Ala Ser Glu Ser Val Asp Asn Tyr Gly Ile
            420                 425                 430

Ser Phe Met Asn Trp Phe Gln Gln Lys Pro Gly Gln Ala Pro Arg Leu
            435                 440                 445

Leu Ile Tyr Ala Ala Ser Asn Arg Ala Thr Gly Ile Pro Ala Arg Phe
            450                 455                 460

Ser Gly Ser Gly Ser Gly Thr Asp Phe Thr Leu Thr Ile Ser Ser Leu
465                 470                 475                 480

Glu Pro Glu Asp Phe Ala Val Tyr Tyr Cys Gln Gln Ser Lys Glu Val
                485                 490                 495

Pro Trp Thr Phe Gly Gly Thr Lys Val Glu Ile Lys Arg Glu Ser
            500                 505                 510

Lys Tyr Gly Pro Pro Cys Pro Pro Cys Pro Ala Pro Glu Phe Glu Gly
            515                 520                 525

Gly Pro Ser Val Phe Leu Phe Pro Pro Lys Pro Lys Asp Thr Leu Met
            530                 535                 540

Ile Ser Arg Thr Pro Glu Val Thr Cys Val Val Val Asp Val Ser Gln
545                 550                 555                 560

Glu Asp Pro Glu Val Gln Phe Asn Trp Tyr Val Asp Gly Val Glu Val
                565                 570                 575

His Asn Ala Lys Thr Lys Pro Arg Glu Glu Gln Phe Gln Ser Thr Tyr
            580                 585                 590

Arg Val Val Ser Val Leu Thr Val Leu His Gln Asp Trp Leu Asn Gly
            595                 600                 605

Lys Glu Tyr Lys Cys Lys Val Ser Asn Lys Gly Leu Pro Ser Ser Ile
            610                 615                 620

Glu Lys Thr Ile Ser Lys Ala Lys Gly Gln Pro Arg Glu Pro Gln Val
625                 630                 635                 640
```

-continued

Tyr Thr Leu Pro Pro Ser Gln Glu Met Thr Lys Asn Gln Val Ser
            645                 650                 655

Leu Thr Cys Leu Val Lys Gly Phe Tyr Pro Ser Asp Ile Ala Val Glu
        660                 665                 670

Trp Glu Ser Asn Gly Gln Pro Glu Asn Asn Tyr Lys Thr Thr Pro Pro
    675                 680                 685

Val Leu Asp Ser Asp Gly Ser Phe Phe Leu Tyr Ser Arg Leu Thr Val
690                 695                 700

Asp Lys Ser Arg Trp Gln Glu Gly Asn Val Phe Ser Cys Ser Val Met
705                 710                 715                 720

His Glu Ala Leu His Asn His Tyr Thr Gln Lys Ser Leu Ser Leu Ser
                725                 730                 735

Leu Gly Lys Met Ala Leu Ile Val Leu Gly Gly Val Ala Gly Leu Leu
            740                 745                 750

Leu Phe Ile Gly Leu Gly Ile Phe Phe Lys Arg Gly Arg Lys Lys Leu
        755                 760                 765

Leu Tyr Ile Phe Lys Gln Pro Phe Met Arg Pro Val Gln Thr Thr Gln
    770                 775                 780

Glu Glu Asp Gly Cys Ser Cys Arg Phe Pro Glu Glu Glu Glu Gly Gly
785                 790                 795                 800

Cys Glu Leu Gly Gly Gly Arg Val Lys Phe Ser Arg Ser Ala Asp Ala
                805                 810                 815

Pro Ala Tyr Gln Gln Gly Gln Asn Gln Leu Tyr Asn Glu Leu Asn Leu
            820                 825                 830

Gly Arg Arg Glu Glu Tyr Asp Val Leu Asp Lys Arg Arg Gly Arg Asp
        835                 840                 845

Pro Glu Met Gly Gly Lys Pro Arg Arg Lys Asn Pro Gln Glu Gly Leu
    850                 855                 860

Tyr Asn Glu Leu Gln Lys Asp Lys Met Ala Glu Ala Tyr Ser Glu Ile
865                 870                 875                 880

Gly Met Lys Gly Glu Arg Arg Arg Gly Lys Gly His Asp Gly Leu Tyr
                885                 890                 895

Gln Gly Leu Ser Thr Ala Thr Lys Asp Thr Tyr Asp Ala Leu His Met
            900                 905                 910

Gln Ala Leu Pro Pro Arg
        915

<210> SEQ ID NO 62
<211> LENGTH: 915
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 1316 dual CAR, including signal sequence

<400> SEQUENCE: 62

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

```
Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
            85                  90                  95

Ile Ser Asn Leu Glu Gln Glu Asp Ile Ala Thr Tyr Phe Cys Gln Gln
                100                 105                 110

Gly Asn Thr Leu Pro Tyr Thr Phe Gly Gly Gly Thr Lys Leu Glu Ile
            115                 120                 125

Thr Gly Gly Gly Gly Ser Glu Val Gln Leu Gln Glu Ser Gly Pro Gly
130                 135                 140

Leu Val Lys Pro Ser Gln Thr Leu Ser Leu Thr Cys Thr Val Ser Gly
145                 150                 155                 160

Asp Ser Ile Thr Ser Gly Tyr Trp Asn Trp Ile Arg Gln His Pro Gly
                165                 170                 175

Lys Gly Leu Glu Tyr Ile Gly Tyr Ile Ser Tyr Ser Gly Ser Thr Tyr
            180                 185                 190

Tyr Asn Pro Ser Leu Lys Ser Arg Val Thr Ile Ser Arg Asp Thr Ser
        195                 200                 205

Lys Asn Gln Tyr Ser Leu Lys Leu Ser Ser Val Thr Ala Ala Asp Thr
210                 215                 220

Ala Val Tyr Tyr Cys Ala Ser Pro Asn Tyr Pro Phe Tyr Ala Met Asp
225                 230                 235                 240

Tyr Trp Gly Gln Gly Thr Leu Val Thr Val Ser Ser Gly Ser Thr Ser
                245                 250                 255

Gly Ser Gly Lys Pro Gly Ser Gly Glu Gly Ser Thr Lys Gly Asp Ile
            260                 265                 270

Val Leu Thr Gln Ser Pro Ala Thr Leu Ser Leu Ser Pro Gly Glu Arg
        275                 280                 285

Ala Thr Leu Ser Cys Arg Ala Ser Glu Ser Val Asp Asn Tyr Gly Ile
290                 295                 300

Ser Phe Met Asn Trp Phe Gln Gln Lys Pro Gly Gln Ala Pro Arg Leu
305                 310                 315                 320

Leu Ile Tyr Ala Ala Ser Asn Arg Ala Thr Gly Ile Pro Ala Arg Phe
                325                 330                 335

Ser Gly Ser Gly Ser Gly Thr Asp Phe Thr Leu Thr Ile Ser Ser Leu
            340                 345                 350

Glu Pro Glu Asp Phe Ala Val Tyr Tyr Cys Gln Gln Ser Lys Glu Val
        355                 360                 365

Pro Trp Thr Phe Gly Gly Gly Thr Lys Val Glu Ile Lys Arg Gly Gly
370                 375                 380

Gly Gly Ser Glu Val Lys Leu Gln Glu Ser Gly Pro Gly Leu Val Ala
385                 390                 395                 400

Pro Ser Gln Ser Leu Ser Val Thr Cys Thr Val Ser Gly Val Ser Leu
                405                 410                 415

Pro Asp Tyr Gly Val Ser Trp Ile Arg Gln Pro Pro Arg Lys Gly Leu
            420                 425                 430

Glu Trp Leu Gly Val Ile Trp Gly Ser Glu Thr Thr Tyr Tyr Asn Ser
        435                 440                 445

Ala Leu Lys Ser Arg Leu Thr Ile Ile Lys Asp Asn Ser Lys Ser Gln
450                 455                 460

Val Phe Leu Lys Met Asn Ser Leu Gln Thr Asp Asp Thr Ala Ile Tyr
465                 470                 475                 480
```

-continued

Tyr Cys Ala Lys His Tyr Tyr Gly Gly Ser Tyr Ala Met Asp Tyr
                485             490             495

Trp Gly Gln Gly Thr Ser Val Thr Val Ser Ser Glu Ser Lys Tyr Gly
            500             505             510

Pro Pro Cys Pro Pro Cys Pro Ala Pro Glu Phe Glu Gly Gly Pro Ser
            515             520             525

Val Phe Leu Phe Pro Pro Lys Pro Lys Asp Thr Leu Met Ile Ser Arg
        530             535             540

Thr Pro Glu Val Thr Cys Val Val Val Asp Val Ser Gln Glu Asp Pro
545             550             555             560

Glu Val Gln Phe Asn Trp Tyr Val Asp Gly Val Glu Val His Asn Ala
                565             570             575

Lys Thr Lys Pro Arg Glu Glu Gln Phe Gln Ser Thr Tyr Arg Val Val
            580             585             590

Ser Val Leu Thr Val Leu His Gln Asp Trp Leu Asn Gly Lys Glu Tyr
        595             600             605

Lys Cys Lys Val Ser Asn Lys Gly Leu Pro Ser Ser Ile Glu Lys Thr
    610             615             620

Ile Ser Lys Ala Lys Gly Gln Pro Arg Glu Pro Gln Val Tyr Thr Leu
625             630             635             640

Pro Pro Ser Gln Glu Glu Met Thr Lys Asn Gln Val Ser Leu Thr Cys
                645             650             655

Leu Val Lys Gly Phe Tyr Pro Ser Asp Ile Ala Val Glu Trp Glu Ser
            660             665             670

Asn Gly Gln Pro Glu Asn Asn Tyr Lys Thr Thr Pro Pro Val Leu Asp
        675             680             685

Ser Asp Gly Ser Phe Phe Leu Tyr Ser Arg Leu Thr Val Asp Lys Ser
    690             695             700

Arg Trp Gln Glu Gly Asn Val Phe Ser Cys Ser Val Met His Glu Ala
705             710             715             720

Leu His Asn His Tyr Thr Gln Lys Ser Leu Ser Leu Ser Leu Gly Lys
                725             730             735

Met Ala Leu Ile Val Leu Gly Gly Val Ala Gly Leu Leu Leu Phe Ile
            740             745             750

Gly Leu Gly Ile Phe Phe Lys Arg Gly Arg Lys Lys Leu Leu Tyr Ile
        755             760             765

Phe Lys Gln Pro Phe Met Arg Pro Val Gln Thr Thr Gln Glu Glu Asp
    770             775             780

Gly Cys Ser Cys Arg Phe Pro Glu Glu Glu Glu Gly Gly Cys Glu Leu
785             790             795             800

Gly Gly Gly Arg Val Lys Phe Ser Arg Ser Ala Asp Ala Pro Ala Tyr
                805             810             815

Gln Gln Gly Gln Asn Gln Leu Tyr Asn Glu Leu Asn Leu Gly Arg Arg
            820             825             830

Glu Glu Tyr Asp Val Leu Asp Lys Arg Arg Gly Arg Asp Pro Glu Met
        835             840             845

Gly Gly Lys Pro Arg Arg Lys Asn Pro Gln Glu Gly Leu Tyr Asn Glu
    850             855             860

Leu Gln Lys Asp Lys Met Ala Glu Ala Tyr Ser Glu Ile Gly Met Lys
865             870             875             880

Gly Glu Arg Arg Arg Gly Lys Gly His Asp Gly Leu Tyr Gln Gly Leu
                885             890             895

Ser Thr Ala Thr Lys Asp Thr Tyr Asp Ala Leu His Met Gln Ala Leu

-continued

```
                900            905            910
Pro Pro Arg
        915

<210> SEQ ID NO 63
<211> LENGTH: 893
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: 1316 dual CAR

<400> SEQUENCE: 63

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
            20                  25                  30

Leu Asn Trp Tyr Gln Gln Lys Pro Asp Gly Thr Val Lys Leu Leu Ile
        35                  40                  45

Tyr His Thr Ser Arg Leu His Ser Gly Val Pro Ser Arg Phe Ser Gly
    50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr Gly Gly Gly Gly Ser
            100                 105                 110

Glu Val Gln Leu Gln Glu Ser Gly Pro Gly Leu Val Lys Pro Ser Gln
        115                 120                 125

Thr Leu Ser Leu Thr Cys Thr Val Ser Gly Asp Ser Ile Thr Ser Gly
    130                 135                 140

Tyr Trp Asn Trp Ile Arg Gln His Pro Gly Lys Gly Leu Glu Tyr Ile
145                 150                 155                 160

Gly Tyr Ile Ser Tyr Ser Gly Ser Thr Tyr Tyr Asn Pro Ser Leu Lys
                165                 170                 175

Ser Arg Val Thr Ile Ser Arg Asp Thr Ser Lys Asn Gln Tyr Ser Leu
            180                 185                 190

Lys Leu Ser Ser Val Thr Ala Ala Asp Thr Ala Val Tyr Tyr Cys Ala
        195                 200                 205

Ser Pro Asn Tyr Pro Phe Tyr Ala Met Asp Tyr Trp Gly Gln Gly Thr
    210                 215                 220

Leu Val Thr Val Ser Ser Gly Ser Thr Ser Gly Ser Gly Lys Pro Gly
225                 230                 235                 240

Ser Gly Glu Gly Ser Thr Lys Gly Asp Ile Val Leu Thr Gln Ser Pro
                245                 250                 255

Ala Thr Leu Ser Leu Ser Pro Gly Glu Arg Ala Thr Leu Ser Cys Arg
            260                 265                 270

Ala Ser Glu Ser Val Asp Asn Tyr Gly Ile Ser Phe Met Asn Trp Phe
        275                 280                 285

Gln Gln Lys Pro Gly Gln Ala Pro Arg Leu Leu Ile Tyr Ala Ala Ser
    290                 295                 300

Asn Arg Ala Thr Gly Ile Pro Ala Arg Phe Ser Gly Ser Gly Ser Gly
305                 310                 315                 320

Thr Asp Phe Thr Leu Thr Ile Ser Ser Leu Glu Pro Glu Asp Phe Ala
```

```
            325                 330                 335
Val Tyr Tyr Cys Gln Gln Ser Lys Glu Val Pro Trp Thr Phe Gly Gly
            340                 345                 350
Gly Thr Lys Val Glu Ile Lys Arg Gly Gly Gly Ser Glu Val Lys
            355                 360             365
Leu Gln Glu Ser Gly Pro Gly Leu Val Ala Pro Ser Gln Ser Leu Ser
            370                 375             380
Val Thr Cys Thr Val Ser Gly Val Ser Leu Pro Asp Tyr Gly Val Ser
385                 390                 395                 400
Trp Ile Arg Gln Pro Pro Arg Lys Gly Leu Glu Trp Leu Gly Val Ile
                405                 410                 415
Trp Gly Ser Glu Thr Thr Tyr Tyr Asn Ser Ala Leu Lys Ser Arg Leu
            420                 425                 430
Thr Ile Ile Lys Asp Asn Ser Lys Ser Gln Val Phe Leu Lys Met Asn
            435                 440                 445
Ser Leu Gln Thr Asp Asp Thr Ala Ile Tyr Tyr Cys Ala Lys His Tyr
        450                 455                 460
Tyr Tyr Gly Gly Ser Tyr Ala Met Asp Tyr Trp Gly Gln Gly Thr Ser
465                 470                 475                 480
Val Thr Val Ser Ser Glu Ser Lys Tyr Gly Pro Pro Cys Pro Pro Cys
                485                 490                 495
Pro Ala Pro Glu Phe Glu Gly Gly Pro Ser Val Phe Leu Phe Pro Pro
            500                 505                 510
Lys Pro Lys Asp Thr Leu Met Ile Ser Arg Thr Pro Glu Val Thr Cys
            515                 520             525
Val Val Val Asp Val Ser Gln Glu Asp Pro Glu Val Gln Phe Asn Trp
            530                 535             540
Tyr Val Asp Gly Val Glu Val His Asn Ala Lys Thr Lys Pro Arg Glu
545                 550                 555                 560
Glu Gln Phe Gln Ser Thr Tyr Arg Val Val Ser Val Leu Thr Val Leu
                565                 570                 575
His Gln Asp Trp Leu Asn Gly Lys Glu Tyr Lys Cys Lys Val Ser Asn
            580                 585                 590
Lys Gly Leu Pro Ser Ser Ile Glu Lys Thr Ile Ser Lys Ala Lys Gly
        595                 600                 605
Gln Pro Arg Glu Pro Gln Val Tyr Thr Leu Pro Pro Ser Gln Glu Glu
        610                 615                 620
Met Thr Lys Asn Gln Val Ser Leu Thr Cys Leu Val Lys Gly Phe Tyr
625                 630                 635                 640
Pro Ser Asp Ile Ala Val Glu Trp Glu Ser Asn Gly Gln Pro Glu Asn
                645                 650                 655
Asn Tyr Lys Thr Thr Pro Pro Val Leu Asp Ser Asp Gly Ser Phe Phe
            660                 665                 670
Leu Tyr Ser Arg Leu Thr Val Asp Lys Ser Arg Trp Gln Glu Gly Asn
            675                 680                 685
Val Phe Ser Cys Ser Val Met His Glu Ala Leu His Asn His Tyr Thr
        690                 695                 700
Gln Lys Ser Leu Ser Leu Ser Leu Gly Lys Met Ala Leu Ile Val Leu
705                 710                 715                 720
Gly Gly Val Ala Gly Leu Leu Leu Phe Ile Gly Leu Gly Ile Phe Phe
                725                 730                 735
Lys Arg Gly Arg Lys Lys Leu Leu Tyr Ile Phe Lys Gln Pro Phe Met
            740                 745                 750
```

-continued

```
Arg Pro Val Gln Thr Thr Gln Glu Glu Asp Gly Cys Ser Cys Arg Phe
            755                 760                 765
Pro Glu Glu Glu Gly Gly Cys Glu Leu Gly Gly Gly Arg Val Lys
770                 775                 780
Phe Ser Arg Ser Ala Asp Ala Pro Ala Tyr Gln Gln Gly Gln Asn Gln
785                 790                 795                 800
Leu Tyr Asn Glu Leu Asn Leu Gly Arg Arg Glu Glu Tyr Asp Val Leu
                805                 810                 815
Asp Lys Arg Arg Gly Arg Asp Pro Glu Met Gly Gly Lys Pro Arg Arg
                820                 825                 830
Lys Asn Pro Gln Glu Gly Leu Tyr Asn Glu Leu Gln Lys Asp Lys Met
            835                 840                 845
Ala Glu Ala Tyr Ser Glu Ile Gly Met Lys Gly Glu Arg Arg Arg Gly
850                 855                 860
Lys Gly His Asp Gly Leu Tyr Gln Gly Leu Ser Thr Ala Thr Lys Asp
865                 870                 875                 880
Thr Tyr Asp Ala Leu His Met Gln Ala Leu Pro Pro Arg
                885                 890
```

<210> SEQ ID NO 64
<211> LENGTH: 680
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD19 CAR, including signal sequence

<400> SEQUENCE: 64

```
Met Leu Leu Leu Val Thr Ser Leu Leu Leu Cys Glu Leu Pro His Pro
1               5                   10                  15
Ala Phe Leu Leu Ile Pro Asp Ile Gln Met Thr Gln Thr Thr Ser Ser
                20                  25                  30
Leu Ser Ala Ser Leu Gly Asp Arg Val Thr Ile Ser Cys Arg Ala Ser
            35                  40                  45
Gln Asp Ile Ser Lys Tyr Leu Asn Trp Tyr Gln Gln Lys Pro Asp Gly
    50                  55                  60
Thr Val Lys Leu Leu Ile Tyr His Thr Ser Arg Leu His Ser Gly Val
65                  70                  75                  80
Pro Ser Arg Phe Ser Gly Ser Gly Ser Gly Thr Asp Tyr Ser Leu Thr
                85                  90                  95
Ile Ser Asn Leu Glu Gln Glu Asp Ile Ala Thr Tyr Phe Cys Gln Gln
                100                 105                 110
Gly Asn Thr Leu Pro Tyr Thr Phe Gly Gly Gly Thr Lys Leu Glu Ile
            115                 120                 125
Thr Gly Ser Thr Ser Gly Ser Gly Lys Pro Gly Ser Gly Glu Gly Ser
        130                 135                 140
Thr Lys Gly Glu Val Lys Leu Gln Glu Ser Gly Pro Gly Leu Val Ala
145                 150                 155                 160
Pro Ser Gln Ser Leu Ser Val Thr Cys Thr Val Ser Gly Val Ser Leu
                165                 170                 175
Pro Asp Tyr Gly Val Ser Trp Ile Arg Gln Pro Pro Arg Lys Gly Leu
                180                 185                 190
Glu Trp Leu Gly Val Ile Trp Gly Ser Glu Thr Thr Tyr Tyr Asn Ser
            195                 200                 205
```

```
Ala Leu Lys Ser Arg Leu Thr Ile Ile Lys Asp Asn Ser Lys Ser Gln
            210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Gly Gly Ser Tyr Ala Met Asp Tyr
                245                 250                 255

Trp Gly Gln Gly Thr Ser Val Thr Val Ser Ser Glu Ser Lys Tyr Gly
            260                 265                 270

Pro Pro Cys Pro Pro Cys Pro Ala Pro Glu Phe Glu Gly Gly Pro Ser
        275                 280                 285

Val Phe Leu Phe Pro Pro Lys Pro Lys Asp Thr Leu Met Ile Ser Arg
290                 295                 300

Thr Pro Glu Val Thr Cys Val Val Asp Val Ser Gln Glu Asp Pro
305                 310                 315                 320

Glu Val Gln Phe Asn Trp Tyr Val Asp Gly Val Glu Val His Asn Ala
                325                 330                 335

Lys Thr Lys Pro Arg Glu Glu Gln Phe Gln Ser Thr Tyr Arg Val Val
            340                 345                 350

Ser Val Leu Thr Val Leu His Gln Asp Trp Leu Asn Gly Lys Glu Tyr
        355                 360                 365

Lys Cys Lys Val Ser Asn Lys Gly Leu Pro Ser Ser Ile Glu Lys Thr
370                 375                 380

Ile Ser Lys Ala Lys Gly Gln Pro Arg Glu Pro Gln Val Tyr Thr Leu
385                 390                 395                 400

Pro Pro Ser Gln Glu Glu Met Thr Lys Asn Gln Val Ser Leu Thr Cys
                405                 410                 415

Leu Val Lys Gly Phe Tyr Pro Ser Asp Ile Ala Val Glu Trp Glu Ser
            420                 425                 430

Asn Gly Gln Pro Glu Asn Asn Tyr Lys Thr Thr Pro Pro Val Leu Asp
        435                 440                 445

Ser Asp Gly Ser Phe Phe Leu Tyr Ser Arg Leu Thr Val Asp Lys Ser
450                 455                 460

Arg Trp Gln Glu Gly Asn Val Phe Ser Cys Ser Val Met His Glu Ala
465                 470                 475                 480

Leu His Asn His Tyr Thr Gln Lys Ser Leu Ser Leu Ser Leu Gly Lys
                485                 490                 495

Met Phe Trp Val Leu Val Val Gly Gly Val Leu Ala Cys Tyr Ser
            500                 505                 510

Leu Leu Val Thr Val Ala Phe Ile Ile Phe Trp Val Arg Ser Lys Arg
        515                 520                 525

Ser Arg Gly Gly His Ser Asp Tyr Met Asn Met Thr Pro Arg Arg Pro
530                 535                 540

Gly Pro Thr Arg Lys His Tyr Gln Pro Tyr Ala Pro Pro Arg Asp Phe
545                 550                 555                 560

Ala Ala Tyr Arg Ser Gly Gly Arg Val Lys Phe Ser Arg Ser Ala
                565                 570                 575

Asp Ala Pro Ala Tyr Gln Gln Gly Gln Asn Gln Leu Tyr Asn Glu Leu
            580                 585                 590

Asn Leu Gly Arg Arg Glu Glu Tyr Asp Val Leu Asp Lys Arg Arg Gly
        595                 600                 605

Arg Asp Pro Glu Met Gly Gly Lys Pro Arg Arg Lys Asn Pro Gln Glu
610                 615                 620
```

```
Gly Leu Tyr Asn Glu Leu Gln Lys Asp Lys Met Ala Glu Ala Tyr Ser
625                 630                 635                 640

Glu Ile Gly Met Lys Gly Glu Arg Arg Arg Gly Lys Gly His Asp Gly
                645                 650                 655

Leu Tyr Gln Gly Leu Ser Thr Ala Thr Lys Asp Thr Tyr Asp Ala Leu
            660                 665                 670

His Met Gln Ala Leu Pro Pro Arg
        675                 680

<210> SEQ ID NO 65
<211> LENGTH: 658
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: CD19 CAR

<400> SEQUENCE: 65

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
            20                  25                  30

Leu Asn Trp Tyr Gln Gln Lys Pro Asp Gly Thr Val Lys Leu Leu Ile
        35                  40                  45

Tyr His Thr Ser Arg Leu His Ser Gly Val Pro Ser Arg Phe Ser Gly
    50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr Gly Ser Thr Ser Gly
            100                 105                 110

Ser Gly Lys Pro Gly Ser Gly Glu Gly Ser Thr Lys Gly Glu Val Lys
        115                 120                 125

Leu Gln Glu Ser Gly Pro Gly Leu Val Ala Pro Ser Gln Ser Leu Ser
    130                 135                 140

Val Thr Cys Thr Val Ser Gly Val Ser Leu Pro Asp Tyr Gly Val Ser
145                 150                 155                 160

Trp Ile Arg Gln Pro Pro Arg Lys Gly Leu Glu Trp Leu Gly Val Ile
                165                 170                 175

Trp Gly Ser Glu Thr Thr Tyr Tyr Asn Ser Ala Leu Lys Ser Arg Leu
            180                 185                 190

Thr Ile Ile Lys Asp Asn Ser Lys Ser Gln Val Phe Leu Lys Met Asn
        195                 200                 205

Ser Leu Gln Thr Asp Asp Thr Ala Ile Tyr Tyr Cys Ala Lys His Tyr
    210                 215                 220

Tyr Tyr Gly Gly Ser Tyr Ala Met Asp Tyr Trp Gly Gln Gly Thr Ser
225                 230                 235                 240

Val Thr Val Ser Ser Glu Ser Lys Tyr Gly Pro Pro Cys Pro Pro Cys
                245                 250                 255

Pro Ala Pro Glu Phe Glu Gly Gly Pro Ser Val Phe Leu Phe Pro Pro
            260                 265                 270

Lys Pro Lys Asp Thr Leu Met Ile Ser Arg Thr Pro Glu Val Thr Cys
        275                 280                 285
```

Val Val Val Asp Val Ser Gln Glu Asp Pro Glu Val Gln Phe Asn Trp
            290                 295                 300

Tyr Val Asp Gly Val Glu Val His Asn Ala Lys Thr Lys Pro Arg Glu
305                 310                 315                 320

Glu Gln Phe Gln Ser Thr Tyr Arg Val Val Ser Val Leu Thr Val Leu
                325                 330                 335

His Gln Asp Trp Leu Asn Gly Lys Glu Tyr Lys Cys Lys Val Ser Asn
            340                 345                 350

Lys Gly Leu Pro Ser Ser Ile Glu Lys Thr Ile Ser Lys Ala Lys Gly
                355                 360                 365

Gln Pro Arg Glu Pro Gln Val Tyr Thr Leu Pro Pro Ser Gln Glu Glu
370                 375                 380

Met Thr Lys Asn Gln Val Ser Leu Thr Cys Leu Val Lys Gly Phe Tyr
385                 390                 395                 400

Pro Ser Asp Ile Ala Val Glu Trp Glu Ser Asn Gly Gln Pro Glu Asn
                405                 410                 415

Asn Tyr Lys Thr Thr Pro Pro Val Leu Asp Ser Asp Gly Ser Phe Phe
            420                 425                 430

Leu Tyr Ser Arg Leu Thr Val Asp Lys Ser Arg Trp Gln Glu Gly Asn
                435                 440                 445

Val Phe Ser Cys Ser Val Met His Glu Ala Leu His Asn His Tyr Thr
450                 455                 460

Gln Lys Ser Leu Ser Leu Ser Leu Gly Lys Met Phe Trp Val Leu Val
465                 470                 475                 480

Val Val Gly Gly Val Leu Ala Cys Tyr Ser Leu Leu Val Thr Val Ala
                485                 490                 495

Phe Ile Ile Phe Trp Val Arg Ser Lys Arg Ser Arg Gly Gly His Ser
            500                 505                 510

Asp Tyr Met Asn Met Thr Pro Arg Arg Pro Gly Pro Thr Arg Lys His
            515                 520                 525

Tyr Gln Pro Tyr Ala Pro Pro Arg Asp Phe Ala Ala Tyr Arg Ser Gly
            530                 535                 540

Gly Gly Arg Val Lys Phe Ser Arg Ser Ala Asp Ala Pro Ala Tyr Gln
545                 550                 555                 560

Gln Gly Gln Asn Gln Leu Tyr Asn Glu Leu Asn Leu Gly Arg Arg Glu
                565                 570                 575

Glu Tyr Asp Val Leu Asp Lys Arg Arg Gly Arg Asp Pro Glu Met Gly
            580                 585                 590

Gly Lys Pro Arg Arg Lys Asn Pro Gln Glu Gly Leu Tyr Asn Glu Leu
                595                 600                 605

Gln Lys Asp Lys Met Ala Glu Ala Tyr Ser Glu Ile Gly Met Lys Gly
            610                 615                 620

Glu Arg Arg Arg Gly Lys Gly His Asp Gly Leu Tyr Gln Gly Leu Ser
625                 630                 635                 640

Thr Ala Thr Lys Asp Thr Tyr Asp Ala Leu His Met Gln Ala Leu Pro
                645                 650                 655

Pro Arg

<210> SEQ ID NO 66
<211> LENGTH: 675
<212> TYPE: PRT
<213> ORGANISM: Artificial Sequence
<220> FEATURE:
<223> OTHER INFORMATION: Synthetic oligonucleotide
<220> FEATURE:

<221> NAME/KEY: MISC_FEATURE
<223> OTHER INFORMATION: BAFF-R CAR including a signal sequence

<400> SEQUENCE: 66

```
Met Leu Leu Leu Val Thr Ser Leu Leu Leu Cys Glu Leu Pro His Pro
1               5                   10                  15

Ala Phe Leu Leu Ile Pro Glu Val Gln Leu Gln Glu Ser Gly Pro Gly
            20                  25                  30

Leu Val Lys Pro Ser Gln Thr Leu Ser Leu Thr Cys Thr Val Ser Gly
        35                  40                  45

Asp Ser Ile Thr Ser Gly Tyr Trp Asn Trp Ile Arg Gln His Pro Gly
    50                  55                  60

Lys Gly Leu Glu Tyr Ile Gly Tyr Ile Ser Tyr Ser Gly Ser Thr Tyr
65                  70                  75                  80

Tyr Asn Pro Ser Leu Lys Ser Arg Val Thr Ile Ser Arg Asp Thr Ser
                85                  90                  95

Lys Asn Gln Tyr Ser Leu Lys Leu Ser Ser Val Thr Ala Ala Asp Thr
            100                 105                 110

Ala Val Tyr Tyr Cys Ala Ser Pro Asn Tyr Pro Phe Tyr Ala Met Asp
        115                 120                 125

Tyr Trp Gly Gln Gly Thr Leu Val Thr Val Ser Ser Gly Gly Gly Gly
    130                 135                 140

Ser Gly Gly Gly Gly Ser Gly Gly Gly Gly Ser Asp Ile Val Leu Thr
145                 150                 155                 160

Gln Ser Pro Ala Thr Leu Ser Leu Ser Pro Gly Glu Arg Ala Thr Leu
                165                 170                 175

Ser Cys Arg Ala Ser Glu Ser Val Asp Asn Tyr Gly Ile Ser Phe Met
            180                 185                 190

Asn Trp Phe Gln Gln Lys Pro Gly Gln Ala Pro Arg Leu Leu Ile Tyr
        195                 200                 205

Ala Ala Ser Asn Arg Ala Thr Gly Ile Pro Ala Arg Phe Ser Gly Ser
    210                 215                 220

Gly Ser Gly Thr Asp Phe Thr Leu Thr Ile Ser Ser Leu Glu Pro Glu
225                 230                 235                 240

Asp Phe Ala Val Tyr Tyr Cys Gln Gln Ser Lys Glu Val Pro Trp Thr
                245                 250                 255

Phe Gly Gly Gly Thr Lys Val Glu Ile Lys Arg Glu Ser Lys Tyr Gly
            260                 265                 270

Pro Pro Cys Pro Pro Cys Pro Ala Pro Glu Phe Glu Gly Gly Pro Ser
        275                 280                 285

Val Phe Leu Phe Pro Pro Lys Pro Lys Asp Thr Leu Met Ile Ser Arg
    290                 295                 300

Thr Pro Glu Val Thr Cys Val Val Val Asp Val Ser Gln Glu Asp Pro
305                 310                 315                 320

Glu Val Gln Phe Asn Trp Tyr Val Asp Gly Val Glu Val His Asn Ala
                325                 330                 335

Lys Thr Lys Pro Arg Glu Glu Gln Phe Gln Ser Thr Tyr Arg Val Val
            340                 345                 350

Ser Val Leu Thr Val Leu His Gln Asp Trp Leu Asn Gly Lys Glu Tyr
        355                 360                 365

Lys Cys Lys Val Ser Asn Lys Gly Leu Pro Ser Ser Ile Glu Lys Thr
    370                 375                 380

Ile Ser Lys Ala Lys Gly Gln Pro Arg Glu Pro Gln Val Tyr Thr Leu
385                 390                 395                 400
```

```
Pro Pro Ser Gln Glu Glu Met Thr Lys Asn Gln Val Ser Leu Thr Cys
            405                 410                 415
Leu Val Lys Gly Phe Tyr Pro Ser Asp Ile Ala Val Glu Trp Glu Ser
            420                 425                 430
Asn Gly Gln Pro Glu Asn Asn Tyr Lys Thr Thr Pro Pro Val Leu Asp
            435                 440                 445
Ser Asp Gly Ser Phe Phe Leu Tyr Ser Arg Leu Thr Val Asp Lys Ser
        450                 455                 460
Arg Trp Gln Glu Gly Asn Val Phe Ser Cys Ser Val Met His Glu Ala
465                 470                 475                 480
Leu His Asn His Tyr Thr Gln Lys Ser Leu Ser Leu Ser Leu Gly Lys
                485                 490                 495
Met Ala Leu Ile Val Leu Gly Gly Val Ala Gly Leu Leu Leu Phe Ile
            500                 505                 510
Gly Leu Gly Ile Phe Phe Lys Arg Gly Arg Lys Lys Leu Leu Tyr Ile
            515                 520                 525
Phe Lys Gln Pro Phe Met Arg Pro Val Gln Thr Thr Gln Glu Glu Asp
            530                 535                 540
Gly Cys Ser Cys Arg Phe Pro Glu Glu Glu Glu Gly Gly Cys Glu Leu
545                 550                 555                 560
Gly Gly Gly Arg Val Lys Phe Ser Arg Ser Ala Asp Ala Pro Ala Tyr
                565                 570                 575
Gln Gln Gly Gln Asn Gln Leu Tyr Asn Glu Leu Asn Leu Gly Arg Arg
            580                 585                 590
Glu Glu Tyr Asp Val Leu Asp Lys Arg Arg Gly Arg Asp Pro Glu Met
            595                 600                 605
Gly Gly Lys Pro Arg Arg Lys Asn Pro Gln Glu Gly Leu Tyr Asn Glu
            610                 615                 620
Leu Gln Lys Asp Lys Met Ala Glu Ala Tyr Ser Glu Ile Gly Met Lys
625                 630                 635                 640
Gly Glu Arg Arg Arg Gly Lys Gly His Asp Gly Leu Tyr Gln Gly Leu
                645                 650                 655
Ser Thr Ala Thr Lys Asp Thr Tyr Asp Ala Leu His Met Gln Ala Leu
            660                 665                 670
Pro Pro Arg
        675

<210> SEQ ID NO 67
<211> LENGTH: 653
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: BAFF-R CAR

<400> SEQUENCE: 67

Glu Val Gln Leu Gln Glu Ser Gly Pro Gly Leu Val Lys Pro Ser Gln
1               5                   10                  15
Thr Leu Ser Leu Thr Cys Thr Val Ser Gly Asp Ser Ile Thr Ser Gly
            20                  25                  30
Tyr Trp Asn Trp Ile Arg Gln His Pro Gly Lys Gly Leu Glu Tyr Ile
        35                  40                  45
Gly Tyr Ile Ser Tyr Ser Gly Ser Thr Tyr Tyr Asn Pro Ser Leu Lys
    50                  55                  60
```

```
Ser Arg Val Thr Ile Ser Arg Asp Thr Ser Lys Asn Gln Tyr Ser Leu
 65                  70                  75                  80

Lys Leu Ser Ser Val Thr Ala Ala Asp Thr Ala Val Tyr Tyr Cys Ala
                 85                  90                  95

Ser Pro Asn Tyr Pro Phe Tyr Ala Met Asp Tyr Trp Gly Gln Gly Thr
            100                 105                 110

Leu Val Thr Val Ser Ser Gly Gly Gly Gly Ser Gly Gly Gly Gly Ser
        115                 120                 125

Gly Gly Gly Gly Ser Asp Ile Val Leu Thr Gln Ser Pro Ala Thr Leu
    130                 135                 140

Ser Leu Ser Pro Gly Glu Arg Ala Thr Leu Ser Cys Arg Ala Ser Glu
145                 150                 155                 160

Ser Val Asp Asn Tyr Gly Ile Ser Phe Met Asn Trp Phe Gln Gln Lys
                165                 170                 175

Pro Gly Gln Ala Pro Arg Leu Leu Ile Tyr Ala Ala Ser Asn Arg Ala
            180                 185                 190

Thr Gly Ile Pro Ala Arg Phe Ser Gly Ser Gly Ser Gly Thr Asp Phe
        195                 200                 205

Thr Leu Thr Ile Ser Ser Leu Glu Pro Glu Asp Phe Ala Val Tyr Tyr
210                 215                 220

Cys Gln Gln Ser Lys Glu Val Pro Trp Thr Phe Gly Gly Gly Thr Lys
225                 230                 235                 240

Val Glu Ile Lys Arg Glu Ser Lys Tyr Gly Pro Pro Cys Pro Pro Cys
                245                 250                 255

Pro Ala Pro Glu Phe Glu Gly Gly Pro Ser Val Phe Leu Phe Pro Pro
            260                 265                 270

Lys Pro Lys Asp Thr Leu Met Ile Ser Arg Thr Pro Glu Val Thr Cys
        275                 280                 285

Val Val Val Asp Val Ser Gln Glu Asp Pro Glu Val Gln Phe Asn Trp
290                 295                 300

Tyr Val Asp Gly Val Glu Val His Asn Ala Lys Thr Lys Pro Arg Glu
305                 310                 315                 320

Glu Gln Phe Gln Ser Thr Tyr Arg Val Val Ser Val Leu Thr Val Leu
                325                 330                 335

His Gln Asp Trp Leu Asn Gly Lys Glu Tyr Lys Cys Lys Val Ser Asn
            340                 345                 350

Lys Gly Leu Pro Ser Ser Ile Glu Lys Thr Ile Ser Lys Ala Lys Gly
        355                 360                 365

Gln Pro Arg Glu Pro Gln Val Tyr Thr Leu Pro Pro Ser Gln Glu Glu
            370                 375                 380

Met Thr Lys Asn Gln Val Ser Leu Thr Cys Leu Val Lys Gly Phe Tyr
385                 390                 395                 400

Pro Ser Asp Ile Ala Val Glu Trp Glu Ser Asn Gly Gln Pro Glu Asn
                405                 410                 415

Asn Tyr Lys Thr Thr Pro Pro Val Leu Asp Ser Asp Gly Ser Phe Phe
            420                 425                 430

Leu Tyr Ser Arg Leu Thr Val Asp Lys Ser Arg Trp Gln Glu Gly Asn
        435                 440                 445

Val Phe Ser Cys Ser Val Met His Glu Ala Leu His Asn His Tyr Thr
    450                 455                 460

Gln Lys Ser Leu Ser Leu Ser Leu Gly Lys Met Ala Leu Ile Val Leu
465                 470                 475                 480
```

```
Gly Gly Val Ala Gly Leu Leu Leu Phe Ile Gly Leu Gly Ile Phe Phe
                485                 490                 495

Lys Arg Gly Arg Lys Leu Leu Tyr Ile Phe Lys Gln Pro Phe Met
        500                 505                 510

Arg Pro Val Gln Thr Thr Gln Glu Glu Asp Gly Cys Ser Cys Arg Phe
            515                 520                 525

Pro Glu Glu Glu Glu Gly Gly Cys Glu Leu Gly Gly Arg Val Lys
        530                 535                 540

Phe Ser Arg Ser Ala Asp Ala Pro Ala Tyr Gln Gln Gly Gln Asn Gln
545                 550                 555                 560

Leu Tyr Asn Glu Leu Asn Leu Gly Arg Arg Glu Glu Tyr Asp Val Leu
                565                 570                 575

Asp Lys Arg Arg Gly Arg Asp Pro Glu Met Gly Gly Lys Pro Arg Arg
            580                 585                 590

Lys Asn Pro Gln Glu Gly Leu Tyr Asn Glu Leu Gln Lys Asp Lys Met
        595                 600                 605

Ala Glu Ala Tyr Ser Glu Ile Gly Met Lys Gly Glu Arg Arg Arg Gly
        610                 615                 620

Lys Gly His Asp Gly Leu Tyr Gln Gly Leu Ser Thr Ala Thr Lys Asp
625                 630                 635                 640

Thr Tyr Asp Ala Leu His Met Gln Ala Leu Pro Pro Arg
                645                 650

<210> SEQ ID NO 68
<211> LENGTH: 129
<212> TYPE: PRT
<213> ORGANISM: Artificial Sequence
<220> FEATURE:
<223> OTHER INFORMATION: Synthetic oligonucleotide
<220> FEATURE:
<221> NAME/KEY: MISC_FEATURE
<223> OTHER INFORMATION: IgG4 hinge

<400> SEQUENCE: 68

Glu Ser Lys Tyr Gly Pro Pro Cys Pro Pro Cys Pro Gly Gly Gly Ser
1               5                   10                  15

Ser Gly Gly Gly Ser Gly Gly Gln Pro Arg Glu Pro Gln Val Tyr Thr
            20                  25                  30

Leu Pro Pro Ser Gln Glu Glu Met Thr Lys Asn Gln Val Ser Leu Thr
        35                  40                  45

Cys Leu Val Lys Gly Phe Tyr Pro Ser Asp Ile Ala Val Glu Trp Glu
    50                  55                  60

Ser Asn Gly Gln Pro Glu Asn Asn Tyr Lys Thr Thr Pro Pro Val Leu
65                  70                  75                  80

Asp Ser Asp Gly Ser Phe Phe Leu Tyr Ser Arg Leu Thr Val Asp Lys
                85                  90                  95

Ser Arg Trp Gln Glu Gly Asn Val Phe Ser Cys Ser Val Met His Glu
            100                 105                 110

Ala Leu His Asn His Tyr Thr Gln Lys Ser Leu Ser Leu Ser Leu Gly
        115                 120                 125

Lys

<210> SEQ ID NO 69
<211> LENGTH: 15
<212> TYPE: PRT
<213> ORGANISM: Artificial Sequence
<220> FEATURE:
<223> OTHER INFORMATION: Synthetic oligonucleotide
```

```
<400> SEQUENCE: 69

Gly Gly Gly Gly Ser Gly Gly Gly Gly Ser Gly Gly Gly Gly Ser
1               5                   10                  15

<210> SEQ ID NO 70
<211> LENGTH: 5
<212> TYPE: PRT
<213> ORGANISM: Artificial Sequence
<220> FEATURE:
<223> OTHER INFORMATION: Synthetic oligonucleotide

<400> SEQUENCE: 70

Gly Gly Gly Gly Ser
1               5
```